(12) United States Patent
Wakabayashi

(10) Patent No.: US 8,164,684 B2
(45) Date of Patent: *Apr. 24, 2012

(54) ELECTRONIC CAMERA WITH ADJUSTABLE EXPOSURE SENSITIVITY

(75) Inventor: Tsutomu Wakabayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 256 days.

This patent is subject to a terminal disclaimer.

(21) Appl. No.: 11/656,976

(22) Filed: Jan. 24, 2007

(65) Prior Publication Data

US 2007/0115386 A1 May 24, 2007

Related U.S. Application Data

(62) Division of application No. 10/328,145, filed on Dec. 26, 2002, now Pat. No. 7,218,353.

(30) Foreign Application Priority Data

| Dec. 26, 2001 | (JP) | 2001-395059 |
| May 21, 2002 | (JP) | 2002-146033 |
| Jun. 14, 2002 | (JP) | 2002-174724 |

(51) Int. Cl.
  *H04N 5/235* (2006.01)
  *H04N 5/222* (2006.01)
  *H04N 5/238* (2006.01)
  *G03B 9/70* (2006.01)

(52) U.S. Cl. ............... 348/362; 348/371; 348/229.1; 348/363; 396/166

(58) Field of Classification Search .......... 348/360, 348/362, 371, 229.1, 363; 396/166
See application file for complete search history.

(56) References Cited

U.S. PATENT DOCUMENTS

| 5,325,147 A | 6/1994 | Kirigaya et al. |
| 5,703,644 A | 12/1997 | Mori et al. |
| 5,831,676 A | 11/1998 | Takahashi et al. |
| 6,359,651 B1 * | 3/2002 | Yokonuma ............... 348/370 |
| 6,608,651 B2 * | 8/2003 | Mabuchi et al. ......... 348/360 |
| 6,654,062 B1 | 11/2003 | Numata et al. |
| 6,970,199 B2 | 11/2005 | Venturino et al. |
| 7,071,987 B1 | 7/2006 | Tanaka |
| 2005/0052557 A1 | 3/2005 | Kusaka et al. |

FOREIGN PATENT DOCUMENTS

| JP | A-2-274181 | 11/1990 |
| JP | A-5-64059 | 3/1993 |
| JP | A-5-336436 | 12/1993 |
| JP | A-10-93857 | 4/1998 |
| JP | A-11-331689 | 11/1999 |
| JP | A-11-355648 | 12/1999 |
| JP | A-2000-39643 | 2/2000 |
| JP | A-2000-354179 | 12/2000 |
| JP | A-2001-346098 | 12/2001 |

* cited by examiner

*Primary Examiner* — Nhan T Tran
(74) *Attorney, Agent, or Firm* — Oliff & Berridge, PLC

(57) ABSTRACT

If an electronic camera is set in an image-capturing sensitivity automatic control mode, a program autoexposure calculation is executed based upon the subject brightness and the image-capturing sensitivity setting to determine a control aperture value and a control shutter speed. If the correct exposure is not achieved, a control exposure sensitivity is calculated based upon the exposure deviation and the image-capturing sensitivity setting is adjusted accordingly. If an internal flash unit or an external flash unit is utilized, an autoexposure calculation is executed by using the flash unit synchronizing speed, the subject brightness and the image-capturing sensitivity setting to determine the control aperture value.

5 Claims, 29 Drawing Sheets

ELECTRONIC CAMERA WITH ADJUSTABLE EXPOSURE SENSITIVITY

CROSS REFERENCE TO RELATED APPLICATION

This is a Division of U.S. patent application Ser. No. 10/328,145 filed Dec. 26, 2002, now U.S. Pat. No. 7,218,353. The disclosure of the prior application is hereby incorporated by reference herein in its entirety.

INCORPORATION BY REFERENCE

The disclosures of the following priority applications are herein incorporated by reference:
Japanese Patent Application No. 2001-395059 filed Dec. 26, 2001
Japanese Patent Application No. 2002-146033 filed May 21, 2002
Japanese Patent Application No. 2002-174724 filed Jun. 14, 2002

BACKGROUND OF THE INVENTION

1. Field of the Invention

The present invention relates to an electronic camera that captures a subject image with an image-capturing device.

2. Description of the Related Art

An apex operation is performed to determine the correct exposure quantity in a camera in the related art through the following formula (1) by using the aperture value AV of the photographic lens, the shutter speed (exposure time length) TV, the subject brightness BV and the exposure sensitivity SV.

$$EV=AV+TV=BV+SV \quad (1)$$

EV in the expression above represents the exposure quantity. In a silver halide camera, SV is determined by the sensitivity of the film being used in the camera and, accordingly, the aperture value AV and the shutter speed TV are calculated in correspondence to the subject brightness BV. If the exposure sensitivity SV of the image-capturing device can be varied in an electronic camera, the aperture value AV, the shutter speed TV and the exposure sensitivity SV are calculated in correspondence the subject brightness BV.

Under normal circumstances, if the exposure sensitivity SV is raised in an electronic camera, the noise that is superimposed on image signals increases to result in poor image quality. Accordingly, it is desirable to set an upper limit for the exposure sensitivity SV to ensure that the S/N ratio of the image does not fall below a specific value in an exposure sensitivity change mode which allows the exposure sensitivity SV to be varied. At the same time, a higher priority should be given to achieving the correct exposure than achieving a better S/N ratio for the image in a situation in which full exposure cannot be achieved easily, e.g., during a photographing operation performed in a dark area or during a photographing operation that needs to be performed at a higher shutter speed TV. In order to address this need, an electronic camera that can be set in a sensitivity boost mode in which the exposure sensitivity SV can be set higher than the upper limit has been proposed in the known art. Since the upper limit is set to the exposure sensitivity SV in the exposure sensitivity change mode and the exposure sensitivity SV can be set higher than the upper limit in the sensitivity boost mode, an operational conflict occurs if the two modes are set at the same time.

In addition, the subject brightness BV is often low in a situation that necessitates the use of an electronic flash unit for illuminating the subject. Under normal circumstances, the image-capturing sensitivity SV is adjusted to a higher value in the exposure calculation executed by using formula (1) above if the subject brightness BV is low. In such a case, there is a risk of an increased noise in the image signals to result in degraded image quality and, for this reason, it is better not to change the image-capturing sensitivity. In addition, if no photographic lens is mounted at the electronic camera, lens information such as the aperture value AV necessary for the exposure calculation is not available to the camera, and thus, the image-capturing sensitivity SV cannot be determined accurately. When the full information necessary for the exposure calculation is not available as described above, it is better not to change the image-capturing sensitivity SV that has been set.

SUMMARY OF THE INVENTION

Accordingly, it would be desirable to provide an electronic camera that performs an exposure calculation by allowing the exposure sensitivity to be adjusted if a specific condition is satisfied.

An electronic camera according to the present invention comprises an image-capturing device that captures an image of a subject through a photographic lens, a brightness detection device that detects the brightness of the subject, a first exposure calculation circuit that performs an exposure calculation by using at least an exposure sensitivity set at the image-capturing device, an exposure time length set at the image-capturing device, an aperture value set at the photographic lens and the subject brightness detected by the brightness detection device and calculates a first control exposure by changing at least the exposure sensitivity among the exposure sensitivity, the exposure time length and the aperture value so as to achieve the correct exposure and a control circuit that allows the first exposure calculation circuit to calculate the first control exposure if a specific condition is satisfied.

The electronic camera according to the present invention further comprises a second exposure calculation circuit that sets the exposure sensitivity within a second range higher than a first range over which the exposure sensitivity can be varied by the first exposure calculation circuit and calculates a control exposure by changing at least either the exposure time length or the aperture value so as to achieve the correct exposure. The control circuit disallows the control exposure calculation by the second exposure calculation circuit if the specific condition is satisfied, and disallows the first control exposure calculation by the first exposure calculation circuit and also allows the second exposure calculation circuit to calculate the control exposure if the specific condition is not satisfied.

In this electronic camera, the first range represents an ISO 100~ISO 1600 range, whereas the second range corresponds to ISO 3200. The first control exposure calculation is an exposure calculation executed in an image-capturing sensitivity automatic control mode, whereas the second control exposure calculation is an exposure calculation executed in a sensitivity boost mode.

The control circuit is capable of disallowing selection of the sensitivity automatic control mode while the electronic camera is set in the sensitivity boost mode and is also capable of disallowing the selection of the sensitivity boost mode while the electronic camera is set in the sensitivity automatic control mode. Alternatively, the control circuit may clear the image-capturing sensitivity automatic control mode if the sensitivity boost mode is selected while the electronic camera is set in the image-capturing sensitivity automatic control mode and also clear the sensitivity boost mode if the image-capturing sensitivity automatic control mode is selected while the electronic camera is set in the sensitivity boost mode.

Alternatively, the electronic camera according to the present invention may further comprise both a second exposure calculation circuit that sets the exposure sensitivity within a second range higher than a first range over which the sensitivity can be changed by the first exposure calculation circuit and calculates a control exposure by changing at least either the exposure time length or the aperture value so as to achieve the correct exposure and a third exposure calculation circuit that disallows any change in the exposure sensitivity and calculates a control exposure by changing at least either the exposure time length or the aperture value so as to achieve the correct exposure. A single exposure calculation circuit among the first exposure calculation circuit, the second exposure calculation circuit and the third exposure calculation circuit, selected by the control circuit performs the exposure calculation.

In this electronic camera, the first range represents an ISO 100~ISO 1600 range, whereas the second range corresponds to ISO 3200. The first control exposure calculation is an exposure calculation executed in the image-capturing sensitivity automatic control mode, the second control exposure calculation is an exposure calculation executed in the sensitivity boost mode and the third control exposure calculation is a fixed exposure calculation executed in an image-capturing sensitivity mode.

The electronic camera according to the present invention further comprises a fourth exposure calculation circuit that calculates a fourth control exposure by changing at least either the exposure time length or the aperture value so as to achieve correct exposure. The first exposure calculation circuit calculates the first control exposure if the correct exposure is not achieved through the fourth control exposure calculated by the fourth control exposure calculation circuit. In addition, the control circuit individually implements control on the first exposure calculation circuit and the fourth exposure calculation circuit so as to allow the calculations of the first control exposure and the fourth control exposure if the specific condition is satisfied and to disallow the calculation of the first control exposure and, at the same time, allow calculation of the fourth control exposure if the specific condition is not satisfied.

The electronic camera according to the present invention further comprises a fifth exposure calculation circuit that calculates a fifth control exposure by changing at least one of the exposure sensitivity, the exposure time length and the aperture value so as to achieve the correct exposure. The control circuit implements control individually on the first exposure calculation circuit and the fifth exposure calculation circuit so that the fifth control exposure calculation is allowed while the calculation of the first control exposure is disallowed under the specific condition and so that the first control exposure calculation is allowed while the calculation of the fifth control exposure is disallowed if a condition different from the specific condition is present.

The electronic camera according to the present invention may further comprise a flash unit operation detection circuit that detects whether or not an electronic flash unit which illuminates the subject is engaged in operation. In such a case, the specific condition is a condition in which the operation of the electronic flash unit is not detected by the flash unit operation detection circuit.

The electronic camera according to the present invention may further comprise a photographic lens detection circuit that detects whether or not a photographic lens is mounted. In this case, the specific condition is a condition in which the presence of the photographic lens is detected by the photographic lens detection circuit. When the photographic lens detection circuit detects that the photographic lens is mounted, information indicating the aperture value of the photographic lens is provided to the electronic camera, whereas no information indicating the aperture value is provided to the electronic camera if the presence of a photographic lens is not detected.

DETAILED DESCRIPTION OF THE PREFERRED EMBODIMENTS

First Embodiment

Figure 1:
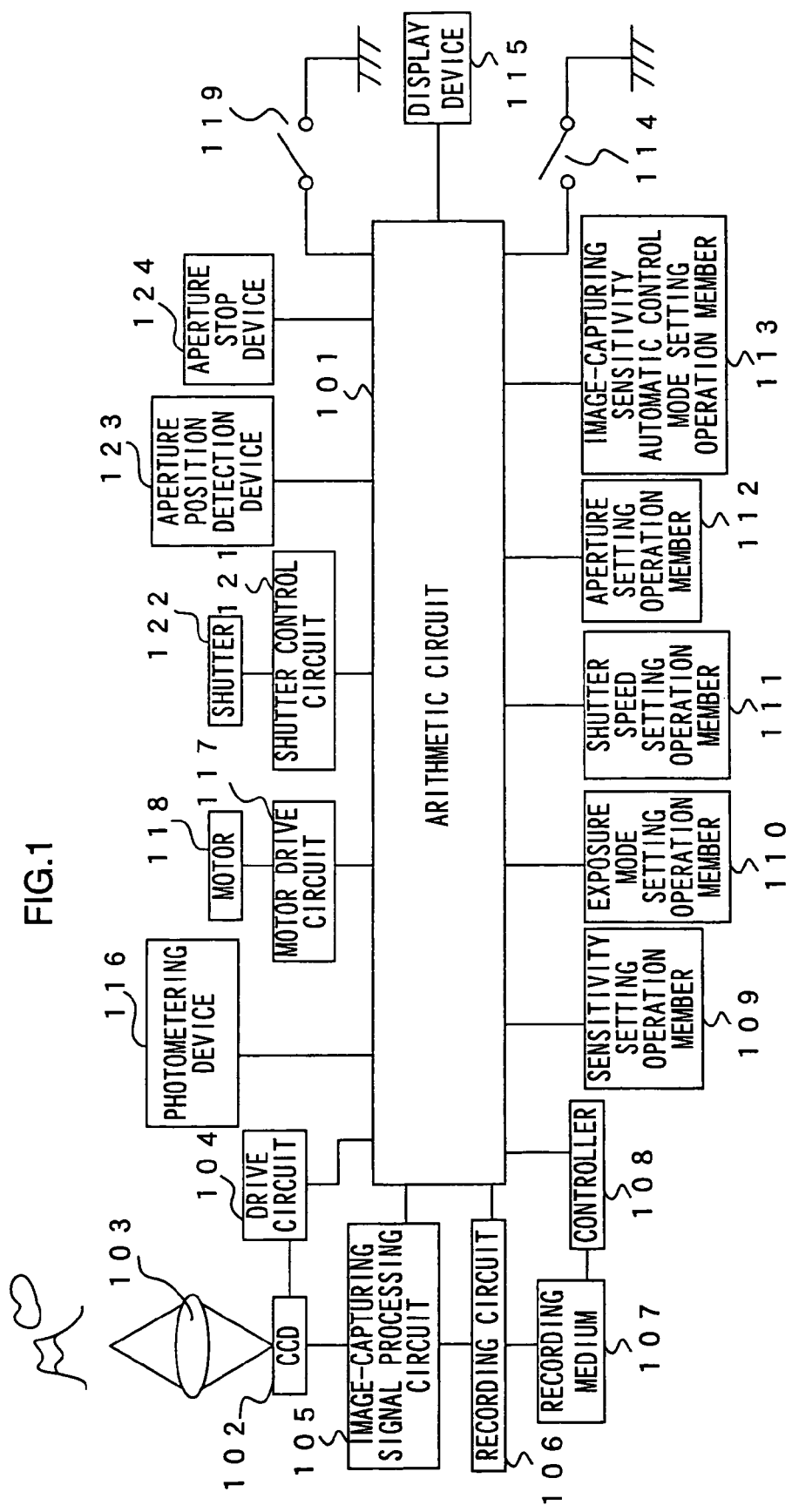
FIG. 1 is a block diagram illustrating the structure adopted in the electronic camera achieved in a first embodiment.

FIG. 1 presents a block diagram showing the structure adopted in the electronic camera achieved in the first embodiment of the present invention. An arithmetic circuit 101 in FIG. 1 is constituted of a microcomputer and the like. The arithmetic circuit 101, to which signals output from individual blocks to be detailed later are input, engages in a specific arithmetic operation and outputs control signals to the blocks based upon the results of the arithmetic operation. A CCD 102 constitutes an image-capturing element. The CCD 102 captures an image formed by subject light having passed through a photographic lens 103 and outputs image-capturing signals to an image-capturing signal processing circuit 105. The CCD 102 is driven with specific operational timing by a drive signal output from a drive circuit 104. The image-capturing sensitivity (exposure sensitivity) of the CCD 102 can be automatically changed in specific steps over a range equivalent to ISO 100~ISO 1600 in an image-capturing sensitivity automatic control mode which is to be detailed later. In addition, the image-capturing sensitivity can be set to a level equivalent to ISO 3200 when the electronic camera is set in a sensitivity boost mode to be detailed later.

The image-capturing signal processing circuit 105 includes a correlated double sampling circuit which removes the reset noise from the image-capturing signals and an A/D conversion circuit which converts the analog image-capturing signals to digital signals. The image data having been digitized at the image-capturing signal processing circuit 105 are output to a recording circuit 106. The image data having undergone the signal processing at the image-capturing signal processing circuit 105 are sequentially input to the recording circuit 106 where they are temporarily stored. A recording medium 107 may be constituted of a flash memory. The image data stored in the recording circuit 106 on a temporary basis are recorded into the recording medium 107, the drive of which is controlled based upon a control signal output from a controller 108.

Through a sensitivity setting operation member 109, an operation signal is output to the arithmetic circuit 101 in response to an image-capturing sensitivity setting operation performed by the user. The arithmetic circuit 101 sets the image-capturing sensitivity for the CCD 102 in conformance to the image-capturing sensitivity setting operation signal. Through the setting operation performed by using the sensitivity setting operation member 109, the image-capturing sensitivity can be manually changed in the specific steps over a range equivalent to ISO 100~ISO 3200. More specifically, the image-capturing sensitivity can be changed in steps equivalent to ISO 100, ISO 200, ISO 400, ISO 800, ISO 1600 and ISO 3200. It is to be noted that in the explanation of the embodiment, the term "sensitivity boost mode" refers to a mode in which the image-capturing sensitivity is set to a level equivalent to ISO 3200. The sensitivity boost mode, which allows the image-capturing sensitivity to be set to a level higher than the normal range (the ISO 100~ISO 1600 range), is suitable for a photographing operation performed in a dark location where full exposure cannot be achieved readily or a photographing operation that needs to be performed at a higher shutter speed, e.g., photographing a sport event held at night time. However, the quality of an image obtained in the sensitivity boost mode tends to be coarse due to a poorer S/N ratio compared to the S/N ratio achieved at a normal image-capturing sensitivity level (within the ISO 100~ISO 1600 range).

In response to an exposure mode setting operation performed by the user, an exposure mode setting operation member 110 outputs a switching operation signal to the arithmetic circuit 101 for switching to a program autoexposure calculation mode (P), an aperture value priority autoexposure calculation mode (A), a shutter speed priority (exposure time length priority) autoexposure calculation mode (S) or a manual exposure calculation mode (M).

In the program autoexposure calculation mode, a control exposure is calculated by allowing the exposure time length and the aperture value to be changed at the image-capturing device 1 in specific combinations so as to achieve the correct exposure. In the aperture value priority autoexposure calculation mode, the control exposure is calculated by allowing the exposure time length to change so as to achieve the correct exposure at the aperture value set by the user. In the exposure time length priority autoexposure calculation mode, the control exposure is calculated by allowing the aperture value to change so as to achieve the correct exposure over the exposure time length that is set by the user. In the manual exposure calculation mode, the deviation of the control exposure calculated based upon the exposure time length and the aperture value that are currently set relative to the correct exposure.

Through a shutter speed setting operation member 111, an operation signal is output to the arithmetic circuit 101 in response to a shutter speed setting operation performed by the user. The arithmetic circuit 101 sets the length of time over which the shutter is to remain open, which is to be detailed later, in conformance to the shutter speed setting operation signal to control the length of exposure time length at the CCD 102. The shutter speed (exposure time length) can be set freely in specific steps over a 1 sec~1/1000 sec range. An aperture setting operation member 112 outputs an operation signal to the arithmetic circuit 101 in response to an aperture setting operation performed by the user. The arithmetic circuit 101 then sets the aperture value to be detailed later in conformance to the aperture setting operation signal. The aperture value can be set freely in specific steps over an F2.8~F22 range.

An image-capturing sensitivity automatic control mode setting operation member 113 outputs an operation signal to the arithmetic circuit 101 in response to an image-capturing sensitivity automatic control mode setting operation performed by the user. The arithmetic circuit 101 sets and clears the image-capturing sensitivity automatic control mode in conformance to the operation signal input thereto. In the image-capturing sensitivity automatic control mode, the control exposure is calculated by automatically changing the image-capturing sensitivity SV in correspondence to the exposure deviation $\Delta EV$ so as to achieve the correct exposure.

The exposure deviation ΔEV represents the difference between the control exposure and the correct exposure. If the image-capturing sensitivity automatic control mode has been cleared, the control exposure is calculated to achieve the correct exposure at the image-capturing sensitivity SV that is current set.

A shutter release switch 114 which interlocks with a shutter release operation button (not shown) outputs a shutter release operation signal to the arithmetic circuit 101. In response to a command issued by the arithmetic circuit 101, a display device 115 displays information indicating whether or not the image-capturing sensitivity automatic control mode has been set, information indicating whether or not the sensitivity boost mode has been set, the image-capturing sensitivity setting and the like. A photometering device 116 detects the subject brightness and outputs a detection signal. A motor drive circuit 117 implements drive control on a sequence motor 118 in response to a command issued by the arithmetic circuit 101. The sequence motor 118, which constitutes a sequence drive device (not shown), causes a mirror (not shown) to move up/down, drives the aperture (not shown) and charges the shutter.

A shutter control circuit 121 implements control individually on the front curtain and the rear curtain (not shown) of a shutter 122 so that they are held and released with correct timing. An aperture position detection device 123 detects the aperture position corresponding to the aperture value and outputs a detection signal to the arithmetic circuit 101. An aperture detention device 124 detains the aperture which is being driven to stop the aperture at a specific aperture value. At a sequence switch 119, which constitutes the sequence drive device (not shown), braking control timing of the sequence motor 118 and the like are generated.

The present invention ensures that the electronic camera cannot be set in the image-capturing sensitivity automatic control mode and the sensitivity boost mode at the same time. In the electronic camera achieved in the first embodiment, (1) the selection of the image-capturing sensitivity automatic control mode is disallowed while the electronic camera is set in the sensitivity boost mode and (2) the selection of the sensitivity boost mode is disallowed while the electronic camera is set in the image-capturing sensitivity automatic control mode.

Figure 2:
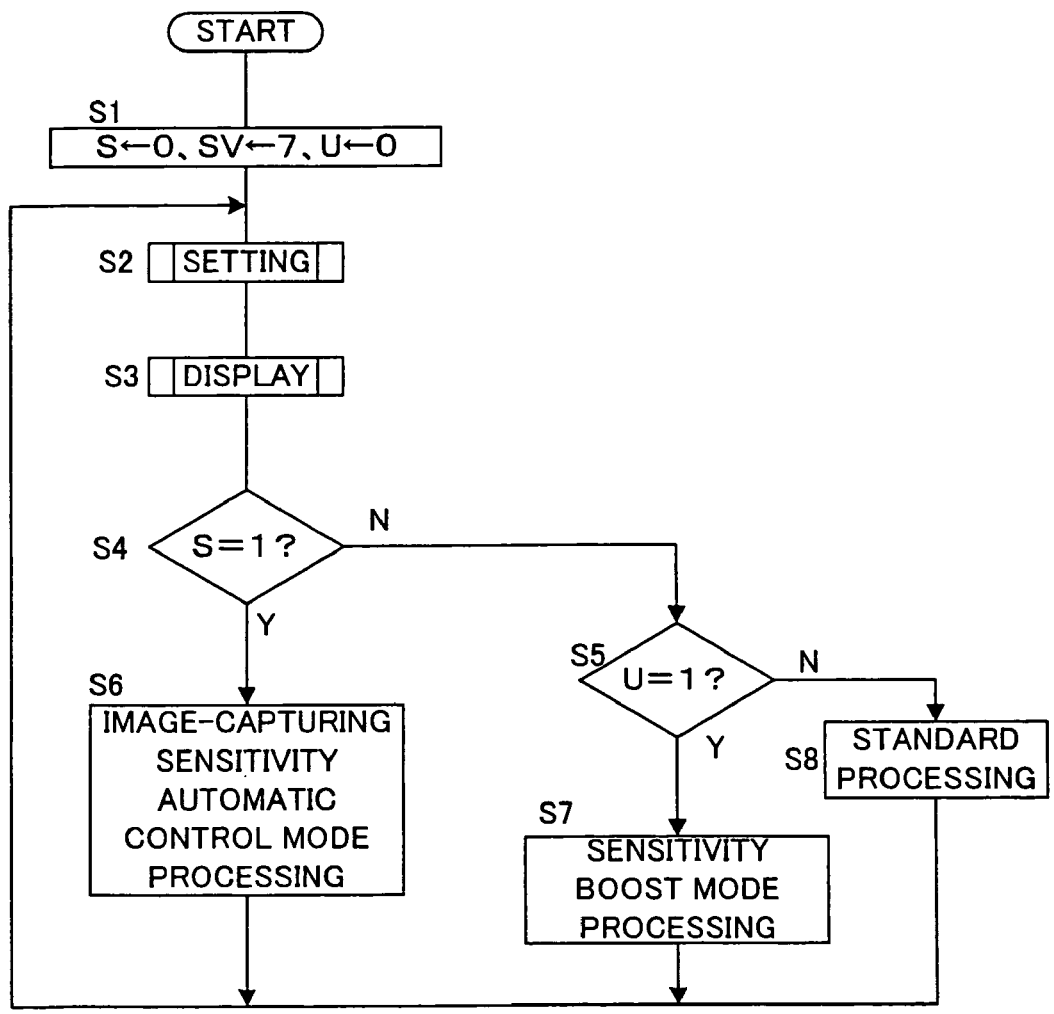
FIG. 2 presents a flowchart of the image-capturing sensitivity change processing executed in the arithmetic circuit.

Now, the image-capturing sensitivity change processing executed in the arithmetic circuit 101 of the electronic camera is explained in reference to the flowchart presented in FIG. 2. The program, the processing of which is executed as shown in the flowchart in FIG. 2, is started up as a battery (not shown) is loaded into the electronic camera. In step S1 in FIG. 2, the arithmetic circuit 101 performs the following initial setting operation. Namely, it sets the sensitivity setting SV to 7 (equivalent to ISO 400), a sensitivity boost mode flag U to 0 and an image-capturing sensitivity automatic control mode flag S to 0, before the operation proceeds to step S2.

In step S1, SV is set by using the apex value. The range for the sensitivity setting SV of the electronic camera in the embodiment is $5 \leq SV \leq 10$, which is equivalent to ISO 100~ISO 3200. As explained earlier, a sensitivity level equivalent to ISO 3200 is set in the sensitivity boost mode. When the sensitivity setting SV is set to a level equivalent to ISO 3200 (when the sensitivity boost mode is selected), the sensitivity boost mode flag U is set to 1, whereas when the sensitivity level is set to a level within the range equivalent to ISO 100~ISO 1600 (when the sensitivity boost mode is cleared), the sensitivity boost mode flag U is set to 0. The image-capturing sensitivity automatic control mode flag S is set to 1 when the electronic camera is set in the image-capturing sensitivity automatic control mode, whereas it is set to 0 when the image-capturing sensitivity automatic control mode is cleared.

In step S2, the arithmetic circuit 101 executes processing to select various settings in conformance to the operation signals input through the individual setting operation members 109~113, before the operation proceeds to step S3. Details of the setting processing are to be provided later. In step S3, the arithmetic circuit 101 performs display processing to display the information indicating whether or not the image-capturing sensitivity automatic control mode has been set, the information indicating whether or not the sensitivity boost mode has been set and the sensitivity setting SV at the display device 115, and then the operation proceeds to step S4. Details of the display processing are to be provided later. In step S4, the arithmetic circuit 101 judges as to whether or not the image-capturing sensitivity automatic control mode flag S is set to 1. If S=1 (the image-capturing sensitivity automatic control mode has been set), the arithmetic circuit 101 makes an affirmative decision in step S4 and then the operation proceeds to step S6, whereas if S=0 (the image-capturing sensitivity automatic control mode has been cleared), the arithmetic circuit 101 makes a negative decision in step S4 before the operation proceeds to step S5.

In step S6, the arithmetic circuit 101 executes the image-capturing sensitivity automatic control mode processing as described below.

(1) If the electronic camera is currently set in the program autoexposure calculation mode (P), the image-capturing sensitivity setting SV is automatically adjusted in correspondence to the exposure deviation ΔEV of the control exposure (AVc+TVc) calculated through the program autoexposure calculation relative to the correct exposure EV. AVc represents the aperture value obtained through calculation and TVc represents the control shutter speed obtained through calculation. The image-capturing sensitivity SV can be adjusted over the range of $5 \leq SV \leq 9$, which is equivalent to ISO 100~ISO 1600.

(2) If the electronic camera is currently set in the shutter speed priority autoexposure calculation mode (S), the image-capturing sensitivity setting SV is automatically adjusted in correspondence to the exposure deviation ΔEV of the control exposure (AVc+TVs) calculated through the shutter speed priority autoexposure calculation relative to the correct exposure EV. AVc represents the control aperture value obtained through calculation and TVs represents the shutter speed set through the shutter speed setting operation member 111. The image-capturing sensitivity SV can be adjusted over the range of $5 \leq SV \leq 9$, which is equivalent to ISO 100~ISO 1600.

(3) If the electronic camera is currently set in the aperture value priority autoexposure calculation mode (A), the image-capturing sensitivity setting SV is automatically adjusted in correspondence to the exposure deviation ΔEV of the control exposure (AVs+TVc) calculated through the aperture value priority autoexposure calculation relative to the correct exposure EV. AVs represents the aperture value set through the aperture value setting operation member 112 and TVc represents the control shutter speed obtained through the calculation. The image-capturing sensitivity SV can be adjusted over the range of $5 \leq SV \leq 9$, which is equivalent to ISO 100~ISO 1600.

(4) If the electronic camera is currently set in the manual exposure calculation mode (M), the image-capturing sensitivity setting SV is automatically adjusted in correspondence to the exposure deviation ΔEV of the control exposure (AVs+TVs) calculated through the manual exposure calculation relative to the correct exposure EV. AVs represents the aperture value set through the aperture value setting operation member 112 and TVs represents the shutter speed set through the shutter speed setting operation member 111. The image-capturing sensitivity SV can be adjusted over the range of 5≦SV≦9, which is equivalent to ISO 100~ISO 1600.

Once the image-capturing sensitivity automatic control mode processing is executed by the arithmetic circuit 101 in step S6, the operation returns to step S2. It is to be noted that the arithmetic circuit 101 executes photographing sequence processing (not shown) when a shutter release operation signal is input through the shutter release switch 114. In step S5, the arithmetic circuit 101 judges as to whether or not the sensitivity boost mode flag U is set to 1. If U=1 (the sensitivity boost mode has been set), the arithmetic circuit 101 makes an affirmative decision in step S5 and the operation proceeds to step S7, whereas if U=0 (the sensitivity boost mode is not selected), a negative decision is made in step S5 before the operation proceeds to step S8.

In step S7, the arithmetic-circuit 101 executes the sensitivity boost mode processing before the operation returns to step S2. The processing performed in the sensitivity boost mode differs from the processing (step S6) executed in the image-capturing sensitivity automatic control mode described above in that the control exposure is calculated by fixing the image-capturing sensitivity setting SV at 10 which is equivalent to ISO 3200.

In step S8, the arithmetic circuit 101 engages in the processing in a standard mode (both the image-capturing sensitivity automatic control mode and the sensitivity boost mode are cleared) before the operation returns to step S2. The processing executed in the standard mode differs from the processing in the image-capturing sensitivity automatic control mode (step S6) in that the control exposure is calculated without changing the image-capturing sensitivity setting SV. For this reason, the standard mode processing may be regarded as processing executed in a fixed image-capturing sensitivity mode.

To summarize, in the electronic camera achieved in the first embodiment, the exposure calculation processing is executed by selecting one of; exposure calculation in the image-capturing sensitivity automatic control mode, exposure calculation in the sensitivity boost mode and exposure calculation in the standard mode.

Figure 3:
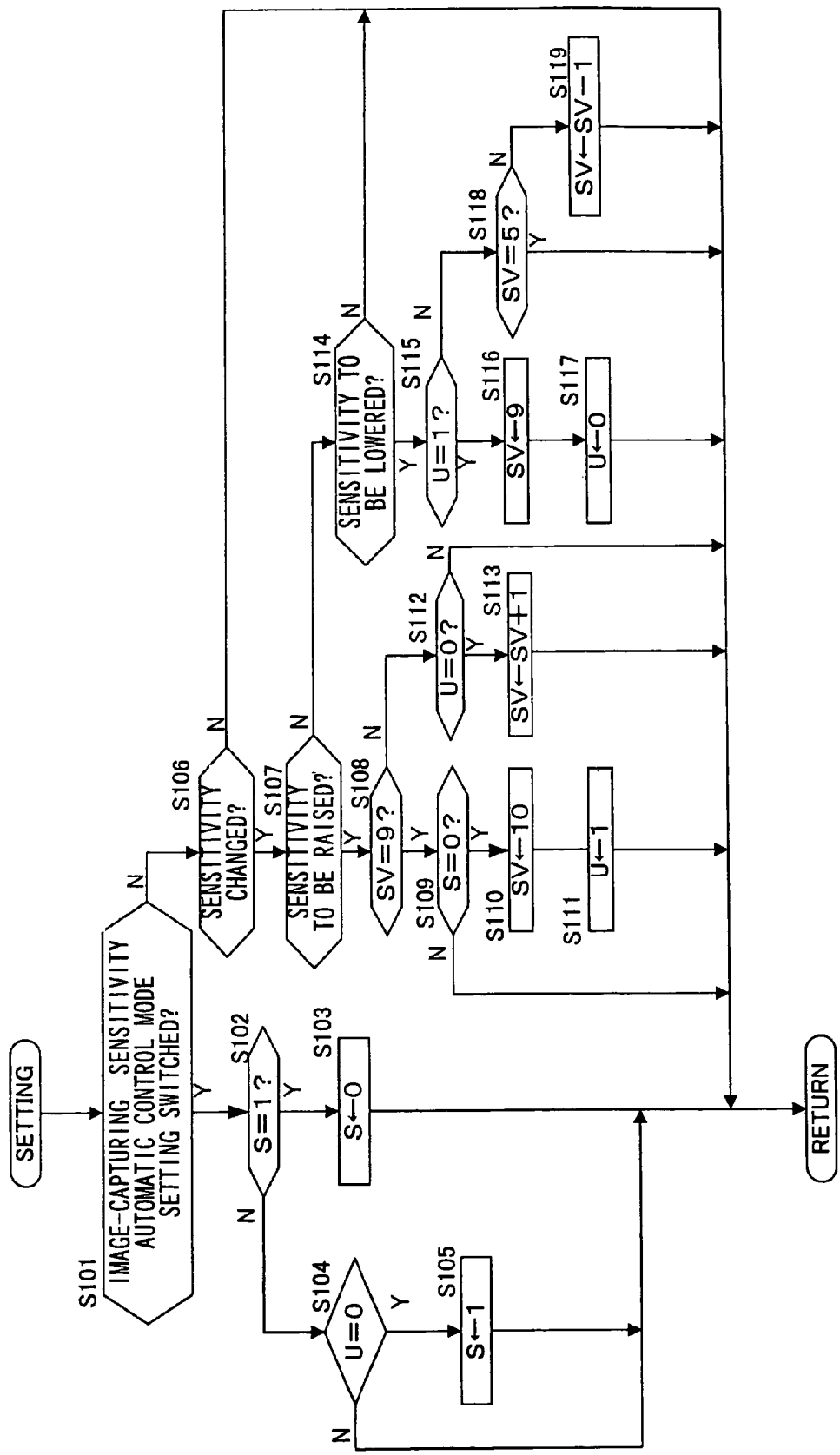
FIG. 3 presents a flowchart of the setting processing executed in the arithmetic circuit.

Now, details of the setting processing executed in step S2 are explained in reference to the flowchart presented in FIG. 3. It is to be noted that once the processing in the flowchart in FIG. 3 ends, the operation proceeds to step S3 in the flowchart in FIG. 2.

In step S101 in the flowchart in FIG. 3, the arithmetic circuit 101 judges as to whether or not the image-capturing sensitivity automatic control mode has been switched. The arithmetic circuit 101 makes an affirmative decision in step S101 if an operation signal has been input through the image-capturing sensitivity automatic control mode setting operation member 113 and, in this case, the operation proceeds to step S102, whereas the arithmetic circuit 101 makes a negative decision in step S101 if no operation signal has been input to proceed to step S106. In step S102, the arithmetic circuit 101 judges as to whether or not the image-capturing sensitivity automatic control mode flag S is set to 1. If S=1 (the image-capturing sensitivity automatic control mode has been set), the arithmetic circuit 101 makes an affirmative decision in step S102 and the operation proceeds to step S103, whereas if S=0 (the image-capturing sensitivity automatic control mode has been cleared), the arithmetic circuit 101 makes a negative decision in step S102 to proceed to step S104.

In step S103, the arithmetic circuit 101 clears the image-capturing sensitivity automatic control mode and also sets 0 for the flag S before the processing in the flowchart presented in FIG. 3 ends. In step S104, the arithmetic circuit 101 judges as to whether or not the sensitivity boost mode flag U is set to 0. If U=0 (the sensitivity boost mode has not been set), the arithmetic circuit 101 makes an affirmative decision in step S104 and, in this case, the operation proceeds to step S105, whereas if U=1 (the sensitivity boost mode has been set), the arithmetic circuit 101 makes a negative decision in step S104 before the processing in the flowchart presented in FIG. 3 ends. As a result, the selection of the image-capturing sensitivity automatic control mode is disallowed if the sensitivity boost mode is currently set. In step S105, the arithmetic circuit 101 sets the electronic camera in the image-capturing sensitivity automatic control mode and also sets 1 for the flag S before the processing in the flowchart presented in FIG. 3 ends.

In step S106, to which the operation proceeds after making a negative decision in step S101, the arithmetic circuit 101 judges as to whether or not the image-capturing sensitivity has been manually adjusted. The arithmetic circuit 101 makes an affirmative decision in step S106 if an operation signal has been input through the sensitivity setting operation member 109 and, in this case, the operation proceeds to step S107, whereas a negative decision is made in step S106 if no operation signal has been input before the processing in the flowchart presented in FIG. 3 ends. In step S107, the arithmetic circuit 101 judges as to whether or not the sensitivity is to be raised. The arithmetic circuit 101 makes an affirmative decision in step S107 if the operation signal input through the sensitivity setting operation member 109 indicates that the sensitivity is to be raised and, in this case, the operation proceeds to step S108, whereas a negative decision is made in step S107 if the operation signal does not indicate an increase in the sensitivity to proceed to step S114.

In step S108, the arithmetic circuit 101 judges as to whether or not the image-capturing sensitivity SV is set to 9. If SV=9 (equivalent to ISO 1600), the arithmetic circuit 101 makes an affirmative decision in step S108 and the operation proceeds to step S109, whereas if SV≠9, a negative decision is made in step S108 and the operation proceeds to step S112. In step S109, the arithmetic circuit 101 judges as to whether or not the image-capturing sensitivity automatic control mode flag S is set to 0. If S=0 (the image-capturing sensitivity automatic control mode has been cleared), the arithmetic circuit 101 makes an affirmative decision in step S109 and the operation proceeds to step S110, whereas if S=1 (the image-capturing sensitivity automatic control mode has been set), it makes a negative decision in step S109 before the processing in the flowchart presented in FIG. 3 ends. As a result, the selection of the sensitivity boost mode is disallowed if the electronic camera is currently set in the image-capturing sensitivity automatic control mode.

In step S110, the arithmetic circuit 101 sets the image-capturing sensitivity SV to 10 (equivalent to ISO 3200) before the operation proceeds to step S111. The electronic camera is thus set in the sensitivity boost mode. In step Sill, the arithmetic circuit 101 sets 1 for the sensitivity boost mode flag U and then the processing in the flowchart presented in FIG. 3 ends.

In step S112, the arithmetic circuit 101 judges as to whether or not the sensitivity boost mode flag U is set to 0. If U=0 (the sensitivity boost mode has not been set), the arithmetic circuit 101 makes an affirmative decision in step S112 and the operation proceeds to step S113, whereas if U=1 (the sensitivity boost mode has been set), the arithmetic circuit 101 makes a negative decision in step S112 before the processing in the flowchart presented in FIG. 3 ends. Thus, it is ensured that the sensitivity is not raised any higher if the sensitivity boost mode is currently set. In step S113, the arithmetic circuit 101 adds 1 to the value of the image-capturing sensitivity SV and then the processing in the flowchart presented in FIG. 3 ends. Through this processing, the image-capturing sensitivity setting is raised by 1 stage.

In step S114, the arithmetic circuit 101 judges as to whether or not the sensitivity is to be lowered. The arithmetic circuit 101 makes an affirmative decision in step S114 if the operation signal input through the sensitivity setting operation member 109 indicates that the sensitivity is to be lowered and, in this case, the operation proceeds to step S115. The arithmetic circuit 101 makes a negative decision in step S114 if the operation signal does not indicate that the sensitivity is to be lowered, and in such a case, the processing in the flowchart presented in FIG. 3 ends.

In step S115, the arithmetic circuit 101 judges as to whether or not the sensitivity boost mode flag U is set to 1. If U=1 (the sensitivity boost mode has been set), the arithmetic circuit 101 makes an affirmative decision in step S115 and the operation proceeds to step S116, whereas if U=0 (the sensitivity boost mode has not been set), the arithmetic circuit 101 makes a negative decision in step S115 to proceed to step S118. In step S116, the arithmetic circuit 101 sets the image-capturing sensitivity to 9 (equivalent to ISO 1600) before the operation proceeds to step S117. Through this processing, the sensitivity boost mode is cleared. In step S117, the arithmetic circuit 101 sets 0 for the flag U and then the processing in the flowchart presented in FIG. 3 ends.

In step S118, the arithmetic circuit 101 judges as to whether or not the image-capturing sensitivity SV is set to 5 (equivalent to ISO 100). The arithmetic circuit 101 makes an affirmative decision in step S118 if SV=5 and the processing in the flowchart presented in FIG. 3 ends. Since the image-capturing sensitivity is already set to the lower limit of the sensitivity setting range in this case, the setting processing ends without further lowering the sensitivity level. However, if SV≠5, the arithmetic circuit 101 makes a negative decision in step S118 and the operation proceeds to step S119. In step S119, the arithmetic circuit 101 subtracts 1 from the value of the image-capturing sensitivity SV before the processing in the flowchart presented in FIG. 3 ends. Through the processing executed in step S119, the image-capturing sensitivity setting is lowered by 1 stage.

Figure 4:
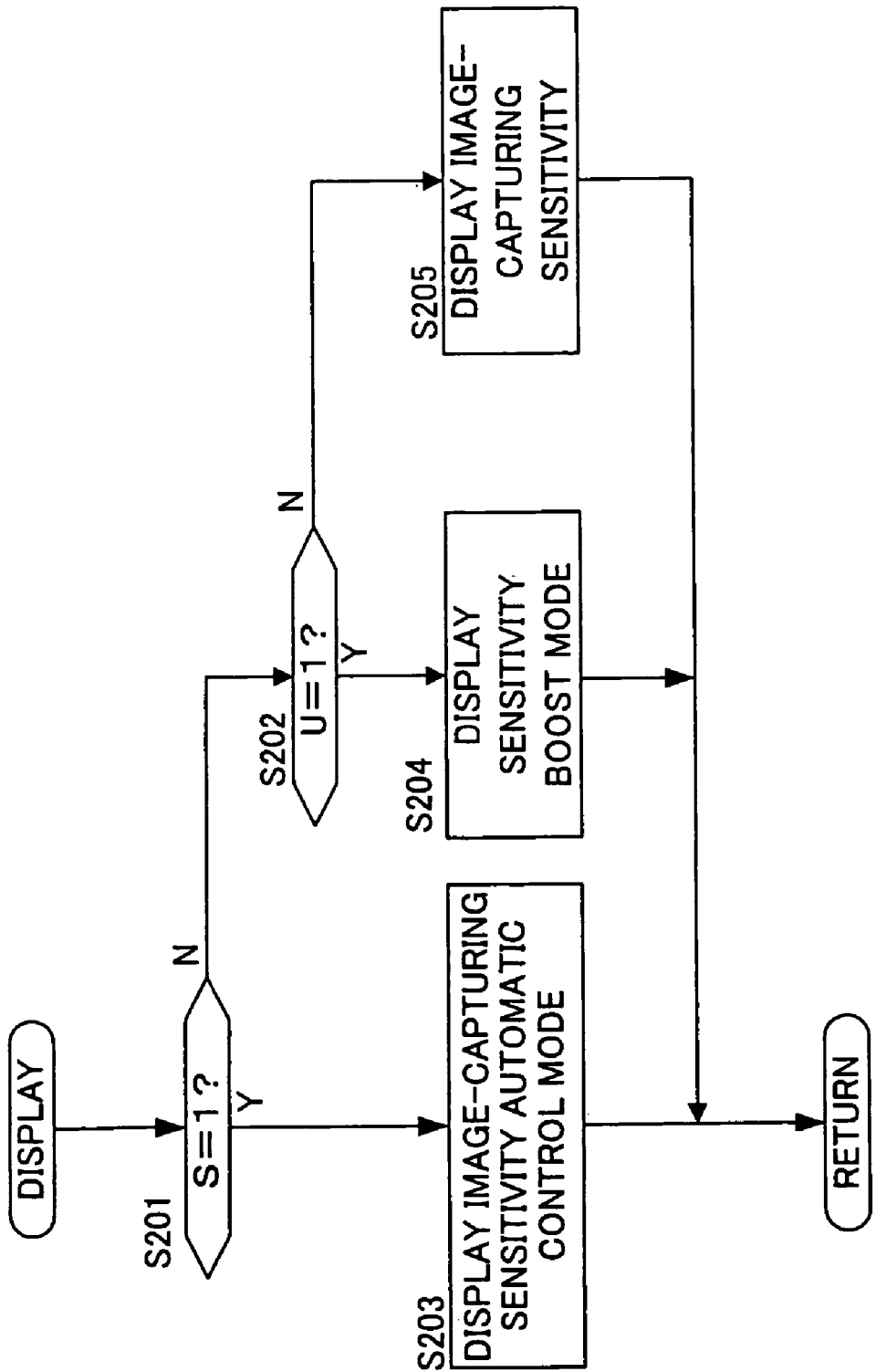
FIG. 4 presents a flowchart of the display processing executed in the arithmetic circuit.

Details of the display processing executed in step S3 in the flowchart presented in FIG. 2 are now explained in reference to the flowchart in FIG. 4. It is to be noted that the operation proceeds to step S4 in the flowchart in FIG. 2 once the processing in the flowchart presented in FIG. 4 ends.

In step 201 in the flowchart in FIG. 4, the arithmetic circuit 101 judges as to whether or not the image-capturing sensitivity automatic control mode flag S is set to 1. If S=1 (the image-capturing sensitivity automatic control mode has been set), the arithmetic circuit 101 makes an affirmative decision in step S201 and the operation proceeds to step S203, whereas if S=0 (the image-capturing sensitivity automatic control mode has been cleared), the arithmetic circuit 101 makes a negative decision in step S201 to proceed to step S202.

In step S203, the arithmetic circuit 101 turns on a display of letters or icons indicating that the image-capturing sensitivity automatic control mode is currently set at the display device 115 and then, the processing in the flowchart presented in FIG. 4 ends. Letters brought up on display at the display device 115 at this time may read, for instance, "ISO Auto".

In step S202, the arithmetic circuit 101 judges as to whether or not the sensitivity boost mode flag U is set to 1. If U=1 (the sensitivity boost mode has been set), the arithmetic circuit 101 makes an affirmative decision in step S202 and the operation proceeds to step S204, whereas if U=0 (the sensitivity boost mode has not been set), the arithmetic circuit 101 makes a negative decision in step S202 to proceed to step S205. In step S204, the arithmetic circuit 101 turns on a display of letters or icons indicating that the sensitivity boost mode is currently set at the display device 115 and then, the processing in the flowchart in FIG. 4 ends. The letters brought up on display at the display device 115 at this time may read, for instance, "ISO HI".

In step S205, the arithmetic circuit 101 turns on a display of letters corresponding to the image-capturing sensitivity setting SV at the display device 115, before the processing in the flowchart presented in FIG. 4 ends. For instance, when SV=7, which is equivalent to ISO 400, the display may read "ISO 400".

As explained above, in the electronic camera in the first embodiment, the exposure calculation processing in the image-capturing sensitivity automatic control mode is enabled if a specific condition is present (if the electronic camera is not currently set in the sensitivity boost mode). Namely, when the electronic camera is set in the sensitivity boost mode, the selection of the image-capturing sensitivity automatic control mode is disallowed, and when the electronic camera is set in the image-capturing sensitivity automatic control mode, the selection of the sensitivity boost mode is disallowed. As a result, either the operation during which the image-capturing sensitivity is adjusted within the range equivalent to ISO 100~ISO 1600 through the image-capturing sensitivity automatic control mode processing (step S6) or the operation executed by setting the image-capturing sensitivity to a level equivalent to ISO 3200 through the sensitivity boost mode processing (step S7) is selectively executed and thus, a conflict of these operations is prevented. In addition, unless the photographer performs a setting change operation, the electronic camera is not switched from the image-capturing sensitivity automatic control mode to the sensitivity boost mode or from the sensitivity boost mode to the image-capturing sensitivity automatic control mode, and thus, the S/N ratio of the image does not change against the intent of the photographer.

In other words, in the electronic camera achieved in the first embodiment, either a first arithmetic operation through which the control exposure is calculated by changing the exposure sensitivity or a second arithmetic operation through which the control exposure is calculated at an exposure sensitivity level set higher than the range over which the exposure sensitivity is adjusted in the first arithmetic operation is selectively executed and thus, these operations are not executed in a conflicting manner.

Second Embodiment

Figure 5:
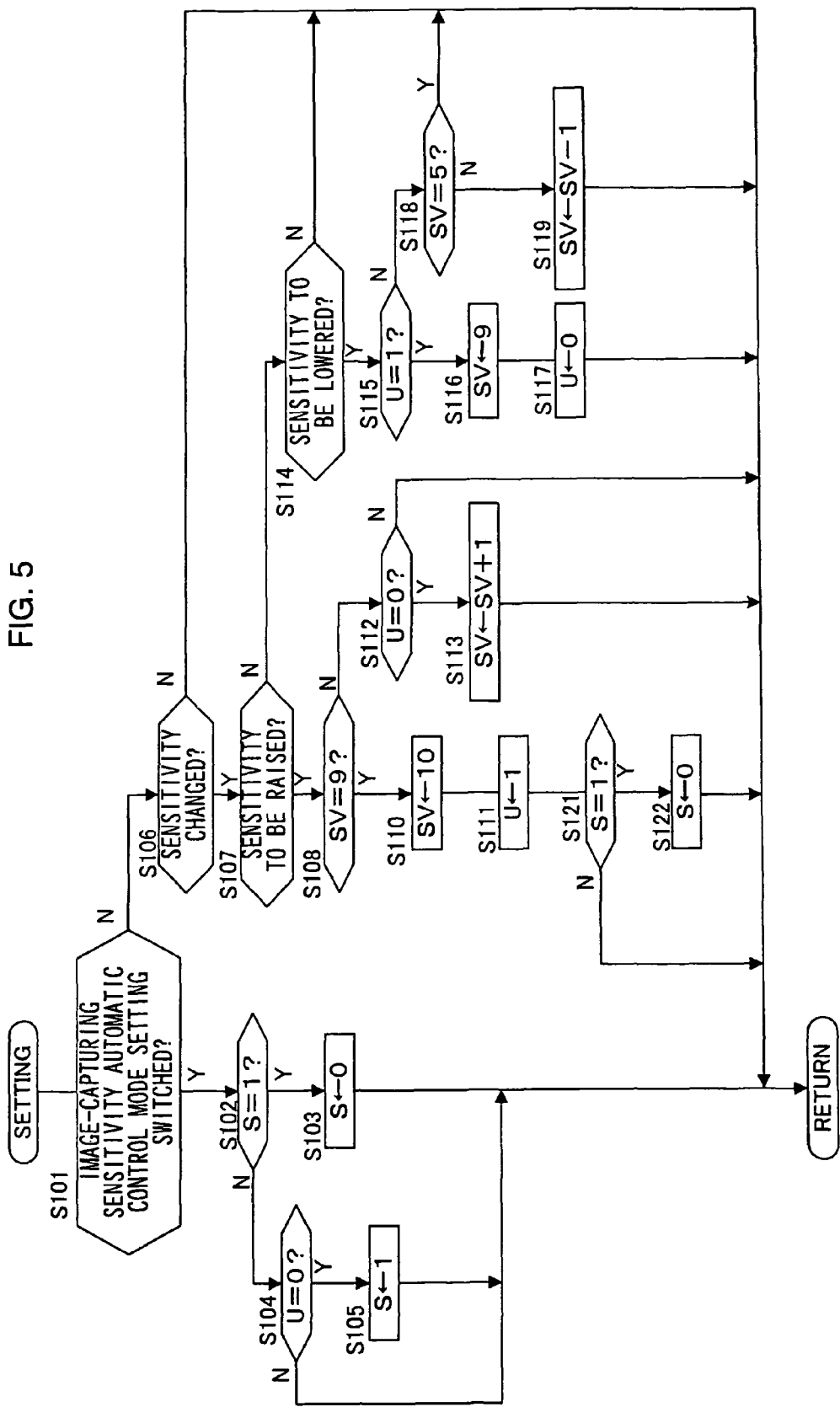
FIG. 5 presents a flowchart of the setting processing executed in the electronic camera achieved in a second embodiment.

In the electronic camera achieved in the second embodiment, if the sensitivity boost mode is selected while the electronic camera is set in the image-capturing sensitivity automatic control mode, the image-capturing sensitivity automatic control mode is cleared. The flowchart presented in FIG. 5 is provided to facilitate an explanation of the setting processing executed in the electronic camera in the second embodiment instead of the setting processing in the flowchart in FIG. 3 explained earlier. The same step numbers are assigned to steps in the flowchart in FIG. 5 in which processing identical to that in the flowchart in FIG. 3 is executed and their explanation is omitted. The processing in the flowchart presented in FIG. 5 differs from the processing in the flowchart in FIG. 3 in that step S109 is omitted and additional steps S121 and S122 are executed.

As the processing in step S109 is omitted, the arithmetic circuit 101 sets the image-capturing sensitivity SV to 10 (equivalent to ISO 3200) in step S110 regardless of whether the image-capturing sensitivity automatic control mode has been set or cleared before the operation proceeds to step S111. Through this processing, the electronic camera is set in the sensitivity boost mode. In step S111, the arithmetic circuit 101 sets 1 for the flag U and then the operation proceeds to step S121.

In step S121, the arithmetic circuit 101 judges as to whether or not the image-capturing sensitivity automatic control mode flag S is set to 1. If S=1 (the image-capturing sensitivity automatic control mode has been set), the arithmetic circuit 101 makes an affirmative decision in step S121 and, in this case, the operation proceeded to step S122, whereas if S=0 (the image-capturing sensitivity automatic control mode has been cleared), the arithmetic circuit 101 makes a negative decision in step S121 and the processing in the flowchart presented in FIG. 5 ends. In step S122, the arithmetic circuit 101 clears the image-capturing sensitivity automatic control mode and also sets 0 for the flag S before the processing in the flowchart presented in FIG. 5 ends.

As explained above, if the sensitivity boost mode is selected while the electronic camera in the second embodiment is set in the image-capturing sensitivity automatic control mode, the image-capturing sensitivity automatic control mode is cleared. As a result, either the operation during which the image-capturing sensitivity is adjusted within the range equivalent to ISO 100~ISO 1600 through the image-capturing sensitivity automatic control mode processing (step S6) or the operation executed by setting the image-capturing sensitivity to a level equivalent to ISO 3200 through the sensitivity boost mode processing (step S7) is selectively executed and thus, a conflict of these operations is prevented.

Third Embodiment

Figure 6:
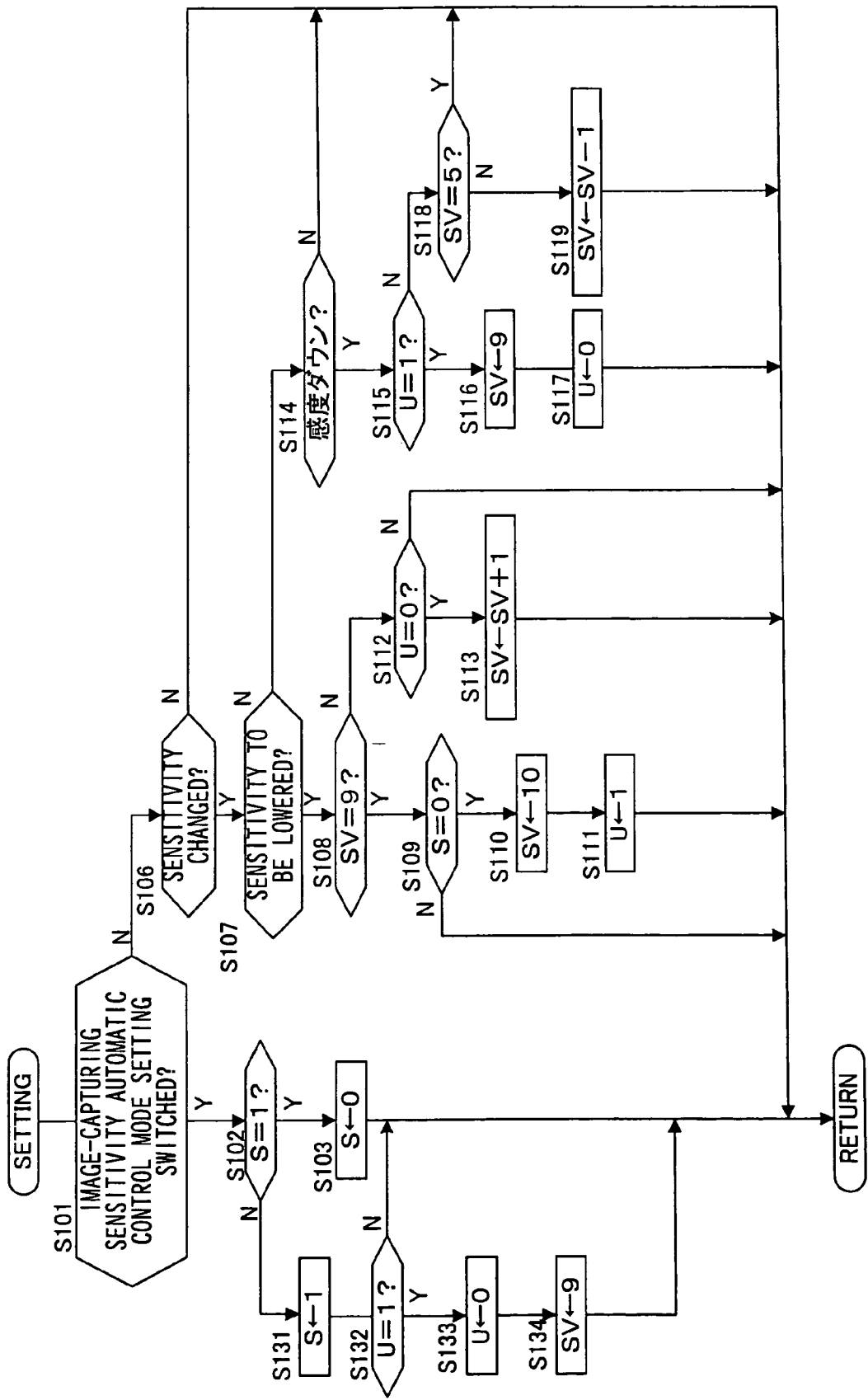
FIG. 6 presents a flowchart of the setting processing executed in the electronic camera achieved in a third embodiment.

In the electronic camera achieved in the third embodiment, if the image-capturing sensitivity automatic control mode is selected while the electronic camera is set in the sensitivity boost mode, the sensitivity boost mode is cleared. The flowchart presented in FIG. 6 is provided to facilitate an explanation of the setting processing executed in the electronic camera in the third embodiment instead of the setting processing in the flowchart in FIG. 3 explained earlier. The same step numbers are assigned to steps in the flowchart in FIG. 6 in which processing identical to that in the flowchart in FIG. 3 is executed and their explanation is omitted. The processing in the flowchart presented in FIG. 6 differs from the processing in the flowchart in FIG. 3 in that steps S104 and S105 are omitted and additional steps S131~S134 are executed.

After making a negative decision in step S102, the arithmetic circuit 101 sets the electronic camera in the image-capturing sensitivity automatic control mode in step S131 regardless of whether the sensitivity boost mode has been set or cleared and also sets 1 for the flag S, before the operation proceeds to step S132. In step S132, the arithmetic circuit 101 judges as to whether or not the sensitivity boost mode flag U is set to 1. If U=1 (the sensitivity boost mode has been set), the arithmetic circuit 101 makes an affirmative decision in step S132 and the operation proceeds to step S133, whereas if U=0 (the sensitivity boost mode has not been set), the arithmetic circuit 101 makes a negative decision in step S132 and the processing in the flowchart presented in FIG. 6 ends.

In step S133, the arithmetic circuit 101 sets 0 for the flag U and then the operation proceeds to step S134. In step S134, the arithmetic circuit 101 sets the image-capturing sensitivity SV to 9 (equivalent to ISO 1600) before the processing in the flowchart presented in FIG. 6 ends. Through this processing, the sensitivity boost mode becomes cleared.

As explained above, if the image-capturing sensitivity automatic control mode is selected while the electronic camera in the third embodiment is set in the sensitivity boost mode, the sensitivity boost mode is cleared. As a result, either the operation during which the image-capturing sensitivity is adjusted within the range equivalent to ISO 100~ISO 1600 through the image-capturing sensitivity automatic control mode processing (step S6) or the operation executed by setting the image-capturing sensitivity to a level equivalent to ISO 3200 through the sensitivity boost mode processing (step S7) is selectively executed and thus, a conflict of these operations is prevented.

Fourth Embodiment

In the electronic camera achieved in the fourth embodiment, the image-capturing sensitivity automatic setting mode is set/cleared by using a sensitivity setting operation member. In the embodiment, the electronic camera does not include the image-capturing sensitivity automatic control mode setting operation member 113 and the sensitivity setting operation member 109 shown in FIG. 1 but includes another operation member, i.e., a sensitivity setting operation member (not shown) (assigned with reference numeral 109A to facilitate the explanation). The sensitivity setting operation member 109A, which may be constituted of, for instance, a dial switch, outputs an operation signal to the arithmetic circuit 101 in response to an image-capturing sensitivity setting operation. The arithmetic circuit 101, in turn, sets the image-capturing sensitivity of the CCD 102 in conformance to the image-capturing sensitivity setting operation signal.

Through the setting operation performed by using the sensitivity setting operation member 109A, the image-capturing sensitivity can be manually adjusted in specific steps over a range equivalent to ISO 100~ISO 3200. In addition, the image-capturing sensitivity automatic control mode can be set or cleared with the sensitivity setting operation member 109A as well. More specifically, the image-capturing sensitivity is cyclically set by rotating the sensitivity setting operation member 109A along the clockwise direction to all levels equivalent to; ISO 100→ISO 200→ISO 400→ISO 800→ISO 1600→ISO 3200→ISO auto→ISO 100 . . . . When the sensitivity setting operation member 109A is rotated along the counterclockwise direction, the image-capturing sensitivity is cyclically set in the reverse order from the above.

When the image-capturing sensitivity setting is at a level equivalent to ISO 3200, the electronic camera is set in the sensitivity boost mode. ISO auto corresponds to the image-capturing sensitivity automatic setting mode. Namely, when ISO auto is selected, the image-capturing sensitivity automatic setting mode is set, whereas when an image-capturing sensitivity level other than ISO auto is selected, the image-capturing sensitivity automatic setting mode is cleared. It is to be noted that the electronic camera is set in the standard mode when the image-capturing sensitivity is set to a level equivalent to neither ISO auto or ISO 3200. Thus, in the electronic camera achieved in the fourth embodiment, one mode among the sensitivity boost mode, the ISO auto mode and the standard mode is selectively set.

Figure 7:
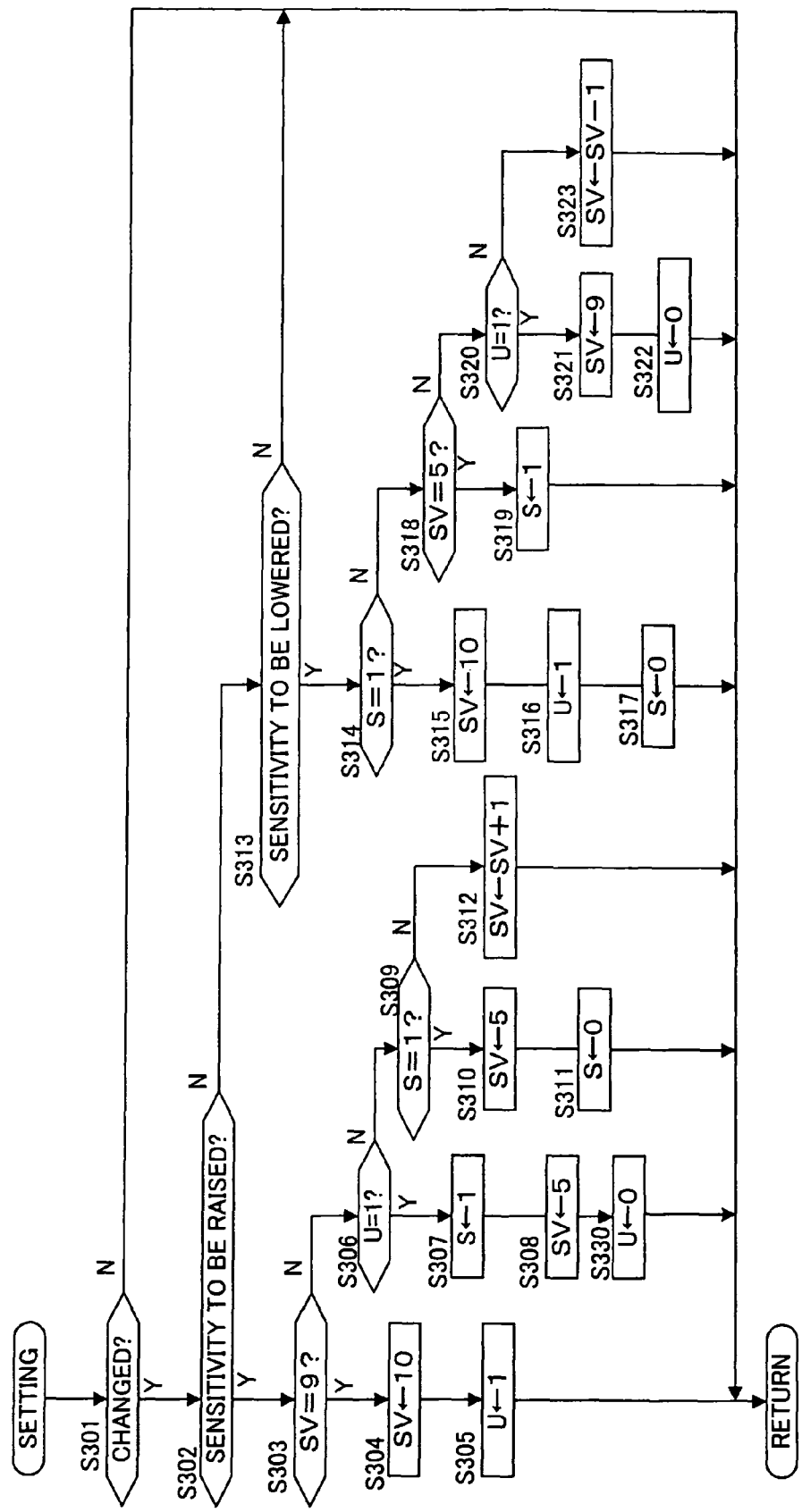
FIG. 7 presents a flowchart of the setting processing executed in the electronic camera achieved in a fourth embodiment.

The flowchart in FIG. 7 is provided to facilitate an explanation of the setting processing executed in the electronic camera in the fourth embodiment instead of the processing in the flowchart in FIG. 3 explained earlier. In step S301 in the flowchart presented in FIG. 7, the arithmetic circuit 101 judges as to whether or not the image-capturing sensitivity has been manually changed. The arithmetic circuit 101 makes an affirmative decision in step S301 if an operation signal has been input through the sensitivity setting operation member 109A and, in this case, the operation proceeds to step S302, whereas a negative decision is made in step S301 if no operation signal has been input before the processing in the flowchart presented in FIG. 7 ends and the operation proceeds to step S3 in FIG. 2.

In step S302, the arithmetic circuit 101 judges as to whether or not the sensitivity is to be raised. The arithmetic circuit 101 makes an affirmative decision in step S302 if the operation signal input through the sensitivity setting operation member 109A indicates that the sensitivity is to be raised and the operation proceeds to step S303, whereas a negative decision is made in step S302 if the operation signal does not indicate an increase in the sensitivity to proceed to step S313.

In step S303, the arithmetic circuit 101 judges as to whether or not the image-capturing sensitivity SV is set to 9 (equivalent to ISO 1600). If SV=9, the arithmetic circuit 101 makes an affirmative decision in step S303 and the operation proceeds to step S304 whereas if SV≠9, a negative decision is made in step S303 and the operation proceeds to step S306. In step S304, the arithmetic circuit 101 sets the image-capturing sensitivity SV to 10 (equivalent to ISO 3200) and then the operation proceeds to step S305. Through this processing, the sensitivity boost mode is set for the electronic camera. In step S305, the arithmetic circuit 101 sets 1 for the flag U and then the processing in the flowchart presented in FIG. 7 ends.

In step S306, the arithmetic circuit 101 judges as to whether or not the sensitivity boost mode flag U is set to 1. If U=1 (the sensitivity boost mode has been set), the arithmetic circuit 101 makes an affirmative decision in step S306 and, in this case, the operation proceeds to step S307, whereas if U=0 (the sensitivity boost mode has not been set), the arithmetic circuit 101 makes a negative decision in step S306 to proceed to step S309. In step S307, the arithmetic circuit 101 sets the electronic camera in the image-capturing sensitivity automatic control mode (ISO auto) and also sets 1 for the flag S before the operation proceeds to step S308. In step S308, the arithmetic circuit 101 sets the image-capturing sensitivity SV to 5 (equivalent to ISO 100) thereby clearing the sensitivity boost mode, and then the operation proceeds to steps S330. In step S330, the arithmetic circuit 101 sets 0 for the flag U before the processing in the flowchart presented in FIG. 7 ends. Through this processing, the sensitivity boost mode becomes cleared so that the exposure calculation is executed at an image-capturing sensitivity level equivalent to ISO 100 in the image-capturing sensitivity automatic control mode and thus, the image-capturing sensitivity setting SV is automatically changed in correspondence to the exposure deviation ΔEV relative to the correct exposure EV.

In step S309, the arithmetic circuit 101 judges as to whether or not the image-capturing sensitivity automatic control mode flag S is set to 1. If S=1 (the image-capturing sensitivity automatic control mode has been set), the arithmetic circuit 101 makes an affirmative decision in step S309 and the operation proceeds to step S310, whereas if S=0 (the image-capturing sensitivity automatic control mode has been cleared), the arithmetic circuit 101 makes a negative decision in step S309 to proceed to step S312. In step S310, the arithmetic circuit 101 sets the image-capturing sensitivity SV to 5 (equivalent to ISO 100) and then the operation proceeds to step S311. In step S311, the arithmetic circuit 101 clears the image-capturing sensitivity automatic control mode and also sets 0 for the flag S before the processing in the flowchart presented in FIG. 7 ends. In step S312, the arithmetic circuit 101 adds 1 to the value of the image-capturing sensitivity SV and then, the processing in the flowchart presented in FIG. 7 ends. Through this processing, the image-capturing sensitivity setting is raised by one stage.

In step S313, to which the operation proceeds after making a negative decision in step S302 described above, the arithmetic circuit 101 judges as to whether or not the sensitivity is to be lowered. The arithmetic circuit 101 makes an affirmative decision in step S313 if the operation signal input through the sensitivity setting operation member 109A indicates that the sensitivity is to be lowered and, in this case, the operation proceeds to step S314, whereas the arithmetic circuit 101 makes a negative decision in step S313 if the operation signal does not indicate that the sensitivity is to be lowered, and in such a case, the processing in the flowchart presented in FIG. 7 ends.

In step S314, the arithmetic circuit 101 judges as to whether or not the image-capturing sensitivity automatic control mode flag S is set to 1. If S=1 (the image-capturing sensitivity automatic control mode has been set), the arithmetic circuit 101 makes an affirmative decision in step S314 and the operation proceeds to step S315, whereas if S=0 (the image-capturing sensitivity automatic control mode has been cleared), the arithmetic circuit 101 makes a negative decision in step S314 to proceed to step S318. In step S315, the arithmetic circuit 101 sets the image-capturing sensitivity SV to 10 (equivalent to ISO 3200) and then the operation proceeds to step S316. Through this processing, the sensitivity boost mode is set for the electronic camera. In step S316, the arithmetic circuit 101 sets 1 for the flag U before the operation proceeds to step S317. In step S317, the arithmetic circuit 101 clears the image-capturing sensitivity automatic control mode and also sets 0 for the flag S before the processing in the flowchart presented in FIG. 7 ends.

In step S318, the arithmetic circuit 101 judges as to whether or not the image-capturing sensitivity SV is set to 5 (equivalent to ISO 100). If SV=5, the arithmetic circuit 101 makes an affirmative decision in step S318 and the operation proceeds to step S319, whereas if SV≠5, the arithmetic circuit 101 makes a negative decision in step S318 to proceed to step S320. In step S319, the arithmetic circuit 101 sets the electronic camera in the image-capturing sensitivity automatic control mode (ISO auto) and also sets 1 for the flag S before the processing in the flowchart presented in FIG. 7 ends. As a result, the exposure calculation is executed at the image-capturing sensitivity level equivalent to ISO 100 in the image-capturing sensitivity automatic control mode so that the image-capturing sensitivity setting SV is automatically adjusted in conformance to the exposure deviation ΔEV relative to the correct exposure EV.

In step S320, the arithmetic circuit 101 judges as to whether or not the sensitivity boost mode flag U is set to 1. If U=1 (the sensitivity boost mode has been set), the arithmetic circuit 101 makes an affirmative decision in step S320 and, in this case, the operation proceeds to step S321, whereas if U=0 (the sensitivity boost mode has not been set), the arithmetic circuit 101 makes a negative decision in step S320 to proceed to step S323. In step S321, the arithmetic circuit 101 sets the image-capturing sensitivity SV to 9 (equivalent to ISO 1600), and then the operation proceeds to step S322. Through the processing described above, the sensitivity boost mode becomes cleared. In step S322, the arithmetic circuit 101 sets 0 for the flag U before the processing in the flowchart presented in FIG. 7 ends.

If the operation proceeds to step S323 after making a negative decision in step S320, the arithmetic circuit 101 subtracts 1 from the value of the image-capturing sensitivity SV and then the processing in the flowchart presented in FIG. 7 ends. Through this processing, the image-capturing sensitivity setting is lowered by one stage.

As explained above, in the electronic camera achieved in the fourth embodiment, the setting/clearing operation for the image-capturing sensitivity automatic setting mode is executed using the sensitivity setting operation member 109A constituted of a dial switch, and one mode among the image-capturing sensitivity automatic setting mode (ISO auto), the sensitivity boost mode (equivalent to ISO 3200) and the standard mode (equivalent to ISO 100~ISO 1600) is selected through the sensitivity setting operation member 109A. Namely, in the electronic camera achieved in the fourth embodiment, one of the following arithmetic operations; a first arithmetic operation through which the control exposure is calculated by changing the exposure sensitivity, a second arithmetic operation through which the control exposure is calculated at an exposure sensitivity setting higher than the range over which the exposure sensitivity can be adjusted in the first arithmetic operation and a third arithmetic operation through which the control exposure is calculated by disallowing any change in the exposure sensitivity is selectively executed. As a result, a conflict of the operation during which the image-capturing sensitivity is adjusted within the range equivalent to ISO 100~ISO 1600 through the image-capturing sensitivity automatic control mode processing (step S6) and the operation executed by setting the image-capturing sensitivity to a level equivalent to ISO 3200 through the sensitivity boost mode processing (step S7) is prevented.

Fifth Embodiment

Figure 8:
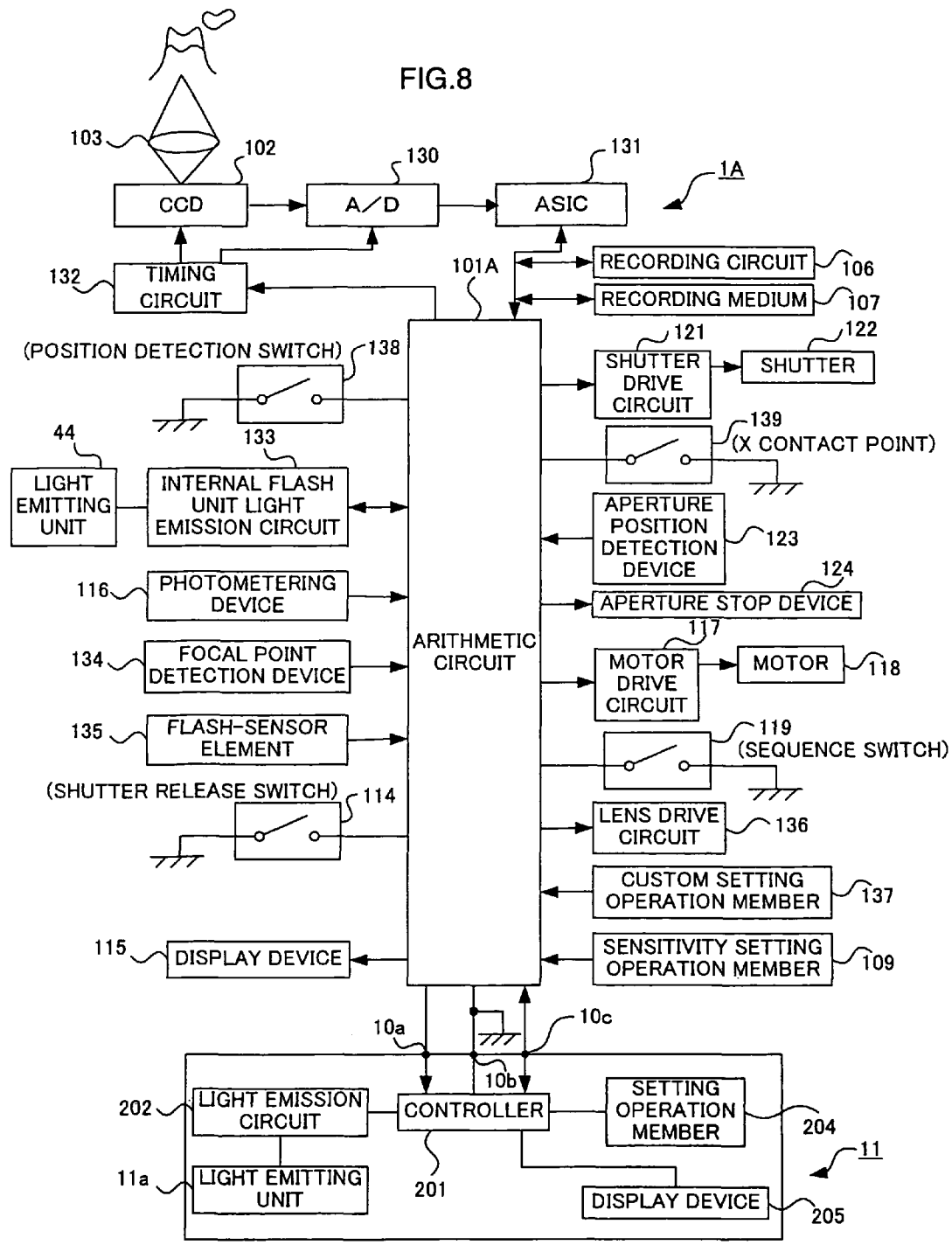
FIG. 8 is a block diagram illustrating the structure adopted in the electronic camera achieved in a fifth embodiment.

FIG. 8 is a block diagram illustrating the structure adopted in an electronic camera 1A achieved in the fifth embodiment. The following explanation focuses on components of the electronic camera 1A assuming structural features different from those in the electronic camera 1 in the first embodiment shown in FIG. 1.

The electronic camera 1A, which includes an internal flash unit, is also mounted with an external flash unit 11 provided at an accessory shoe (not shown). An arithmetic circuit 101A to which signals output from the various blocks are input engages in a specific arithmetic operation and outputs control signals generated based upon the results of the arithmetic operation to the individual blocks. The arithmetic circuit 101A also engages in communication with the external flash unit 11 via a communication circuit (not shown). The CCD 102 captures an image formed by subject light having passed through the photographic lens 103 and outputs image-capturing signals to an A/D conversion circuit 130. The A/D conversion circuit 130 converts the analog image-capturing signals to digital signals. The CCD 102 and the A/D conversion circuit 130 are driven with a specific operational timing by a drive signal output from a timing circuit 132.

An image processing circuit 131 is constituted of, for instance, an ASIC. In addition to image processing such as white balance processing implemented on the image data having undergone the digitization, the image processing circuit 131 executes compression processing for compressing the image data having undergone the image processing in a specific format, decompression processing for decompressing the compressed image data and the like.

A position detection switch 138 is a microswitch which detects whether the internal flash unit (not shown) is at the storage position or has been popped up by a pop-up mechanism (not shown) and thus is at the operating position. A light emitting unit 44 is part of the internal flash unit. The position detection switch 138 outputs an ON signal if the internal flash unit is at the operating position and outputs an OFF signal if the internal flash unit is at the storage position.

An internal flash unit light emission circuit 133 implements light emission control by issuing an instruction for the light emitting unit 44 of the internal flash unit to start or stop a light emission in response to a command issued by the arithmetic circuit 101A. The internal flash unit light emission circuit 133 includes a charge circuit (not shown), starts a charge in response to a command from the arithmetic circuit 101A and outputs a completion signal to the arithmetic circuit 101A once the charge is completed. At this point, a display indicating that the internal flash unit and the external flash unit 11 has been charged is brought up at the display device 115.

A focal point detection device 134 detects the state of the focal point adjustment achieved by the photographic lens 103 and outputs the resulting detection signal to the arithmetic circuit 101A. A flash-sensor element 135 receives light having been emitted from the internal flash unit or the external flash unit 11 and reflected by the subject. The flash-sensor element 135 integrates the light reception signal over time and outputs a time integral value to the arithmetic circuit 101A.

An X contact point switch 139 outputs an ON signal as it is turned on when the front curtain of the shutter 122 completes its run, and outputs an OFF signal as it is turned off while the shutter 122 is being charged.

A lens drive circuit 136 drives the focus lens (not shown) at the photographic lens 103 to cause it to advance or retreat along the optical axis in response to a command issued by the arithmetic circuit 101A in order to change the focal point of the photographic lens 103.

A custom setting operation member 137 outputs an operation signal to the arithmetic circuit 101A in response to a custom setting operation. In response to the custom setting operation signal, the arithmetic circuit 101A sets or clears the image-capturing sensitivity automatic control mode.

The external flash unit 11 includes a controller 201, a light emission circuit 202, a light emitting unit 11a, a setting operation member 204 and a display device 205. As the external flash unit 11 is mounted at the accessory shoe (not shown) at the main body of the camera 1A, the arithmetic circuit 101A at the camera body 1A and the external flash unit 11 become connected with each other via contact point terminals 10a, 10b and 10c. The contact point terminal 10a is a terminal for an X contact point signal generated based upon the on/off state of the X contact point switch 139. The X contact point signal is output to the controller 201 via the contact point terminal 10a when a signal output is allowed by the arithmetic circuit 101A, but the X contact point signal is not output to the controller 201 while the signal output is disallowed. The contact point terminal 10b is a GND terminal for equalizing the electrical ground potentials at the camera main body 1A and the external flash unit 11. The contact point terminal 10c is a communication terminal that enables communication between the camera body 1A and the external flash unit 11.

The controller 201 may be constituted with a microcomputer or the like. The controller 201 executes a specific arithmetic operation by using signals output from the various blocks constituting the external flash unit 11 and input thereto, and outputs control signals to the blocks constituting the external flash unit 11 based upon the results of the arithmetic operation. The controller 201 also engages in communication with the arithmetic circuit 101A via the contact point terminal 10c to receive information indicating a flash output quantity and the like from the arithmetic circuit 101A and to transmit information indicating the light emission mode set at the external flash unit 11 and the like to the arithmetic circuit 101A. In addition, the controller 201 issues a light emission instruction to the light emission circuit 202 when an X contact point ON signal is input thereto via the contact point terminal 10a.

In response to the command issued by the controller 201, the light emission circuit 202 implements light emission control by issuing an instruction for the light emitting unit 11a of the external flash unit 11 to start or stop a light emission. The light emission circuit 202 includes a charge circuit (not shown), starts a charge as the power switch (not shown) at the external flash unit 11 is turned on and outputs a completion signal to the controller 201 when the charge is completed.

The setting operation member 204 is a switch operated to set the light emission mode and the like. The light emission mode includes a TTL auto flash control mode and a manual light emission mode. In the TTL auto flash control mode, illuminating light from the flash unit, which has been reflected by the subject, is received at the flash-sensor element 135 through the lens 103 and the flash output from the flash unit is automatically controlled based upon the quantity of the received light. In the manual light emission mode, light is emitted from the flash unit at the output quantity set through the setting operation member 204.

At the display device 205, a display indicating a charge completion is brought up when a charge of the external flash unit 11 has been completed. Information indicating the current light emission mode setting, too, is displayed at the display device 205.

The electronic camera achieved in the fifth embodiment is characterized in that when it is set in the image-capturing sensitivity automatic control mode, the image-capturing sensitivity is automatically adjusted if a specific condition is present. In more specific terms, the image-capturing sensitivity is automatically adjusted so as to achieve the correct exposure if neither the internal flash unit at the electronic camera 1A nor the flash unit 11 externally mounted at the electronic camera 1A is engaged in operation.

Figure 9:
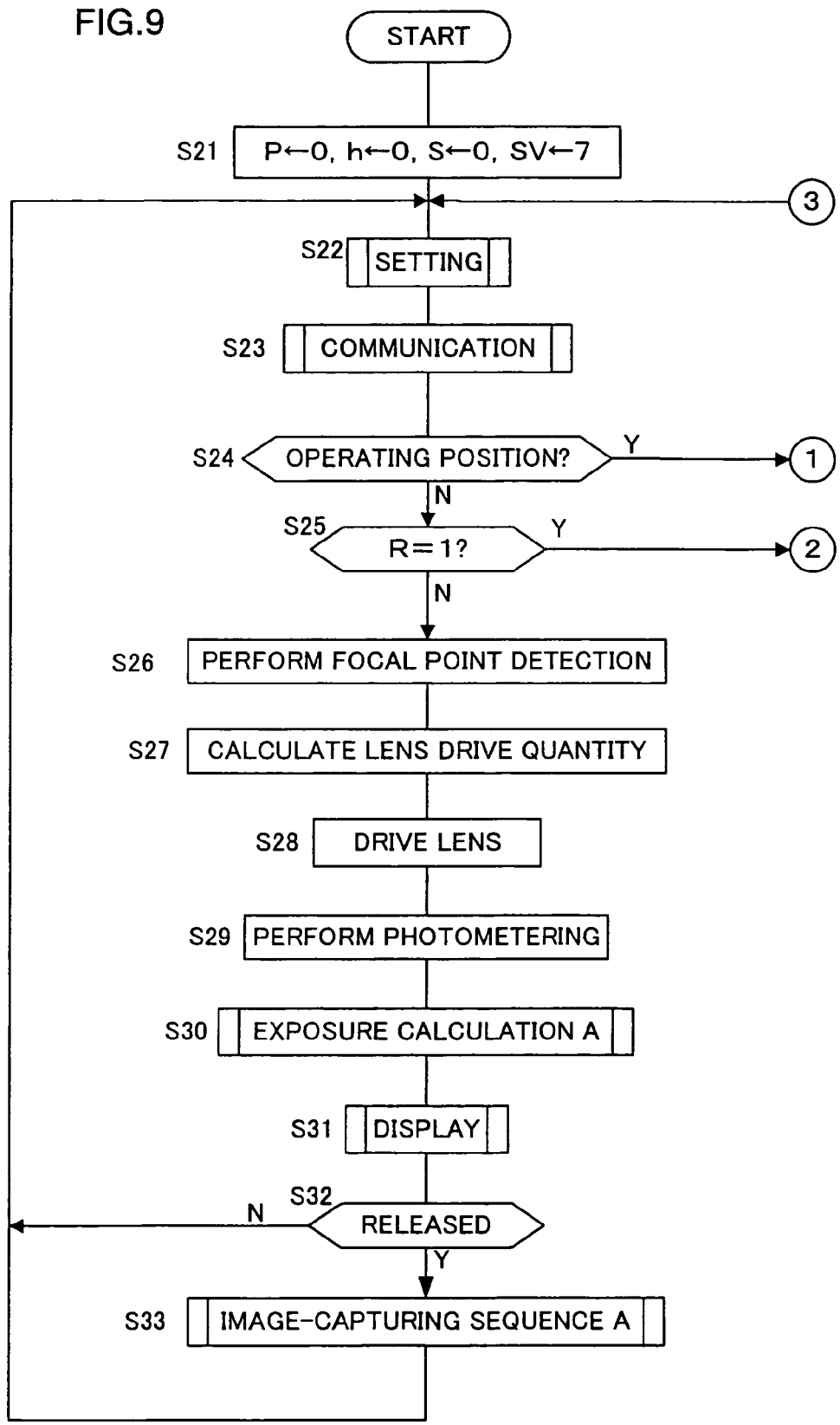
FIG. 9 presents a flowchart of the camera operation processing executed in the arithmetic circuit in the fifth embodiment.
Figure 10:
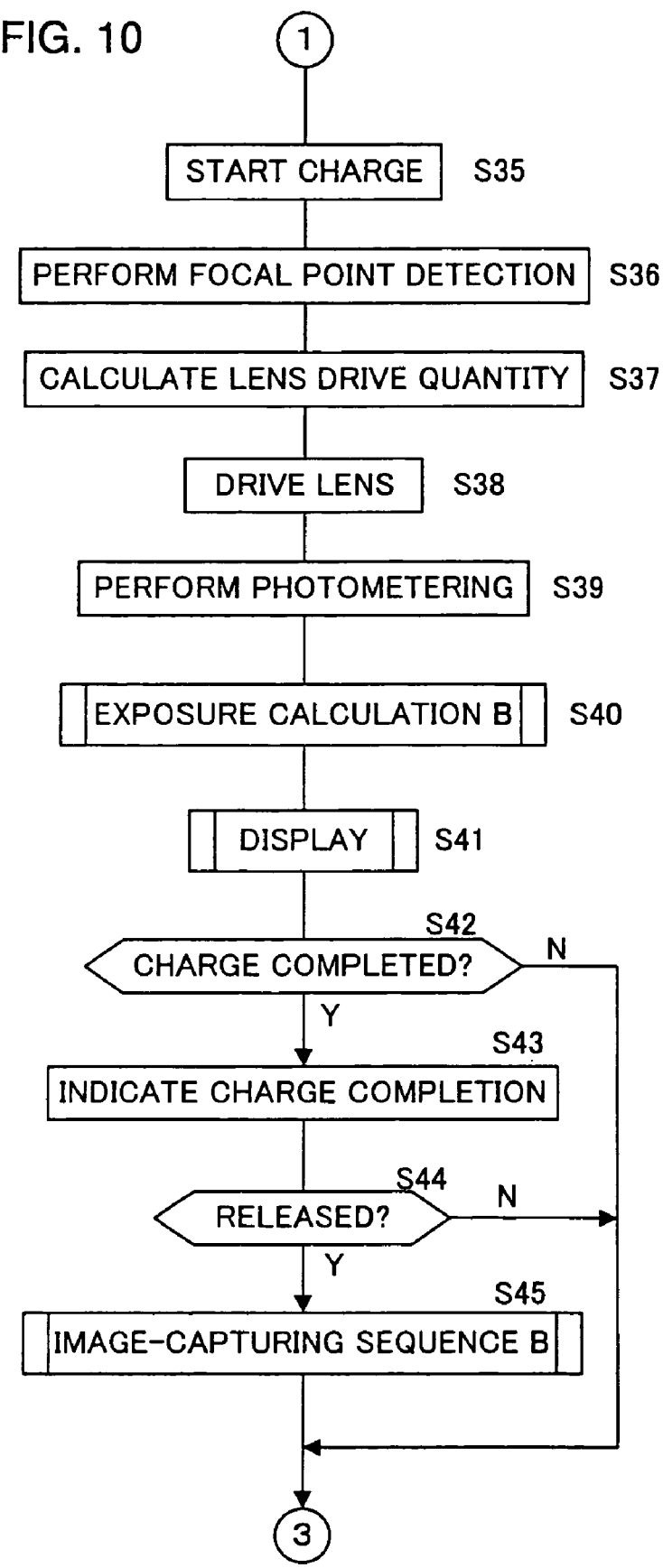
FIG. 10 presents a flowchart of the camera operation processing executed in the arithmetic circuit.
Figure 11:
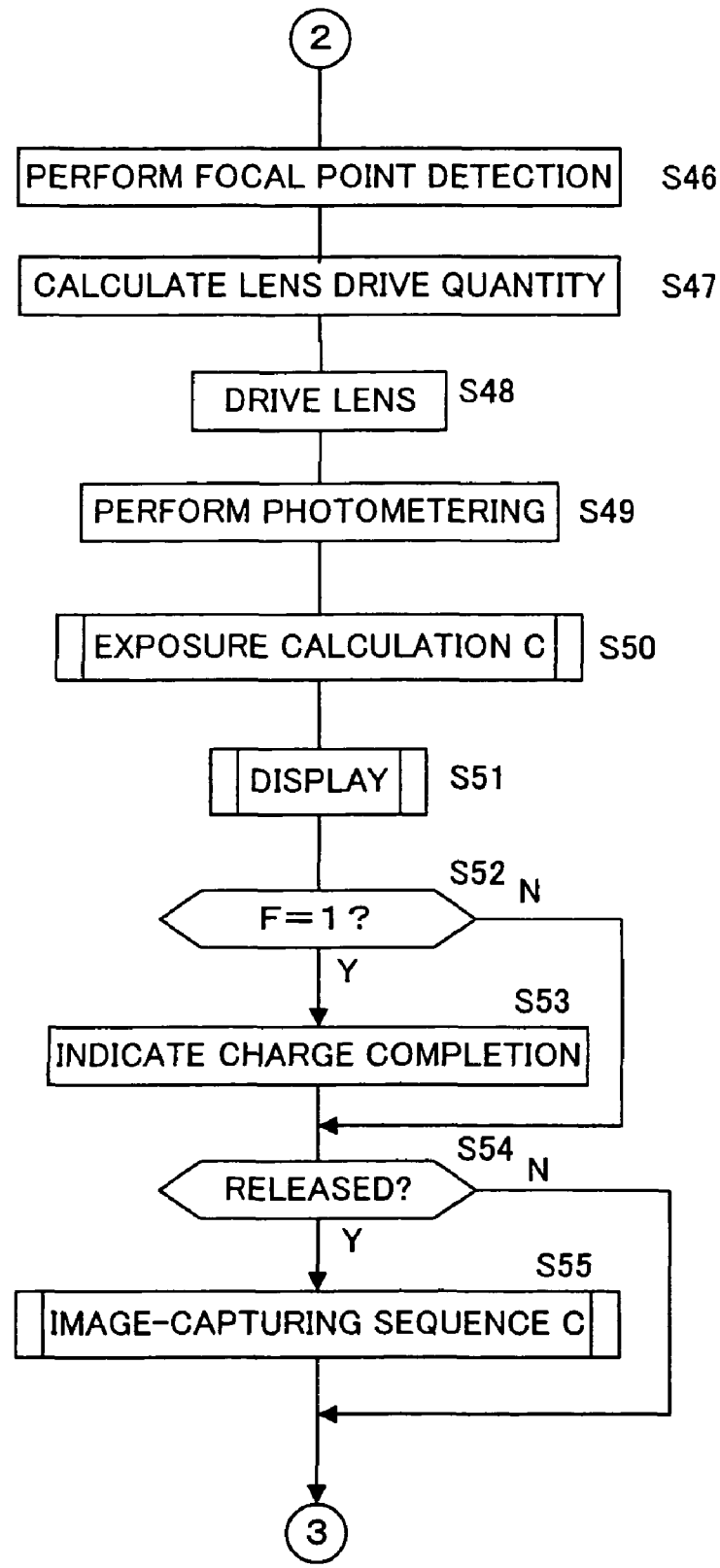
FIG. 11 presents a flowchart of the camera operation processing executed in the arithmetic circuit.

Now, the processing executed in the arithmetic circuit 101A of the electronic camera 1A is explained in reference to the flowcharts presented in FIGS. 9~11. The program for executing the processing in the flowcharts in FIGS. 9~11 is started up as a battery (not shown) is loaded into the electronic camera 1A. The electronic camera 1A engages in three different types of operations described below.
(1) The operation executed when the external flash unit 11 is not mounted at the camera body 1A and the internal flash unit is not utilized either.
(2) The operation executed when the internal flash unit is utilized regardless of whether or not the external flash unit 11 is mounted at the electronic camera body 1A.
(3) The operation executed when the external flash unit 11 mounted at the camera body 1A is utilized and the internal flash unit is not utilized.
The flowcharts presented in FIGS. 9~11 correspond to the operations (1)~(3) described above respectively.

In step S21 in the flowchart presented in FIG. 9, the arithmetic circuit 101A resets a flag P to 0, the main flash output quantity h for the external flash unit 11 to 0, the sensitivity automatic control mode flag S to 0, and the sensitivity setting SV to 7 (equivalent to ISO 400) for initialization before the operation proceeded to step S22. The flag P is used to issue an instruction for the external flash unit 11 with regard to a preliminary light emission, with P=1 indicating that a preliminary light emission is to be performed and P=0 indicating that no preliminary light emission is to be performed. The preliminary light emission may also be referred to as a pre light emission. The preliminary light emission is executed for purposes of flash control through which the flash output h for the main light emission executed during a photographing operation (during a charge storage operation) is calculated. The flash-sensor element 135 described earlier receives light reflected by the subject during the preliminary light emission.

It is to be noted that the sensitivity setting SV can be adjusted within the range of $5 \leqq SV \leqq 9$, equivalent to ISO 100~ISO 1600, as in the first~fourth embodiments.

In step S22, the arithmetic circuit 101A executes setting processing and then the operation proceeds to step S23. Details of the setting processing are to be provided later. In step S23, the arithmetic circuit 101A executes communication processing to communicate with the controller 201 of the external flash unit 11 before the operation proceeds to step S24. The communication processing is to be explained in detail later.

In step S24, the arithmetic circuit 101A judges as to whether or not the internal flash unit is currently set at the operating position. If an OFF signal has been input through the position detection switch 138, the arithmetic circuit 101A makes a negative decision in steps S24 and, in this case, the operation proceeds to step S25, whereas if an ON signal has been input through the position detection switch 138, it makes an affirmative decision in step S24 and proceeds to step S35 in FIG. 10. In other words, the operation proceeds to step S25 if the internal flash unit is at the storage position, and the operation proceeds to step S35 if the internal flash unit has been popped up to the operating position. The arithmetic circuit 101A does not issue an instruction for the internal flash unit light emission circuit 133 to execute a light emission if the internal flash unit is set at the storage position (the arithmetic circuit 101A does not allow light emission).

In step S25, the arithmetic circuit 101A judges as to whether or not a flag R is set to 1. The flag R is set to 1 if communication has been achieved through the communication processing and is set to 0 if communication has not been enabled. If R=0, the arithmetic circuit 101A makes a negative decision in step S25 and the operation proceeds to step S26, whereas if R=1, it makes an affirmative decision in step S25 to proceed to step S46 in FIG. 11. In other words, the operation proceeds to step S26 if the external flash unit 11, having a communication function, is currently not mounted at the camera body 1A, whereas the operation proceeds to step S46 if the external flash unit 11 is currently mounted at the camera body 1A.

The processing executed in steps S26~S33 corresponds to the operation (1) mentioned earlier. In step S26, the arithmetic circuit 101A issues a command for the focal point detection device 134 to detect the state of the focal point adjustment by the photographic lens 103, and then the operation proceeds to step S27. In step S27, the arithmetic circuit 101A calculates the extent to which the focus lens needs to be driven based upon the results of the detection performed by the focal point detection device 134 before the operation proceeds to step S28. In step S28, the arithmetic circuit 101A issues a command for the lens drive device 136 to drive the focus lens at the photographic lens 103 to the focal point, and then the operation proceeds to step S29.

In step S29, the arithmetic circuit 101A performs a photometering operation to detect the quantity of light transmitted through the lens (BV−3) based upon the detection signal input through the photometering device 116 before the operation proceeds to step S30. BV represents the subject brightness. It is to be noted that the transmitted light quantity is calculated by subtracting 3 since the light is transmitted through the photographic lens 103 with an open aperture F2.8 (AV=3). In step S30, the arithmetic circuit 101A engages in exposure calculation processing A which is to be detailed later and then the operation proceeds to step S31. In step S31, the arithmetic circuit 101A executes display processing for the display device 115 and then the operation proceeded to step S32. The display processing is to be explained in detail later.

In step S32, the arithmetic circuit 101A judges as to whether or not the shutter release switch 114 has been operated. The arithmetic circuit 101A makes an affirmative decision in step S32 if an operation signal has been input through the shutter release switch 114 and, in such a case, the operation proceeds to step S33, whereas the arithmetic circuit 101A makes a negative decision in step S32 if no operation signal has been input through the shutter release switch 114 and the operation returns to step S22.

In step S33, the arithmetic circuit 101A executes image-capturing sequence processing A and then the operation returns to step S22. The sequence of the photographing processing thus ends. Details of the image-capturing sequence processing A are to be provided later.

Figure 12:
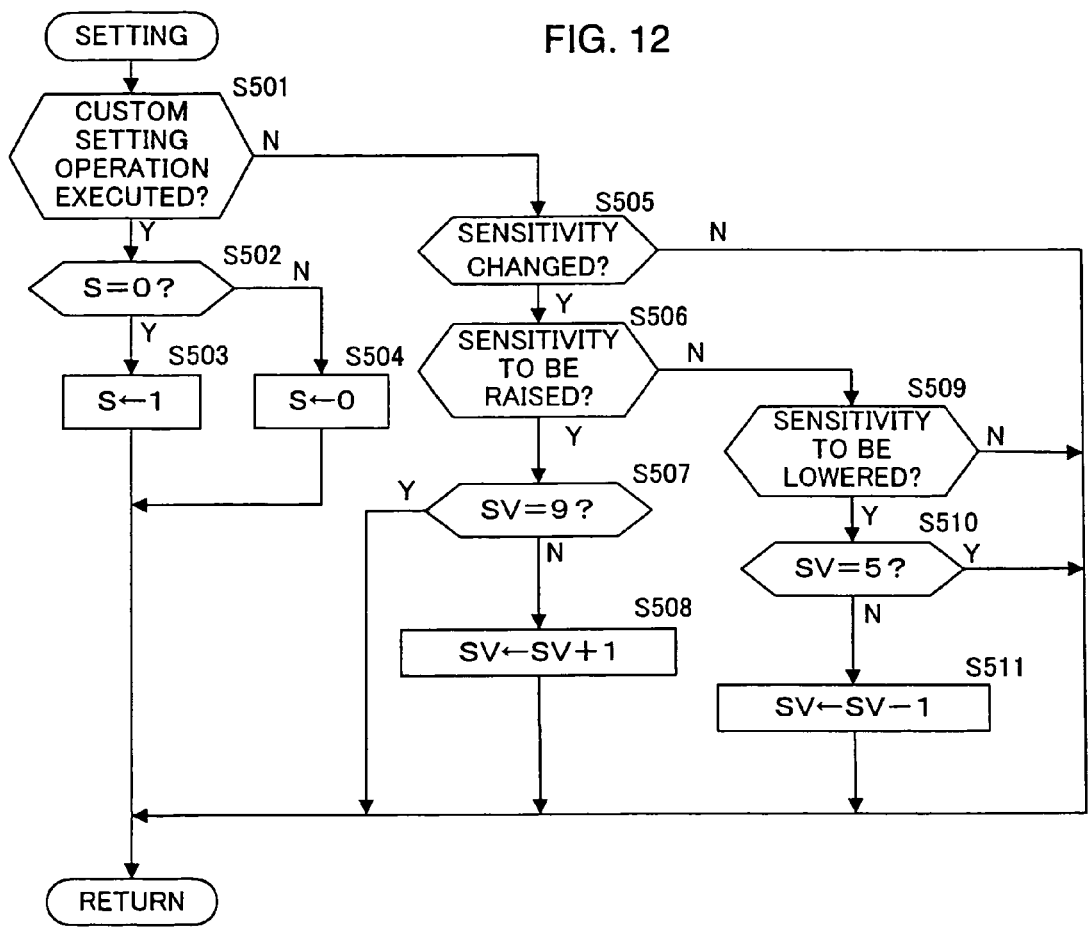
FIG. 12 presents a flowchart of the setting processing executed in the arithmetic circuit.

Now, the setting processing executed in step S22 is explained in detail in reference to the flowchart presented in FIG. 12. It is to be noted that once the processing in the flowchart in FIG. 12 ends, the operation proceeds to step S23 in the flowchart in FIG. 9. In step S501 in the flowchart in FIG. 12, the arithmetic circuit 101A judges as to whether or not a custom setting operation has been performed. The arithmetic circuit 101A makes an affirmative decision in step S501 if an operation signal has been input through the custom setting operation member 137 and the operation proceeds to step S502, whereas the arithmetic circuit 101A makes a negative decision in step S501 if no operation signal has been input through the custom setting operation member 137 to proceed to step S505.

In step S502, the arithmetic circuit 101A judges as to whether or not the sensitivity automatic control mode flag S is set to 0. The arithmetic circuit 101A makes an affirmative decision in step S502 if the flag S is set to 0 (the image-capturing sensitivity automatic control mode has been cleared) and, in this case, the operation proceeds to step S503, whereas it makes a negative decision in step S502 if the flag S is set to 1 (the image-capturing sensitivity automatic control mode has been set) to proceed to step S504. In step S503, the arithmetic circuit 101A sets 1 for the flag S (sets the electronic camera in the image-capturing sensitivity automatic control mode) before the processing in the flowchart presented in FIG. 12 ends. In step S504, the arithmetic circuit 101A sets 0 for the flag S (clears the image-capturing sensitivity automatic control mode), and then the processing in the flowchart presented in FIG. 12 ends.

In step S505, the arithmetic circuit 101A judges as to whether or not an operation to change the image-capturing sensitivity has been performed. The arithmetic circuit 101A makes an affirmative decision in step S505 if an operation signal has been input through the sensitivity setting operation member 109 and the operation proceeds to step S506, whereas the arithmetic circuit 101A makes a negative decision in step S505 if no operation signal has been input through the sensitivity setting operation member 109 and in this case, the processing in the flowchart presented in FIG. 12 ends. In step S506, the arithmetic circuit 101A judges as to whether or not the sensitivity is to be raised. The arithmetic circuit 101A makes an affirmative decision in step S506 if the operation signal from the sensitivity setting operation member 109 indicates that the sensitivity is to be raised and then the operation proceeds to step S507, whereas the arithmetic circuit 101A makes a negative decision in step S506 if the operation signal does not indicate that the sensitivity is to be raised and the operation proceeds to step S509.

In step S507, the arithmetic circuit 101A judges as to whether or not SV is set to 9. If SV=9 (the image-capturing sensitivity setting is equivalent to ISO 1600), the arithmetic circuit 101A makes an affirmative decision in step S507 and the processing in the flowchart presented in FIG. 12 ends. The setting processing ends without raising the sensitivity since the image-capturing sensitivity setting is at the upper limit of the sensitivity setting range. If, on the other hand, SV≠9, the arithmetic circuit 101A makes a negative decision in step S507 and the operation proceeds to step S508. In step S508, the arithmetic circuit 101A adds 1 to the value of the image-capturing sensitivity setting SV before the processing in the flowchart presented in FIG. 12 ends. As a result, the image-capturing sensitivity setting is raised by one stage.

In step S509, the arithmetic circuit 101A judges as to whether or not the sensitivity is to be lowered. The arithmetic circuit 101A makes an affirmative decision in step S509 if the operation signal from the sensitivity setting operation member 109 indicates that the sensitivity is to be lowered and, in this case, the operation proceeds to step S510. However, the arithmetic circuit 101A makes a negative decision in step S509 if the operation signal does not indicate that the sensitivity is to be lowered and the processing in the flowchart presented in FIG. 12 ends.

In step S510, the arithmetic circuit 101A judges as to whether or not SV is set to 5. If SV=5 (the image-capturing sensitivity setting is equivalent to ISO 100), the arithmetic circuit 101A makes an affirmative decision in step S510 and the processing in the flowchart presented in FIG. 12 ends. The setting processing ends without lowering the sensitivity since the image-capturing sensitivity setting is at the lower limit of the sensitivity setting range. If, on the other hand, SV≠5, the arithmetic circuit 101A makes a negative decision in step S510 and the operation proceeds to step S511. In step S511, the arithmetic circuit 101A subtracts 1 from the value of the image-capturing sensitivity setting SV before the processing in the flowchart presented in FIG. 12 ends. As a result, the image-capturing sensitivity setting is lowered by one stage.

Figure 13:
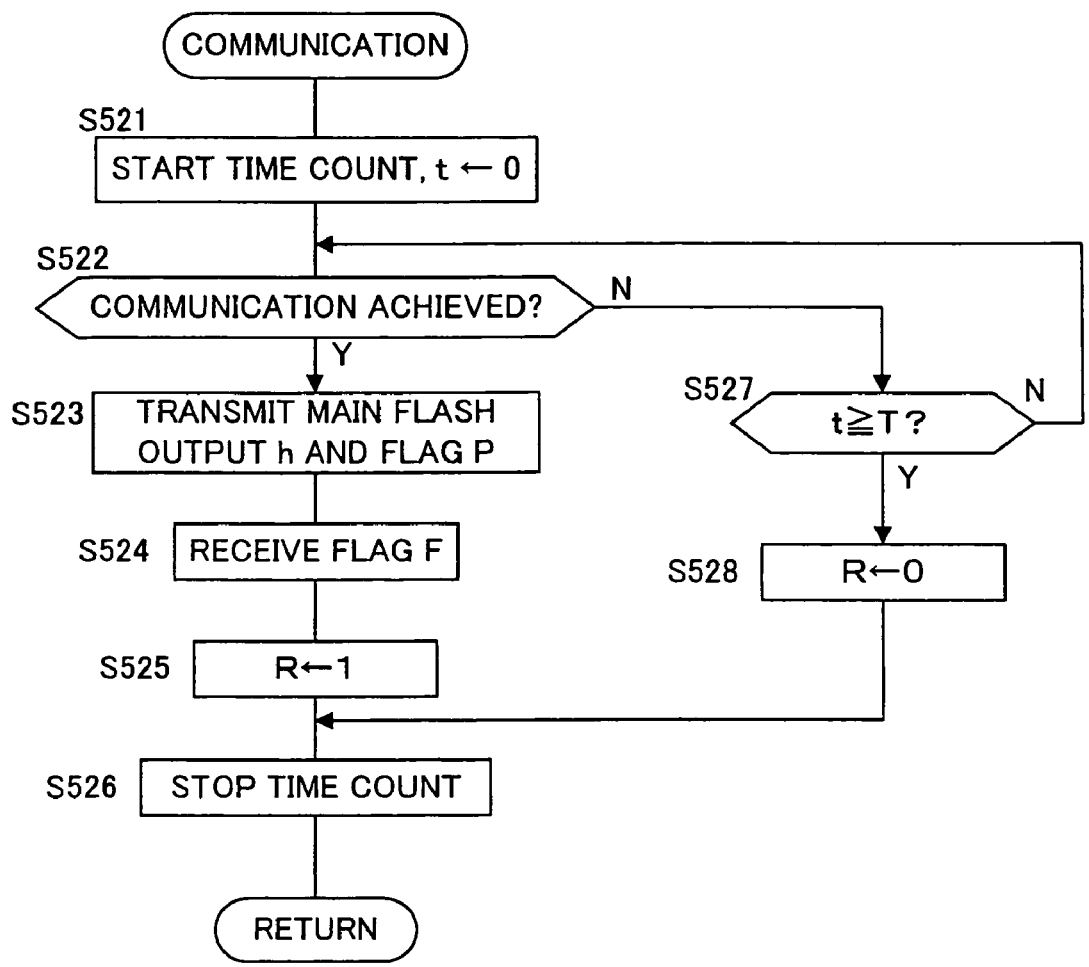
FIG. 13 presents a flowchart of the communication processing executed in the arithmetic circuit.

Now, the processing executed in step S23 in the flowchart presented in FIG. 9, i.e., the communication processing between the camera body 1A and the external flash unit 11, is explained in detail in reference to the flowchart in FIG. 13. In step S521 in FIG. 13, the arithmetic circuit 101A starts a time count over a time length t and then the operation proceeds to step S522. The initial value of t is 0. In step S522, the arithmetic circuit 101A judges as to whether or not communication with the controller 201 has been achieved. The decision as to whether or not communication has been achieved is made by performing a specific protocol check. If communication has been achieved, the arithmetic circuit 101A makes an affirmative decision in step S522 and the operation proceeds to step S523. If, on the other hand, communication has not been achieved, the arithmetic circuit 101A makes a negative decision in step S522 before the operation proceeds to step S527.

In step S523, the arithmetic circuit 101A transmits information indicating the main flash output quantity h and the setting at the flag P to the controller 201, and then the operation proceeds to step S524. In step S524, the arithmetic circuit 101A receives information indicating the value set at a flag F from the controller 201 before the operation proceeds to step S525. The flag F is set to 1 when the charge of the external flash unit 11 is completed and is set to 0 if the charge has not been completed.

In step S525, the arithmetic circuit 101A sets 1 for the flag R and then the operation proceeds to step S526. In step S526, the arithmetic circuit 101A stops the count of the time length t before the processing in the flowchart presented in FIG. 13 ends. In step S527, to which the operation proceeds after making a negative decision in step S522, the arithmetic circuit 101A judges as to whether or not the relationship expressed as t≧T is achieved between the time count t and a specific length of time T. The specific length of time T represents the length of time required for the protocol check. If the relationship expressed as t≧T is achieved, the arithmetic circuit 101A makes an affirmative decision in step S527 and, in this case, the operation proceeds to step S528, whereas the arithmetic circuit 101A makes a negative decision in step S527 if the relationship t≧T is not achieved and the operation returns to step S522. When the operation proceeds to step S528, the external flash unit 11 having the communication function is not mounted, and when the operation returns to step S522, the protocol check is in progress. In step S528, the arithmetic circuit 101A sets 0 for the flag R, and then the operation process to step S526.

Figure 14:
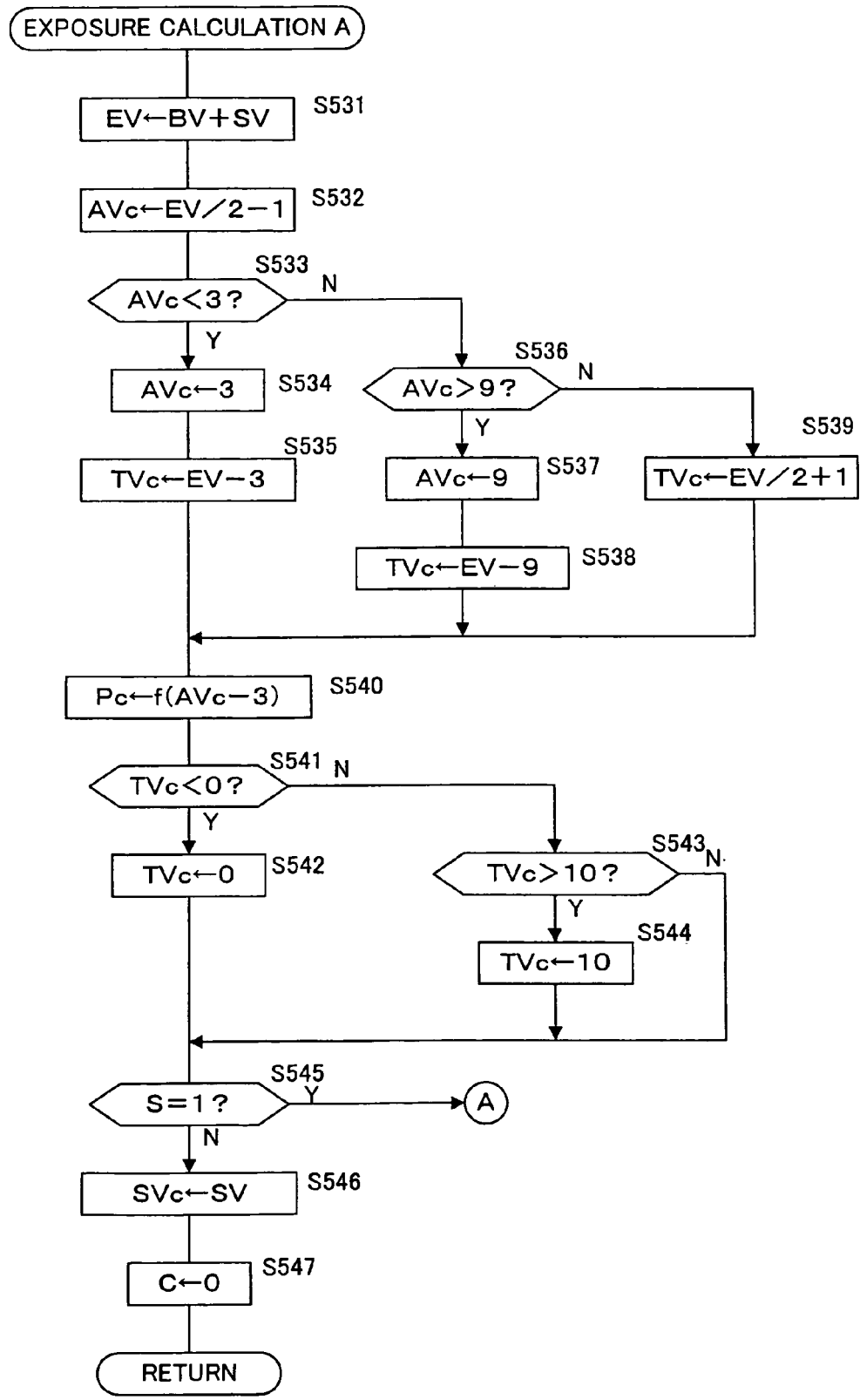
FIG. 14 presents a flowchart of the exposure calculation processing A executed in the arithmetic circuit.
Figure 15:
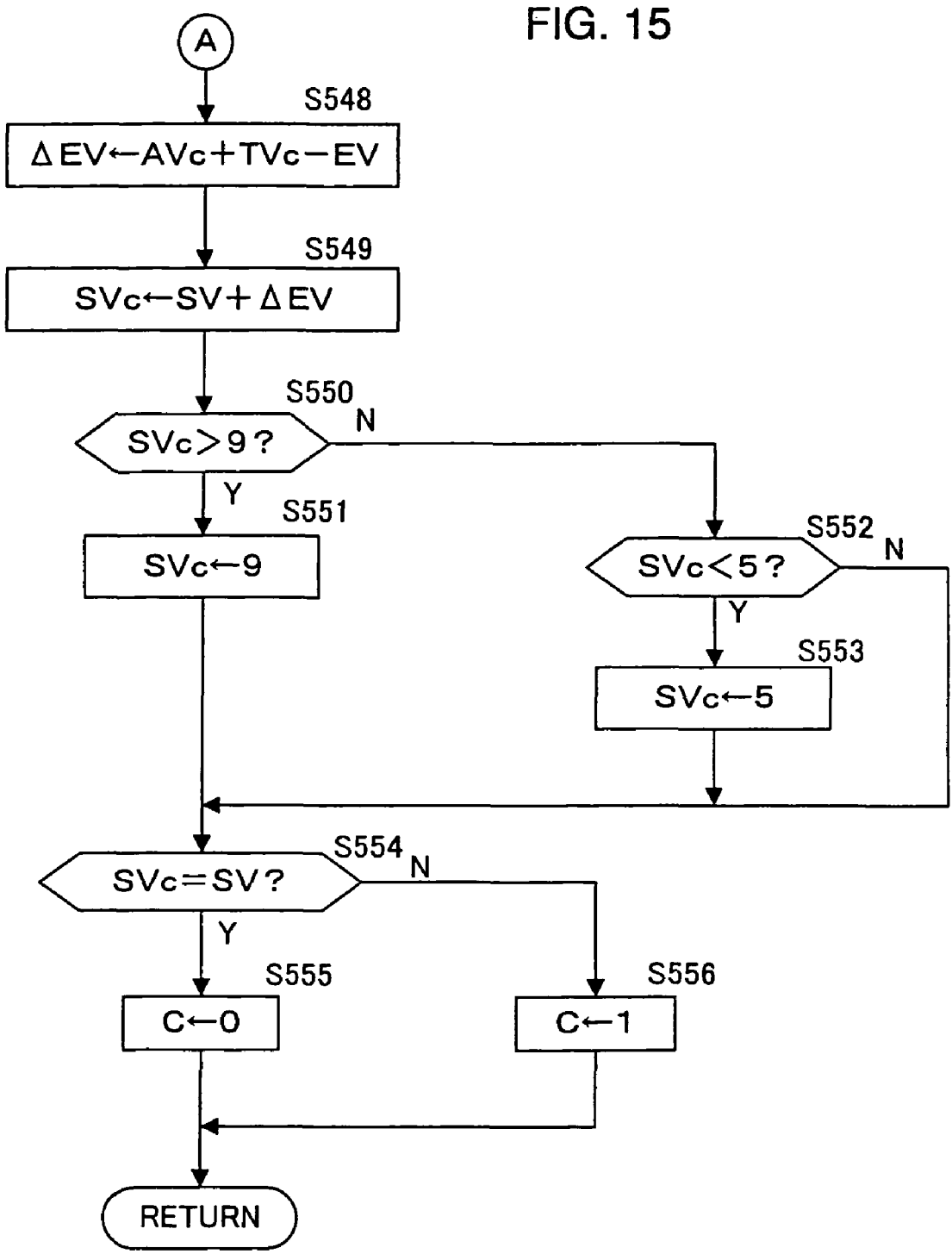
FIG. 15 presents a flowchart of the exposure calculation processing A executed in the arithmetic circuit.

The processing executed in step S30 in the flowchart presented in FIG. 9, i.e., the exposure calculation processing A, is now explained in detail in reference to the flowchart presented in FIGS. 14 and 15. During the exposure calculation processing A, a program autoexposure calculation, for instance, is executed. In the program autoexposure calculation, the control exposure (AVc+TVc) is calculated by using the subject brightness BV and the image-capturing sensitivity setting SV. The range of the control aperture value AVc may be, for instance, 3≦AVc≦9, i.e., F2.8~F22. The range of values that the control shutter speed TVc can assume may be, for instance, 0≦TVc≦10, i.e., 1 sec~1/1000 sec. If the correct exposure cannot be achieved through the program autoexposure calculation, a control image-capturing sensitivity SVc is used instead of the image-capturing sensitivity setting SV. The range of values that the control image-capturing sensitivity SVc can assume may be, for instance, 5≦SVc≦9, i.e., a range equivalent to ISO 100~ISO 1600.

In step S531 in FIG. 14, the arithmetic circuit 101A calculates the subject brightness BV based upon the quantity of light transmitted through the lens (BV–3), and also calculates EV as the sum of BV and SV before the operation proceeded to step S532. It is to be noted that EV represents the exposure value. The image-capturing sensitivity setting SV is the image-capturing sensitivity set through an operation of the sensitivity setting operation member 109. In step S532, the arithmetic circuit 101A calculates the value of AVc by subtracting 1 from EV/2 and then the operation proceeds to step S533. AVc is the control aperture value. In step S533, the arithmetic circuit 101A judges as to whether or not AVc<3 is true. If AVc<3 is true (the control aperture value is smaller than F2.8), the arithmetic circuit 101A makes an affirmative decision in step S533 and the operation proceeds to step S534, whereas if AVc<3 is not true, the arithmetic circuit 101A makes a negative decision in step S533 to proceed to step S536. In step S534, the arithmetic circuit 101A sets 3 for the control aperture value AVc before the operation proceeds to step S535. As a result, the control aperture value is set to F 2.8, which is the lower limit of the control range.

In step S535, the arithmetic circuit 101A calculates TVc by subtracting 3 from EV before the operation proceeds to step S540. It is to be noted that TVc is the control shutter speed. In step S540, the arithmetic circuit 101A calculates a control aperture pulse number Pc as a function f of the number of aperture setting stages (AVc–3) and then the operation proceeds to step S541. The control aperture pulse number Pc represents the number of detection pulses output from the aperture position detection device 123 before the aperture is locked at the control aperture value AVc. While the number of aperture setting stages and the number of aperture pulses are in proportion to each other, the number of aperture detection pulses output from the aperture position detection device 123 increases toward the aperture open setting, and for this reason, the control aperture pulse number Pc is calculated as the function f of the number of aperture setting stages (AVc–3).

In step S541, the arithmetic circuit 101A judges as to whether or not TVc<0 is true. If TVc<0 is true (the control shutter speed is lower than 1 sec), the arithmetic circuit 101A makes an affirmative decision in step S541 and the operation proceeds to steps S542, whereas if TVc<0 is not true, the arithmetic circuit 101A makes a negative decision in step S541 to proceed to step S543. In step S542, the arithmetic circuit 101A sets the control shutter speed TVc to 0 before the operation proceeds to step S545. Through this processing, the control shutter speed is set to 1 sec, which is the lower limit of the control range.

In step S536, to which the operation proceeds after making a negative decision in step S533, the arithmetic circuit 101A judges as to whether or not AVc>9 is true. If AVc>9 is true (the control aperture value is larger than F22), the arithmetic circuit 101A makes an affirmative decision in step S536 and the operation proceeds to step S537, whereas if AVc>9 is not true, the arithmetic circuit 101A makes a negative decision in step S536 to proceed to step S539. In step S537, the arithmetic circuit 101A sets the control aperture value AVc to 9 before the operation proceeds to step S538. As a result, the control aperture value is set to F22 which is the upper limit of the control range. In step S538, the arithmetic circuit 101A calculates TVc by subtracting 9 from EV and then the operation proceeds to step S540. In step S539, the arithmetic circuit 101A calculates TVc by adding 1 to EV/2 before the operation proceeds to step S540.

In step S543, to which the operation proceeds after making a negative decision in step S541, the arithmetic circuit 101A judges as to whether or not TVc>10 is true. If TVc>10 is true (the control shutter speed is higher than 1/1000 sec), the arithmetic circuit 101A makes an affirmative decision in step S543 and the operation proceeds to steps S544, whereas if TVc>10 is not true, the arithmetic circuit 101A makes a negative decision in step S543 to proceed to step S545. In step S544, the arithmetic circuit 101A sets the control shutter speed TVc to 10 before the operation proceeds to step S545. Through this processing, the control shutter speed is set to 1/1000 sec, which is the upper limit of the control range.

In step S545, the arithmetic circuit 101A judges as to whether or not the sensitivity automatic control mode flag S is set to 1. If S=1 (the image-capturing sensitivity automatic control mode has been set), the arithmetic circuit 101A makes an affirmative decision in step S545 and the operation proceeds to step S548 in the flowchart presented in FIG. 15 whereas if S=0 (the image-capturing sensitivity automatic control mode has been cleared), the arithmetic circuit 101A makes a negative decision in step S545 to proceed to step S546. In step S546, the arithmetic circuit 101A sets the value of the image-capturing sensitivity setting SV for the control image-capturing sensitivity SVc and then the operation proceeds to step S547. In step S547, the arithmetic circuit 101A sets 0 for a flag C before the processing in the flowchart presented in FIG. 14 ends, and subsequently, the operation proceeds to step S31 in the flowchart presented in FIG. 9. The flag C is set to 1 if the image-capturing sensitivity has been changed from the image-capturing sensitivity setting SV (SVc≠SV) and is set to 0 if the image-capturing sensitivity is left unchanged from the image-capturing sensitivity setting SV (SVc=SV).

In step S548 in the flowchart presented in FIG. 15, the arithmetic circuit 101A calculates the exposure deviation ΔEV through the formula presented in expression (2) below and then the operation proceeds to step S549.

$$\Delta EV = AVc + TVc - EV \quad (2)$$

In the expression above, (AVc+TVc) represents the control exposure and EV represents the correct exposure.

In step S549, the arithmetic circuit 101A calculates SVc as the sum of SV and ΔEV before the operation proceeds to step S550. As a result, the control image-capturing sensitivity SVc is set to a value different from the value of the image-capturing sensitivity setting SV, so as to achieve the correct exposure. In step S550, the arithmetic circuit 101A judges as to whether or not SVc>9 is true. If SVc>9 is true (the control image-capturing sensitivity is higher than a level equivalent to ISO 1600), the arithmetic circuit 101A makes an affirmative decision in step S550 and, in this case, the operation proceeds to step S551, whereas if SVc>9 is not true, the arithmetic circuit 101A makes a negative decision in step S550 to proceed to step S552. In step S551, the arithmetic circuit 101A sets the control image-capturing sensitivity SVc to 9 before the operation proceeds to step S554. Thus, the control image-capturing sensitivity is set to a level equivalent to ISO 1600 which is the upper limit of the control range.

In step S554, the arithmetic circuit 101A judges as to whether or not SVc=SV is true. If SVc=SV is not true, the arithmetic circuit 101A makes a negative decision in step S554 and the operation proceeds to step S556, whereas the arithmetic circuit 101A makes an affirmative decision in step S554 if SVc=SV is true and, in this case, the operations proceeds to step S555. In step S556, the arithmetic circuit 101A sets 1 for the flag C before the processing in the flowchart presented in FIG. 15 ends, and subsequently, the operation proceeds to step S31 in the flowchart in FIG. 9. In step S555, the arithmetic circuit 101A sets 0 for the flag C before the processing in the flowchart presented in FIG. 15 ends, and subsequently, the operation proceeds to step S31 in the flowchart in FIG. 9.

In step S552, to which the operation proceeds after making a negative decision in step S550 as described above, the arithmetic circuit 101A judges as to whether or not SVc<5 is true. If SVc<5 is true (the control image-capturing sensitivity is lower than a level equivalent to ISO 100), the arithmetic circuit 101A makes an affirmative decision in step S552 and, in this case, the operation proceeds to step S553, whereas if SVc<5 is not true, it makes a negative decision in step S552 to proceed to step S554. In step S553, the arithmetic circuit 101A sets the control image-capturing sensitivity SVc to 5 before the operation proceeds to step S554. Thus, the control image-capturing sensitivity is set to a level equivalent to ISO 100 which is the lower limit of the control range.

Figure 16:
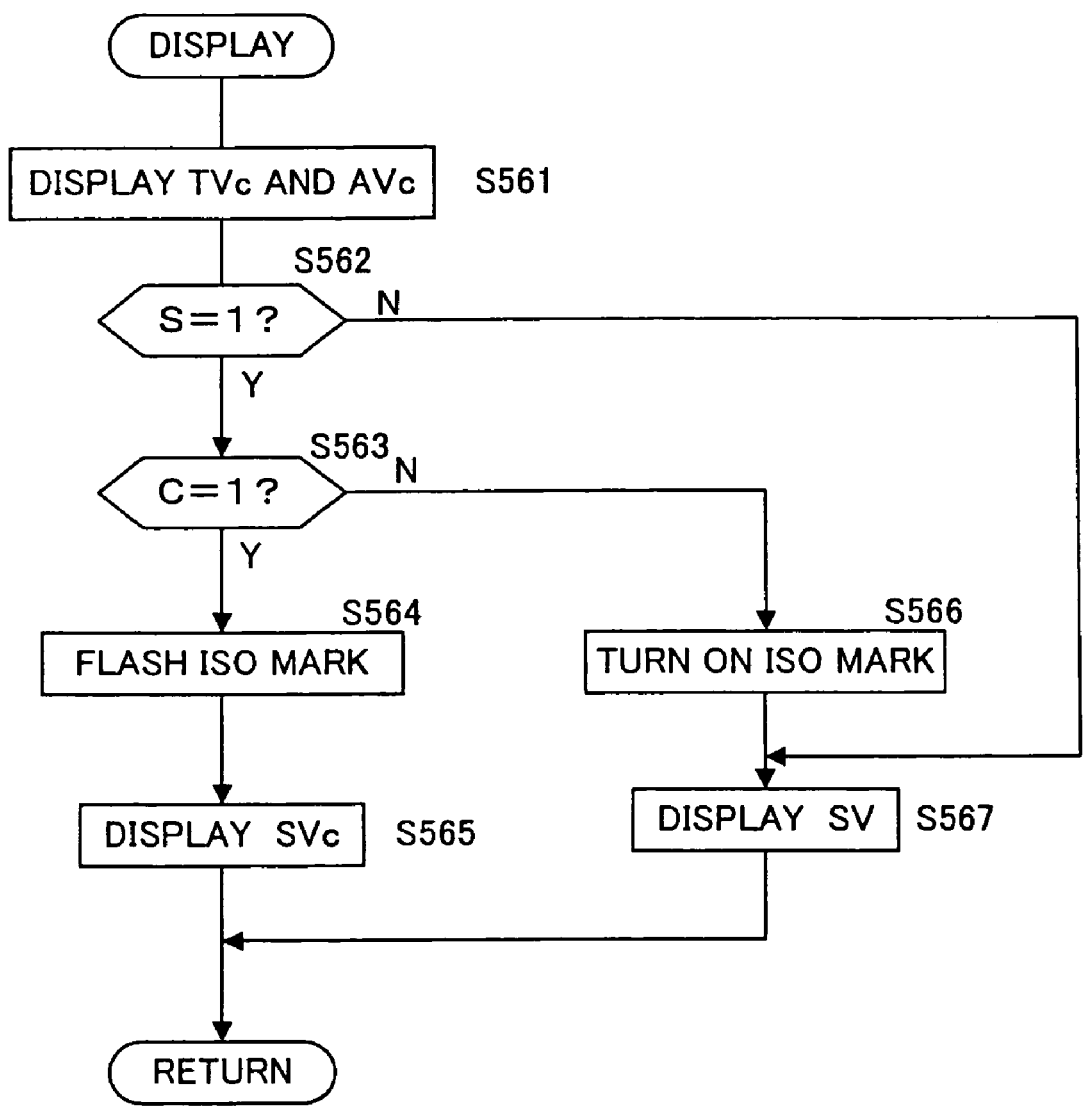
FIG. 16 presents a flowchart of the display processing executed in the arithmetic circuit.

The processing executed in step S31 in the flowchart presented in FIG. 9, i.e., the display processing, is now explained in detail in reference to the flowchart presented in FIG. 16. It is to be noted that once the processing in the flowchart in FIG. 16 is completed, the operation proceeds to step S32 in the flowchart in FIG. 9.

In step S561 in FIG. 16, the arithmetic circuit 101A turns on a display of the control shutter speed TVc and the control aperture value AVc at the display device 115 and then the operation proceeds to step S562. At the display device 115, the shutter speed value and the F value corresponding to the apex values of the control shutter speed and the control aperture value are displayed. In step S562, the arithmetic circuit 101A judges as to whether or not the sensitivity automatic control mode flag S is set to 1. If S=1 (the image-capturing sensitivity automatic control mode has been set), the arithmetic circuit 101A makes an affirmative decision in step S562 and the operation proceeds to step S563, whereas if S=0 (the image-capturing sensitivity automatic control mode has been cleared), the arithmetic circuit 101A makes a negative decision in step S562 to proceed to step S567.

In step S563, the arithmetic circuit 101A judges as to whether or not the flag C is set to 1. If C=1 (SVc≠SV), the arithmetic circuit 101A makes an affirmative decision in step S563 and the operation proceeds to step S564, whereas if C=0 (SVc=SV), the arithmetic circuit 101A makes a negative decision S563 to proceed to step S566.

In step S564, the arithmetic circuit 101A brings up a flashing display of letters "ISO" or an equivalent mark at the display device 115 before the operation proceeds to step S565. In step S565, the arithmetic circuit 101A brings up the ISO value corresponding to the apex value of the control image-capturing sensitivity SVc into the display at the display device 115 before the processing in the flowchart presented in FIG. 16 ends. In step S566, the arithmetic circuit 101A turns on a flashing display of the letters "ISO" or an equivalent mark at the display device 115 before the operation proceeds to step S567. In step S567, the arithmetic circuit 101A brings up the ISO value corresponding to the apex value of the image-capturing sensitivity setting SV into the display at the display device 115 before the processing in the flowchart presented in FIG. 16 ends.

Figure 17:
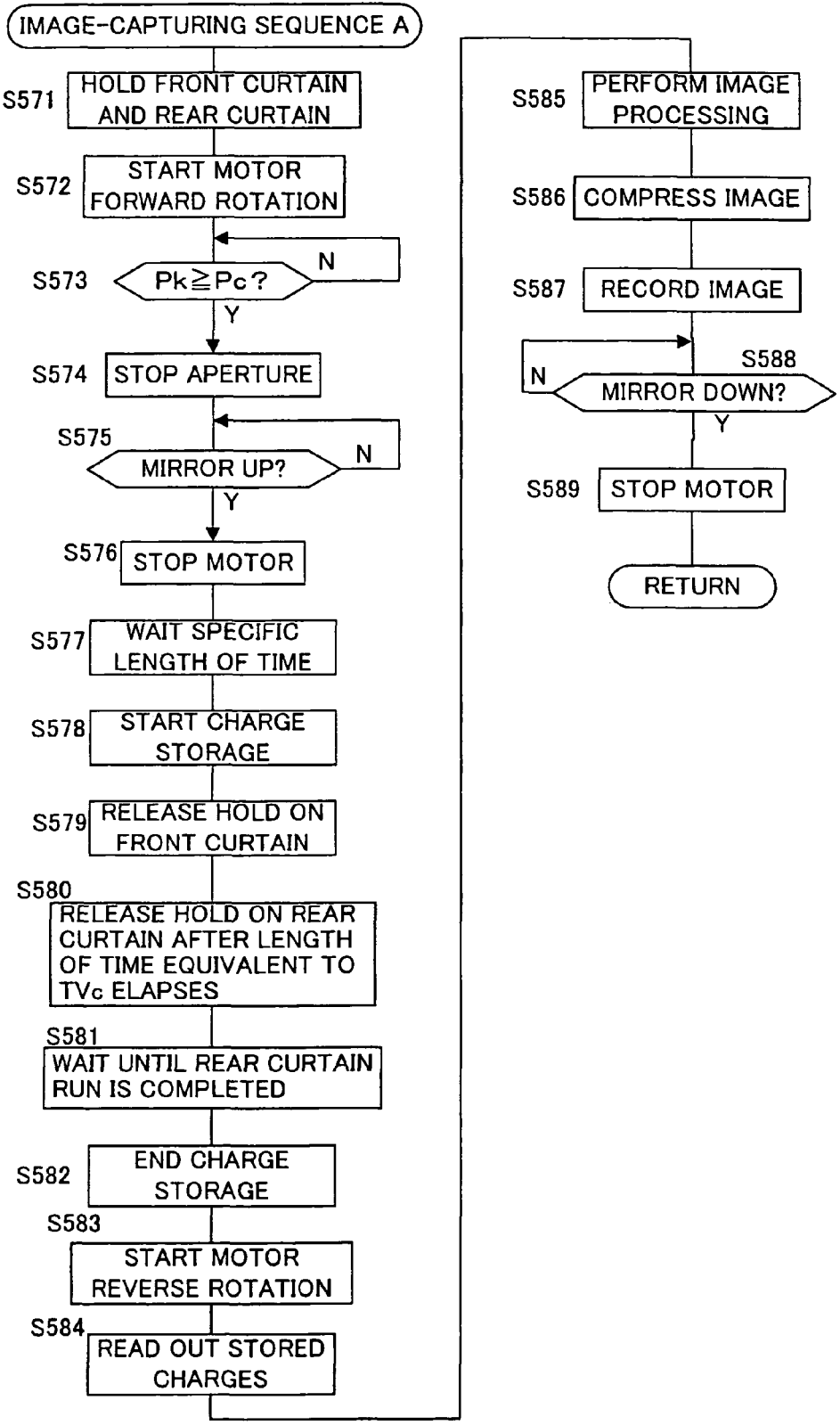
FIG. 17 presents a flowchart of the image-capturing sequence processing A executed in the arithmetic circuit.

The processing executed in step S33 in the flowchart presented in FIG. 9, i.e., the image-capturing sequence processing A, is now explained in detail in reference to the flowchart in FIG. 17. In step S571 in the flowchart presented in FIG. 17, the arithmetic circuit 101A outputs a command for the shutter drive circuit 121 to supply power to magnets (not shown) at the shutter 122 to hold the front curtain and the rear curtain. In step S572, the arithmetic circuit 101A outputs a command for the motor drive circuit 117 to start a forward rotation of the sequence motor 118 before the operation proceeds to step S573. As a result, a mirror-up operation for the mirror (not shown) and an aperture setting operation start. In step S573, the arithmetic circuit 101A counts the detection pulse signals input through the aperture position detection device 123 and judges as to a whether or not the relationship expressed as Pk≧Pc is achieved between the count value Pk and the number of control aperture pulses Pc. If the relationship expressed as Pk≧Pc is achieved, the arithmetic circuit 101A makes an affirmative decision in step S573 and the operation proceeds to step S574, whereas if the relationship expressed as Pk>Pc is not achieved, the arithmetic circuit 101A makes a negative decision in step S573. After making a negative decision, the judging processing in step S573 is executed repeatedly while the aperture setting operation is continuously performed.

In step S574, the arithmetic circuit 101A outputs a command for the aperture stop device 124 to set the aperture and then the operation proceeds to step S575. In step S575, the arithmetic circuit 101A judges as to whether or not the mirror-up operation has been completed. If an ON signal has been input through the sequence switch 119, the arithmetic circuit 101A makes an affirmative decision in step S575 and the operation proceeds to step S576, whereas if no ON signal has been input through the sequence switch 119, the arithmetic circuit 101A makes a negative decision in step S575. After making a negative decision, the judging processing in step S575 is executed repeatedly while continuously performing the mirror-up operation.

In step S576, the arithmetic circuit 101A outputs a command for the motor drive circuit 117 to stop the forward rotation of the sequence motor 118, and then the operation proceeds to step S577. It is to be noted that the sequence drive device (not shown) adopts a structure which allows the aperture stop by the aperture stop device 124 to be completed ahead of the completion of the mirror-up operation. In step S577, the arithmetic circuit 101A inserts a wait period over a specific length of time until the rebounding of the raised mirror stops, and then the operation proceeds to step S578.

In step S578, the arithmetic circuit 101A starts drive of the CCD 102 by starting a drive signal generation at the timing circuit 132, and then the operation proceeds to step 579. As a result, the CCD 102 starts a charge storage operation. However, the subject light has not reached the CCD 102 at this point.

In step S579, the arithmetic circuit 101A outputs a command for the shutter drive circuit 121 to stop the power supply to a magnet (not shown) at the shutter 122 to release the hold on the front curtain, before the operation proceeds to step S579. As a result, the shutter front curtain starts its run. In step S580, after a length of time corresponding to the control shutter speed TVc elapses following the release of the hold on the front curtain, the arithmetic circuit 101A outputs a command for the shutter drive circuit 121 to stop the power supply to the magnet (not shown) at the shutter drive circuit 121 to release the hold on the rear curtain, before the operation proceeds to step S581. The shutter rear curtain, in turn, starts a run and, as a result, the subject light entering the CCD 102 becomes blocked. The control on the control shutter speed TVc is thus achieved.

In step S581, the arithmetic circuit 101A inserts await period over a specific length of time and then the operation proceeds to step S582. The wait period should be set equal to the length of time required for the rear curtain to fully shield the image-capturing area of the CCD 102 from the light and complete its run. In step S582, the arithmetic circuit 101A stops the drive of the CCD 102 by controlling the timing circuit 132, and then the operation proceeds to step S583. The CCD 102 ends the charge storage operation as a result.

In step S583, the arithmetic circuit 101A outputs a command for the motor drive circuit 117 to start a reverse rotation of the sequence motor 118, and then the operation proceeds to step S584. As a result, a mirror-down operation for the mirror (not shown) and a resetting operation for opening the aperture start. In step S584, the arithmetic circuit 101A outputs a command for the timing circuit 132 to start reading out the charges from the CCD 102 before the operation proceeds to step S585. Through this processing, the image signals output from the CCD 102 are converted to digital data at the A/D conversion circuit 130. The data resulting from the A/D conversion are provided to the image processing circuit 131.

In step S585, the arithmetic circuit 101A issues an instruction for the image processing circuit 131 to execute image processing and then the operation proceeds to step S586. In step S586, the arithmetic circuit 101A issues an instruction for the image processing circuit 131 to execute image compression processing and then the operation proceeds to step S587. In step S587, the arithmetic circuit 101A records the compressed image data into the recording medium 107 before the operation proceeds to step S588.

In step S588, the arithmetic circuit 101A judges as to whether or not the mirror-down operation has been completed. The arithmetic circuit 101A makes an affirmative decision in step S588 if an ON signal has been input through the sequence switch 119 and, in this case, the operation proceeds to step S589, whereas the arithmetic circuit 101A makes a negative decision in step S588 if no ON signal has been input through the sequence switch 119 and executes the processing in step S588 repeatedly.

In step S589, the arithmetic circuit 101A outputs a command for the motor drive circuit 117 to stop the reverse rotation of the sequence motor 118 before the processing in the flowchart presented in FIG. 17 ends, and subsequently, the operation returns to step S22 in the flowchart in FIG. 9.

The processing executed in the operation (2) described earlier is now explained in reference to the flowchart presented in FIG. 10. In step S35 in the flowchart in FIG. 10, the arithmetic circuit 101A issues an instruction for the internal flash unit light emission circuit 133 (see FIG. 8) to start a charge operation and then the operation proceeds to step S36. Since the processing executed in steps S36~S39 is identical to that executed in steps S26~29 explained earlier, its explanation is omitted.

In step S40, the arithmetic circuit 101A executes the exposure calculation processing B before the operation proceeds to step S41. Details of the exposure calculation processing B are to be provided later. In step S41, the arithmetic circuit 101A executes display processing for the display device 115 and then the operation proceeds to step S42. The display processing is executed as explained earlier in detail.

In step S42, the arithmetic circuit 101A judges as to whether or not the charge operation has been completed. The arithmetic circuit 101A makes an affirmative decision in step S42 if a charge completion signal has been input through the internal flash unit light emission circuit 133 and the operation proceeds to step S43, whereas the operation returns to step S22 in the flowchart presented in FIG. 9 if no charge completion signal has been input. When the operation returns to step S22 without proceeding to engage in the shutter release judging processing in step S44, the camera is in a release-locked state.

In step S43, the arithmetic circuit 101A sends a command for the display device 115 to bring up a display indicating that the charge operation has been completed, and then the operation proceeds to step S44. In step S44, the arithmetic circuit 101A judges as to whether or not the shutter release switch 114 has been operated. The arithmetic circuit 101A makes an affirmative decision in step S44 if an operation signal has been input through the shutter release switch 114 and, in this case, the operation proceeds to step S45, whereas the arithmetic circuit 101A makes a negative decision in step S44 if no operation signal has been input through the shutter release switch 114 and the operation returns to step S22 in the flowchart presented in FIG. 9. In step S45, the arithmetic circuit 101A executes the image-capturing sequence processing B and then the operation returns to step S22 in the flowchart in FIG. 9. The sequence of the photographing processing is thus completed. Details of the image-capturing sequence processing B are to be provided later.

Figure 18:
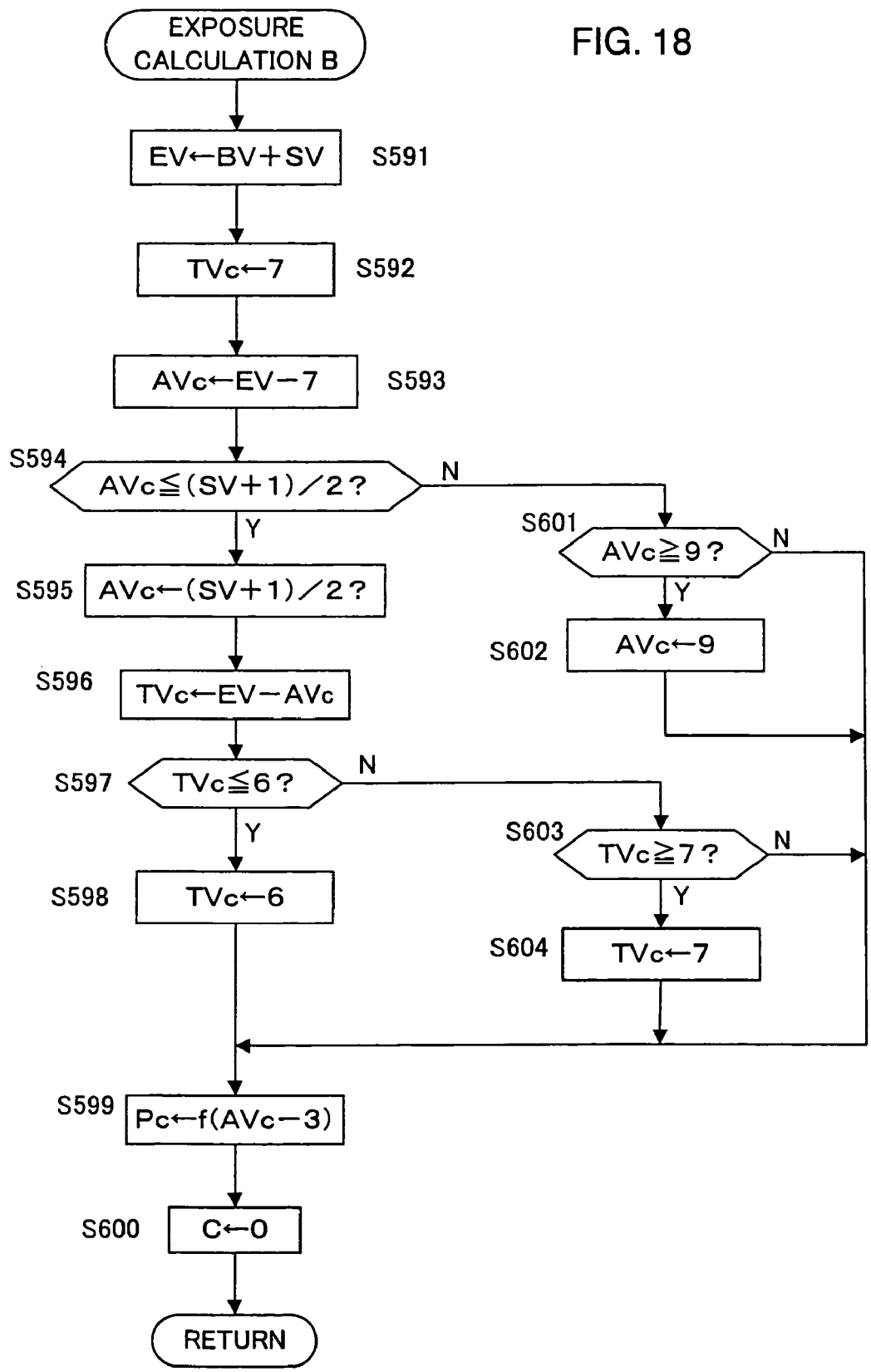
FIG. 18 presents a flowchart of the exposure calculation processing B executed in the arithmetic circuit.

Now, the exposure calculation processing B which is executed when the internal flash unit is utilized is explained in detail in reference to the flowchart presented in FIG. 18. In the exposure calculation processing B, an exposure calculation is executed by setting the control shutter speed TVc to, for instance, 7, i.e., to the flash unit synchronizing speed 1/125 sec to determine the control aperture value AVc. The range of the values that can be taken by the control aperture value AVc is 3≦AVc≦9, i.e., F 2.8~F 22. The control image-capturing sensitivity SVc is set to the value of the image-capturing setting SV.

In step S591 in the flowchart presented in FIG. 18, the arithmetic circuit 101A calculates EV as the sum of BV and SV before the operation proceeds to step S592. EV represents the exposure value, BV represents the subject brightness and SV represents the image-capturing sensitivity setting. In step S592, the arithmetic circuit 101A sets the control shutter speed TVc to 7 (1/125 sec) which is the flash unit synchronizing speed and then the operation proceeds to step S593. In step S593, the arithmetic circuit 101A calculates the control aperture value AVc by subtracting 7 from EV and then the operation proceeds to step S594. As described above, the control aperture value AVc is obtained by subtracting the control shutter speed TVc (7 in this case) from the exposure value EV which has been calculated.

In step S594, the arithmetic circuit 101A judges as to whether or not AVc≦(SV+1)/2 is true. Since the range of the image-capturing sensitivity setting SV is 5≦SV≦9 in the electronic camera in the embodiment as explained earlier, the value of (SV+1)/2 is bound to be 3 or larger. The arithmetic circuit 101A makes a negative decision in step S594 if AVc≦(SV+1)/2 is not true and, in this case, the operation proceeds to step S601, whereas the arithmetic circuit 101A makes an affirmative decision in step S594 if AVc≦(SV+1)/2 is true and the operation proceeds to step S595.

In step S595, the arithmetic circuit 101A sets (SV+1)/2 for the control aperture value AVc before the operation proceeds to step S596. In step S596, the arithmetic circuit 101A calculates TVc by subtracting AVc from EV and then the operation proceeds to step S597. As a result, the value set for the control shutter speed TVc is changed from 7 (1/125 sec).

In step S597, the arithmetic circuit 101A judges as to whether or not TVc≦6 is true. If TVc≦6 is true (the control shutter speed is lower than 1/60 sec), the arithmetic circuit 101A makes an affirmative decision in step S597 and the operation proceeds to step S598, whereas if TVc≦6 is not true, the arithmetic circuit 101A makes a negative decision in step S597 to proceed to step S603. In step S598, the arithmetic circuit 101A sets the control shutter speed TVc to 6 and the operation proceeds to step S599. Through this processing, the control shutter speed is set to 1/60 sec which is lower than the flash unit synchronizing speed.

In step 601, to which the operation proceeds after making a negative decision in step S594, the arithmetic circuit 101A judges as to whether or not AVc≧9 is true. The arithmetic circuit 101A makes an affirmative decision in step S601 if AVc≧9 is true (the control aperture value is equal to or larger than F 22) and, in this case, the operation proceeds to step S602, whereas the arithmetic circuit 101A makes a negative decision in step S601 if AVc≧9 is not true to proceed to step S599. In step S602, the arithmetic circuit 101A sets the control aperture value AVc to 9 and then the operation proceeds to steps S599. As a result, the control aperture value is set to F 22 which is the upper limit of the control range.

In step S603 to which the operation proceeds after making a negative decision in step S597, the arithmetic circuit 101A judges as to whether or not TVc≧7 is true. The arithmetic circuit 101A makes an affirmative decision in step S603 if TVc≧7 is true (the control shutter speed is higher than 1/125 sec) and, in this case, the operation proceeds to step S604, whereas the arithmetic circuit 101A makes a negative decision in step S603 if TVc≧7 is not true to proceed to step S599.

In step S604, the arithmetic circuit 101A sets the control shutter speed TVc to 7 before the operation proceeds to step S599. Through this processing, the control shutter speed is set equal to the flash unit synchronizing speed (1/125 sec).

In step S599, the arithmetic circuit 101A calculates the control aperture pulse number Pc as the function f of the number of aperture setting stages (AVc−3) before the operation proceeds to step S600. The control aperture pulse number Pc represents the number of pulses output from the aperture position detection device 123 before the aperture is locked at the control aperture value AVc.

In step S600, the arithmetic circuit 101A sets 0 for the flag C before the processing in FIG. 18 ends, and, subsequently, the operation proceeds to step S41 in FIG. 10. As described above, during the exposure calculation processing B (the exposure calculation executed when the internal flash unit is utilized), the control image-capturing sensitivity SVc is set to the value of the image-capturing sensitivity setting SV.

Figure 19:
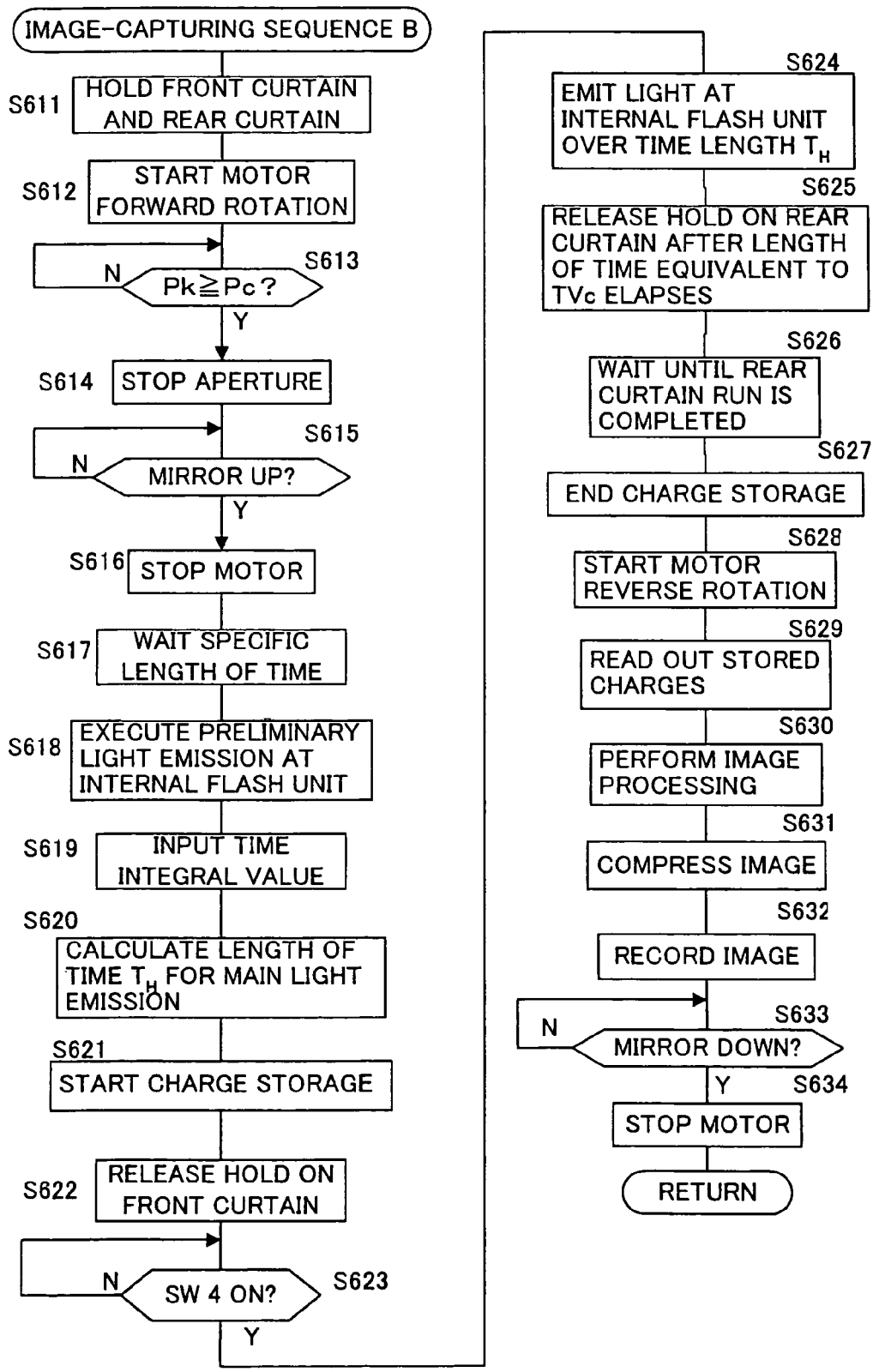
FIG. 19 presents a flowchart of the image-capturing sequence processing B executed in the arithmetic circuit.

The image-capturing sequence processing B is now explained in detail in reference to the flowchart presented in FIG. 19. Since the processing executed in steps S611~S617 in the flowchart in FIG. 19 is identical to the processing executed in steps S571~S577 explained above, its explanation is omitted. In step S618, the arithmetic circuit 101A issues an instruction for the internal flash unit light emission circuit 133 to execute a preliminary light emission (pre light emission) and then the operation proceeds to step S619. As a result, the light emitting unit 44 of the internal flash unit emits light to achieve a small output over a specific length of time. In step S619, a time integral value of the light reception signals is input to the arithmetic circuit 101A from the flash-sensor element 135 and then the operation proceeds to step S620. In step S620, the arithmetic circuit 101A calculates a flash output needed for the main light emission and also calculates the length of light emission time TH over which the light emitting unit 44 needs to emit light to achieve this flash output, before the operation proceeds to step S621.

Since the processing executed in steps S621 and S622 is identical to that executed in step S578 and the step S579 described earlier, its explanation is omitted. In step 623, the arithmetic circuit 101A judges as to whether or not the X contact point switch 139 is in an ON state. The arithmetic circuit 101A makes an affirmative decision in step S623 if an ON signal has been input through the X contact point switch 139 and, in this case, the operation proceeds to step S624, whereas the arithmetic circuit 101A makes a negative decision in step S623 if no ON signal has been input to repeatedly to execute the judging processing in step S623. In other words, if the shutter front curtain run has been completed, the operation proceeds to step S624, whereas if the shutter front curtain run is still in progress, the judging processing is repeatedly executed.

In step S624, the arithmetic circuit 101A issues an instruction for the internal flash unit light emission circuit 133 to start the main light emission over the light emission period TH before the operation proceeds to step S625. In turn, the light emitting unit 44 at the internal flash unit emits light over the light emission period to achieve the specific flash output.

Since the processing executed in steps S625~S634 is identical to that executed in step S580~S589 described earlier, its explanation is omitted. Thus, the sequence of the photographing processing, during which the light emission control for the internal flash unit is implemented through TTL auto flash control while the charges are stored, ends. Once the photographing processing is completed, the processing in the flowchart presented in FIG. 19 ends, and subsequently, the operation returns to step S22 in the flowchart in FIG. 9.

The processing executed in the operation (3) is now explained in reference to the flowchart presented in FIG. 11. Since the processing executed in steps S46~S49 in the flowchart presented in FIG. 11 is identical to that executed in steps S26~29 explained earlier, its explanation is omitted.

In step S50, the arithmetic circuit 101A executes the exposure calculation processing C before the operation proceeds to step S51. Details of the exposure calculation processing C are to be provided later. In step S51, the arithmetic circuit 101A executes display processing for the display device 115 and then the operation proceeds to step S52. The display processing is executed as explained earlier in detail.

The arithmetic circuit 101A judges as to whether or not the value set at the flag F received from the external flash unit 11 through the communication processing explained earlier is 1. The arithmetic circuit 101A makes an affirmative decision in step S52 if F=1 (the charge operation has been completed) and in this case, the operation proceeds to step S53, whereas the arithmetic circuit 101A makes a negative decision in step S52 if F≠1 (the charge operation has not been completed) to proceed to step S54.

In step S53, the arithmetic circuit 101A sends a command for the display device 115 to bring up a display indicating that the charge operation has been completed, and then the operation proceeds to step S54. In step S54, the arithmetic circuit 101A judges as to whether or not the shutter release switch 114 has been operated. The arithmetic circuit 101A makes an affirmative decision in step 54 if an operation signal has been input through the shutter release switch 114 and, in this case, the operation proceeds to step S55, whereas the arithmetic circuit 101A makes a negative decision in step S54 if no operation signal has been input through the shutter release switch 114 and the operation returns to step S22 in the flowchart presented in FIG. 9. In step S55, the arithmetic circuit 101A executes the image-capturing sequence processing C and then the operation returns to step S22 in the flowchart in FIG. 9. The sequence of the photographing processing is thus completed. Details of the image-capturing sequence processing C are to be provided later.

Figure 20:
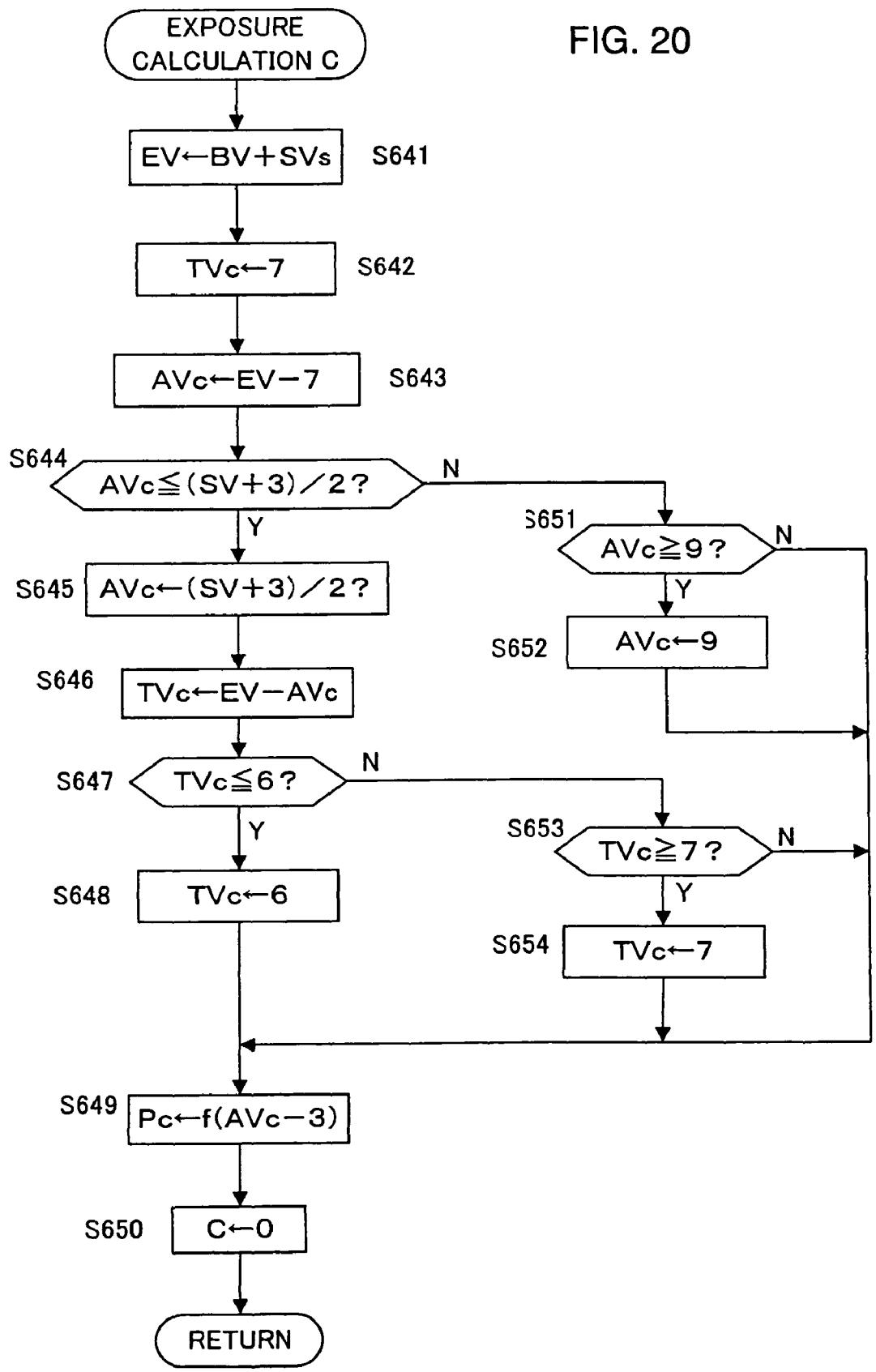
FIG. 20 presents a flowchart of the exposure calculation processing C executed in the arithmetic circuit.

Now, the exposure calculation processing C which is executed when the external flash unit 11 is utilized is explained in detail in reference to the flowchart presented in FIG. 20. In the exposure calculation processing C, an exposure calculation is executed by setting the control shutter speed TVc to, for instance, 7, i.e., to the flash unit synchronizing speed $\frac{1}{125}$ sec, to determine the control aperture value AVc. Since the processing executed in steps S641~S643 and steps S646~S654 in the flowchart presented in FIG. 20 is identical to the processing executed in steps S591~S593 and steps S596~S604 in the flowchart in FIG. 18 (the exposure calculation B), its explanation is omitted and the following explanation focuses on the processing executed in steps S644 and S645.

In step S644, the arithmetic circuit 101A judges as to whether or not AVc≦(SV+3)/2 is true. Since the range of the image-capturing sensitivity setting SV is 5≦SV≦9 in the electronic camera in the embodiment as explained earlier, the value of (SV+3)/2 is bound to be 4 or larger. The arithmetic circuit 101A makes a negative decision in step S644 if AVc≦ (SV+3)/2 is not true and, in this case, the operation proceeds to step S651, whereas the arithmetic circuit 101A makes an affirmative decision in step S644 if AVc≦(SV+3)/2 is true and the operation proceeds to step S645.

In step S645, the arithmetic circuit 101A sets the control aperture value AVc to (SV+3)/2 before the operation proceeds to step S646. The mathematical expression used in the processing in steps S644 and S645 is different from that used in steps S594 and S595 since the guide number of the external flash unit 11 is normally larger than that of the internal flash unit.

Once the processing in the flowchart presented in FIG. 20 ends, the operation proceeds to step 51 in the flowchart in FIG. 11. As described above, in the exposure calculation processing C (the exposure calculation executed when utilizing the external flash unit 11), the control image-capturing sensitivity SVc is set to the value of the image-capturing sensitivity setting SV.

Figure 21:
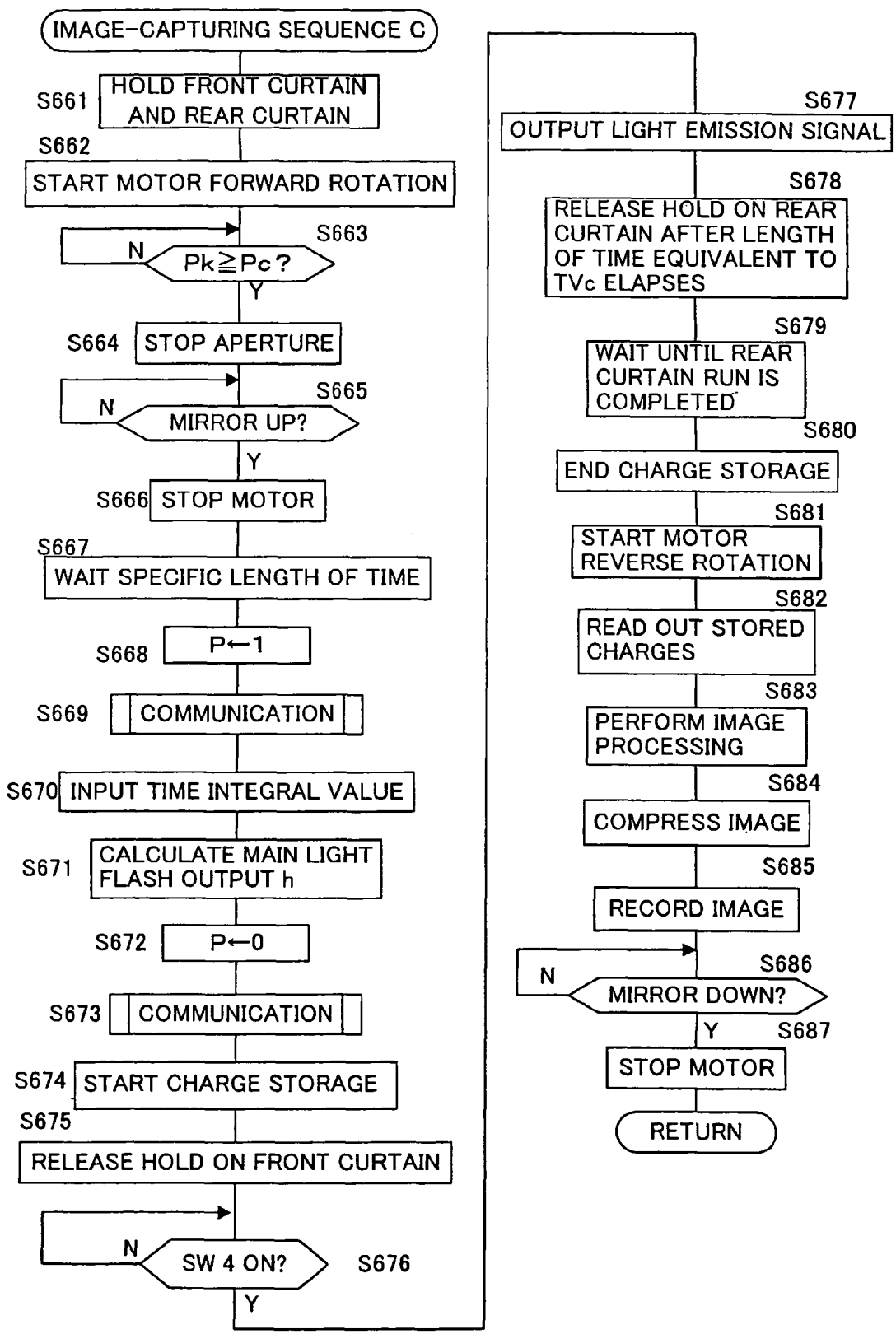
FIG. 21 presents a flowchart of the image-capturing sequence processing C executed in the arithmetic circuit.

The image-capturing sequence processing C is now explained in detail in reference to the flowchart presented in FIG. 21. Since the processing executed in steps S661~S667 in the flowchart in FIG. 21 is identical to the processing executed in steps S571~S577 described above, its explanation is omitted.

In step S668, the arithmetic circuit 101A sets 1 for the flag P and the operation proceeds to step S669. In step S669, the arithmetic circuit 101A engages in the communication processing described earlier to communicate with the controller 201 of the external flash unit 11, before the operation proceeds to step S670. When the controller 201 of the external flash unit 11 receives the value 1 set for the flag P through the communication, the light emission circuit 202 causes the light emitting unit 11a to perform a preliminary light emission over a specific length of time to achieve a small flash output. In step S670, the time integral value of the light reception signals is input to the arithmetic circuit 101A from the flash-sensor element 135 and then the operation proceeds to step S671. In step S671, the arithmetic circuit 101A calculates the flash output h that needs to be achieved during the main light emission before the operation proceeds to step S672.

In step S672, the arithmetic circuit 101A sets 0 for the flag P and the operation proceeds to step S673. In step S673, the arithmetic circuit 101A engages in the communication processing to communicate with the controller 201 of the external flash unit 11, before the operation proceeds to step S674. Since the flag P is set at 0 in this case, no preliminary light emission is executed. Upon receiving the main flash output quantity h through the communication processing, the controller 201 calculates the length of light emission time TH over which light needs to be emitted at the light emitting unit 44 to achieve this flash output.

Since the processing executed in steps S674~S676 is identical to the processing executed in steps S621~S623 described earlier its explanation is omitted. In step S677, the X contact point ON signal is output to the external flash unit 11 via the contact point terminal 10a. As a result, the external flash unit 11 emits light over the light emission period TH. The length of the light emission period TH is controlled by the controller 201.

Since the processing executed in steps S678~S687 is identical to that executed in step S580~S589 described earlier, its explanation is omitted. Thus, the sequence of the photographing processing, during which the light emission control for the external flash unit 11 is implemented through TTL auto flash control while the charges are stored, ends. Once the photographing processing is completed, the processing in the flowchart presented in FIG. 21 ends, and subsequently, the operation returns to step S22 in the flowchart in FIG. 9.

The electronic camera achieved in the fifth embodiment is summarized below.

(1) In the electronic camera 1A that can be set in an operating mode (the image-capturing sensitivity automatic control mode) in which the control aperture value AVc and the control shutter speed TVc are calculated based upon the subject brightness BV and the image-capturing sensitivity setting SV, the control image-capturing sensitivity SVc which will achieve the correct exposure is calculated and exposure control is implemented by using the control image-capturing sensitivity SVc instead of the image-capturing sensitivity setting SV, the exposure calculation processing B and the exposure calculation processing C which are different from the exposure calculation processing (the exposure calculation A) executed in the image-capturing sensitivity automatic control mode are respectively executed (the exposure calculation processing A is disallowed) when the internal flash unit is utilized (when an affirmative decision is made in step S24) or the external flash unit 11 is utilized (when an affirmative decision is made in step S25). During both the exposure calculation processing B and the exposure calculation processing C, the value of the image-capturing sensitivity setting SV is used as the control image-capturing sensitivity SVc. In other words, a value other than that of the image-capturing sensitivity setting SV is not used as the control image-capturing sensitivity SVc. As a result, the control image-capturing sensitivity SVc is not adjusted to a level higher than the image-capturing sensitivity setting SV and thus, it is ensured that the image quality does not deteriorate due to an increase in the noise in the image signal which may occur against the intent of the photographer during a photographing operation performed by using a flash unit and that no over-exposure is caused by the flash light. In addition, since the exposure calculation processing A is disallowed and thus, no needless image-capturing sensitivity adjustment is executed, the length of time required for the processing in the camera can be reduced.

(2) When the image-capturing sensitivity automatic control mode has been cleared (when a negative decision is made in step S562), the ISO mark at the display device 115 is not highlighted or does not flash, and thus, the photographer is visually alerted that the image-capturing sensitivity automatic control mode has been set or cleared.

(3) If a value other than the value of the image-capturing sensitivity setting SV is set for the control image-capturing sensitivity SVc (if an affirmative decision is made in step S563) while the electronic camera is set in the image-capturing sensitivity automatic control mode (when an affirmative decision is made in step S562), the ISO mark at the display device 115 flashes and also the control image-capturing sensitivity SVc is brought up on display (step S565). As a result, the photographer is visually alerted that the electronic camera is currently set in the image-capturing sensitivity automatic control mode and also visually ascertain the value of the control image-capturing sensitivity SVc. If, on the other hand, the control image-capturing sensitivity SVc and the image-capturing sensitivity setting SV match each other (if a negative decision is made in step S563) while the electronic camera is set in the image-capturing sensitivity automatic control mode (when an affirmative decision is made in step S562), the ISO mark at the display device 115 is highlighted and also the value of the image-capturing sensitivity setting SV is brought up on display (step S566). As a result, the photographer is visually alerted that the electronic camera is currently set in the image-capturing sensitivity automatic control mode and also visually ascertain the value of the image-capturing sensitivity setting SV.

Figure 22:
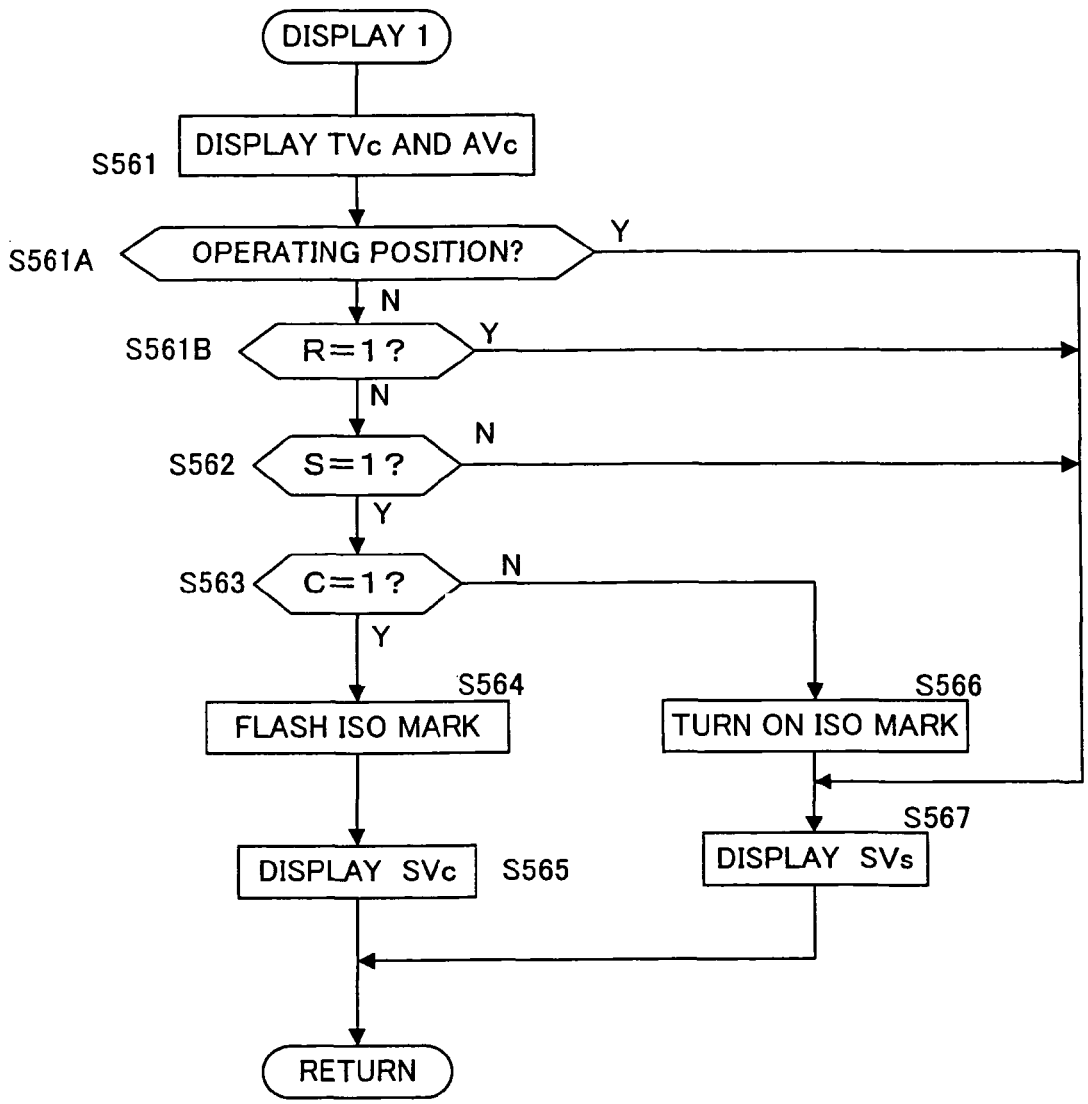
FIG. 22 presents a flowchart of display processing different from that shown in FIG. 16.

Instead of the display processing in the flowchart presented in FIG. 16, the display processing in the flowchart in FIG. 22 may be executed. In the flowchart presented in FIG. 22, steps S561A and S561B are added between steps S561 and S562 in the flowchart in FIG. 16.

In step S561A, the arithmetic circuit 101A judges as to whether or not the internal flash unit is currently at the operating position. The arithmetic circuit 101A makes a negative decision in step S561A if an OFF signal has been input through the position detection switch 138 and, in this case, the operation proceeds to step S561B, whereas the arithmetic circuit 101A makes an affirmative decision in step S561A if an ON signal has been input through the position detection switch 138 to proceed to step S567. In other words, if the internal flash unit is set at the storage position, the operation proceeds to step S561B, whereas if the internal flash unit has been popped up to the operating position, the operation proceeds to step S567.

In step S561B, the arithmetic circuit 101A judges as to whether or not the flag R is set to 1. If R=0 (no communication has been achieved through the communication processing in the flowchart presented in FIG. 13), the arithmetic circuit 101A makes a negative decision in step S561B and the operation proceeds to step S562, whereas if R=1 (a communication has been achieved through the communication processing in the flowchart presented in FIG. 13), the arithmetic circuit 101A makes an affirmative decision in step S561B to proceed to step S567.

When the internal flash unit is utilized (when an affirmative decision is made in step S561A) or when the external flash unit 11 is utilized (when an affirmative decision is made in step S561B), the ISO mark at the display device 115 is not highlighted or does not flash in the display processing in the flowchart presented in FIG. 22. As a result, the photographer is visually alerted that exposure calculation processing (the exposure calculation processing B or the exposure calculation processing C) different from the exposure calculation processing (the exposure calculation processing A) executed in the image-capturing sensitivity automatic control mode is executed.

While an explanation has been given above on an example in which the present invention is adopted in a single lens reflex electronic camera, the present invention may instead be adopted in an electronic camera that is not a single lens reflex type camera.

While the internal flash unit provided in the electronic camera moves between the operating position and the storage position in the explanation given above, the internal flash unit does not need to be a pop-up type flash unit. A light emission enabled state of a non pop-up internal flash unit set through an operation of an operation member (not shown) in the electronic camera corresponds to the state in which the internal flash unit described above is set at the operating position, and a light emission disabled state of the non pop-up internal flash unit set through an operation of the operation member corresponds to the state in which the internal flash unit in the explanation is set at the storage position.

Sixth Embodiment

Figure 23:
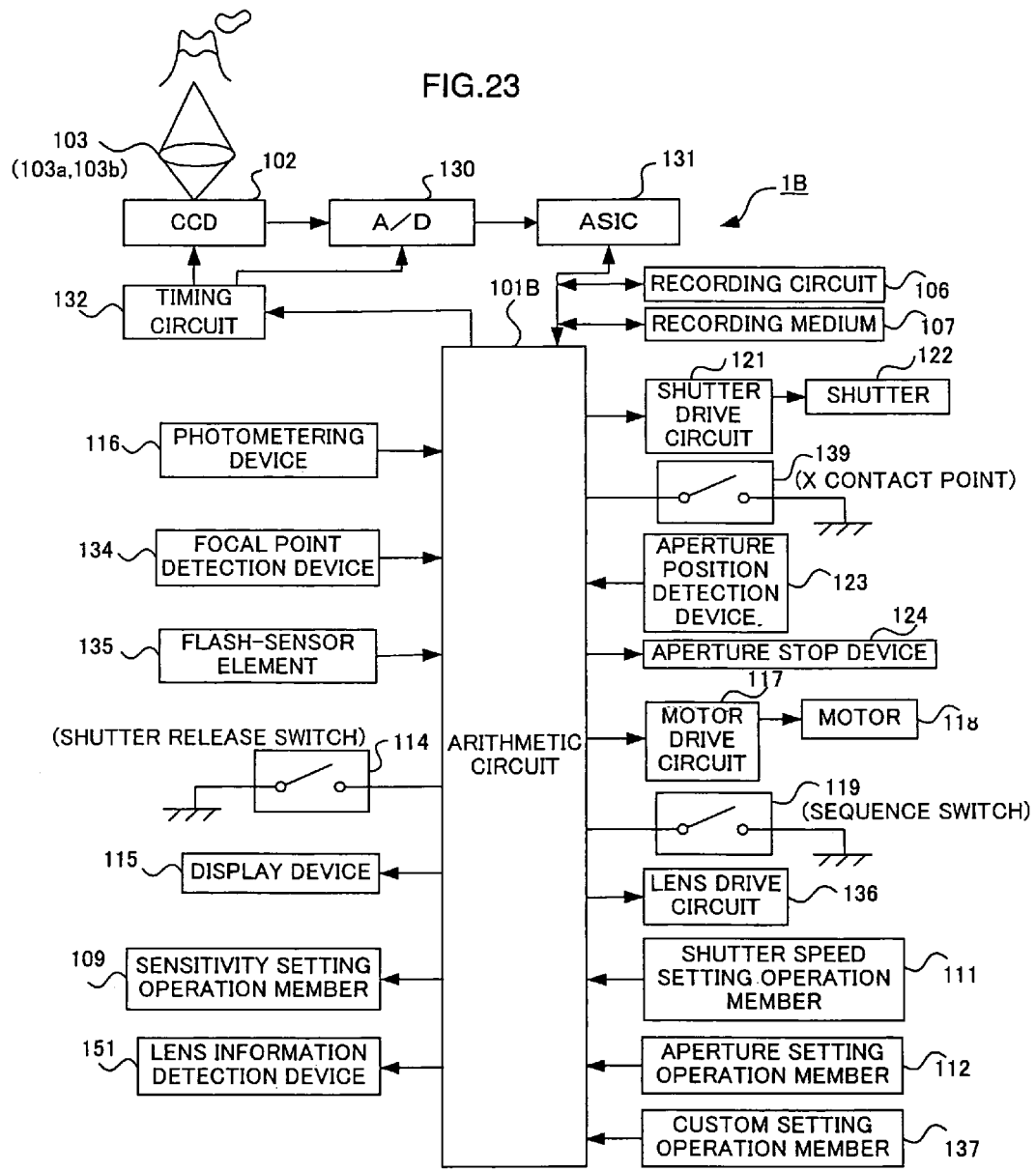
FIG. 23 is a block diagram illustrating the structure adopted in the electronic camera achieved in a sixth embodiment.

FIG. 23 is a block diagram illustrating the structure adopted in an electronic camera 1B achieved in the sixth embodiment of the present invention. The electronic camera 1B differs from the electronic camera 1A shown in FIG. 8 in that it does not include an internal flash unit but instead includes additional members, i.e., a lens information detection device 151, a shutter speed setting operation member 111 and an aperture setting operation member 112. In addition, no external flash unit 11 is mounted.

The lens information detection device 151 engages in communication with the photographic lens 103 and provides lens information obtained from the photographic lens 103 to an arithmetic circuit 101B. As the photographic lens 103 is mounted at a lens mount (not shown) of the electronic camera 1B, the lens information detection device 151 of the electronic camera 1B and a CPU at (not shown) of the photographic lens 103 become connected with each other via a connector terminal (not shown). The photographic lens 103 may be a photographic lens 103a having a CPU (not shown) provided therein or a photographic lens 103b that does not have a CPU. The lens information detection device 151 determines that the photographic lens 103a has been mounted if communication with the photographic lens 103 is achieved. If, on the other hand, communication with the photographic lens 103 is not achieved, the lens information detection device 151 determines that the photographic lens 103a is not currently mounted at the electronic camera 1B or that the photographic lens 103b which does not include a CPU is mounted at the electronic camera 1B.

The shutter speed setting operation member 111 outputs an operation signal to the arithmetic circuit 101B in response to a shutter speed setting operation. In response to the shutter speed setting operation signal input thereto, the arithmetic circuit 101B adjusts the setting for the exposure time length at the CCD 102 one step at a time. The range of values that the shutter speed setting TVs may assume is, for instance, $0 \leq TVs \leq 10$, i.e., 1 sec~1/1000 sec.

The aperture setting operation member 112 outputs an operation signal to the arithmetic circuit 101B in response to an aperture setting operation. The arithmetic circuit 101B changes the aperture value setting one step at a time in response to the aperture setting operation signal. The range of values that the aperture value setting AVs may assume is determined in conformance to the lens data input through the communication processing which is to be detailed later. For instance, if AV0=3 and AVM=9, the setting range is, for instance, $3 \leq AVs \leq 9$, i.e., F 2.8~F 22.

In the electronic camera achieved in the sixth embodiment, the image-capturing sensitivity is automatically adjusted as communication between the electronic camera 1B and the photographic lens 103a is achieved and also the electronic camera 1B is set in the image-capturing sensitivity automatic control mode.

Figure 24:
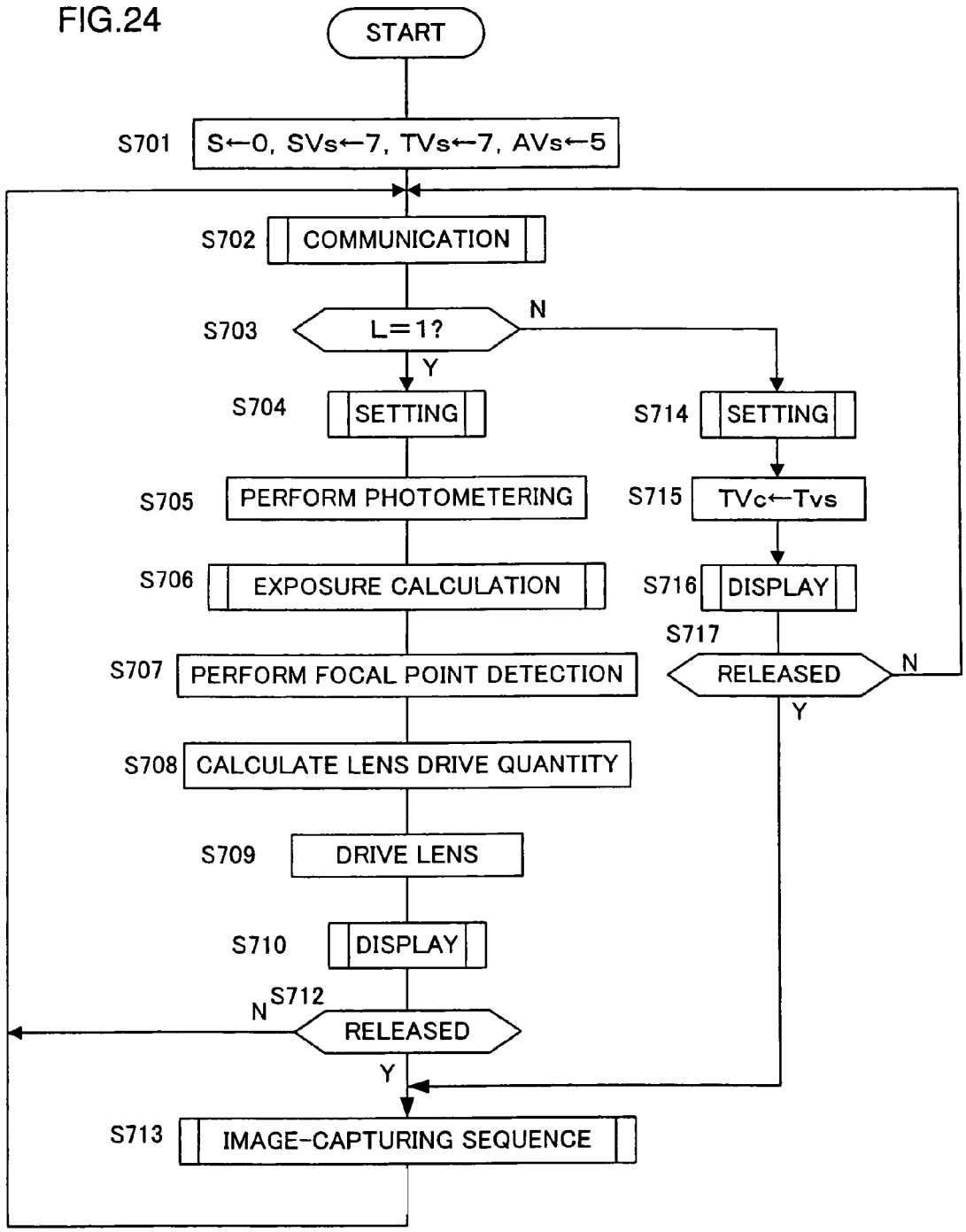
FIG. 24 presents a flowchart of the camera operation processing executed in the arithmetic circuit.

The camera operation processing executed in the arithmetic circuit 101B of the electronic camera 1B is now explained in reference to the flowchart presented in FIG. 24. A program for executing the processing in the flowchart in FIG. 24 is started up as a battery (not shown) is loaded into the electronic camera 1B.

In step S701 in FIG. 24, the arithmetic circuit 101B sets 0 for the sensitivity automatic control mode flag S, the sensitivity setting SV to 7 (equivalent to ISO 400), the shutter speed setting TVs to 7 (1/125 sec) and the aperture value setting AVs to 5 (F 5.6) for initialization and then the operation proceeds to step S702. The respective apex values are used for SV, TVs and AVs. The range of the sensitivity setting SV in the electronic camera achieved in the sixth embodiment is $5 \leq SV \leq 9$ which is equivalent to ISO 100~ISO 1600.

In step S702, the arithmetic circuit 101B executes communication processing to communicate with the photographic lens 103 and then the operation proceeds to step S703. The communication processing is to be detailed later. In step S703, the arithmetic circuit 101B judges as to whether or not a flag L is set to 1. The flag L is set to 1 if communication has been achieved through the communication processing and is set to 0 if communication has not been achieved. The arithmetic circuit 101B makes an affirmative decision in step S703 if L=1 and, in this case, the operation proceeds to step S704, whereas the arithmetic circuit 101B makes a negative decision in step S703 if L=0 to proceed to step S714. Namely the operation proceeds to step S704 if the photographic lens 103a having a CPU is currently mounted at the electronic camera 1B, and the operation proceeds to step S714 if the photographic lens 103b without a CPU is mounted at the electronic camera 1B or if no photographic lens 103 is mounted at the electronic camera 1B.

In step S704, the arithmetic circuit 101B executes setting processing which is to be detailed later before the operation proceeds to step S705. In step S705, the arithmetic circuit 101B performs a photometering operation to detect the quantity of light transmitted through the lens (BV−AV0) based upon a detection signal input through the photometering device 116 and then the operation proceeds to step S706. BV represents the subject brightness and AV0 represents the open aperture value of the photographic lens 103a. The open aperture value AV0 is obtained through the communication between the arithmetic circuit 101B and the photographic lens 103a. Details of the communication processing are to be provided later.

In step S706, the arithmetic circuit 101B executes exposure calculation processing which is to be detailed later and then the operation proceeds to step S707. In step S707, the arithmetic circuit 101B issues a command for the focal point detection device 134 to detect the state of the focal point adjustment by the photographic lens 103a before the operation proceeds to step S708. In step S708, the arithmetic circuit 101B calculates the extent to which the focus lens is to be driven based upon the results of the detection performed by the focal point detection device 134, and then the operation proceeds to step S709. In step S709, the arithmetic circuit 101B issues a command of for the lens drive circuit 136 to drive the focus lens of the photographic lens 103a to the focal point before the operation proceeds to step S710.

In step S710, the arithmetic circuit 101B executes display processing for the display device 115 and then the operation proceeds to step S712. The display processing is to be described in detail later. In step S712, the arithmetic circuit 101B judges as to whether or not the shutter release switch 114 has been operated. The arithmetic circuit 101B makes an affirmative decision in step S712 if an operation signal has been input through the shutter release switch 114 and, in this case, the operation proceeds to step S713, whereas the arithmetic circuit 101B makes a negative decision in step S712 if no operation signal has been input through the shutter release switch 114 and the operation returns to step S702.

In step S713, the arithmetic circuit 101B executes image-capturing sequence processing before the operation proceeds to step S702. Thus, the sequence of the photographing processing is completed. Details of the image-capturing sequence processing are to be provided later.

In step S714, to which the operation proceeds after making a negative decision (communication with the photographic lens 103a has not been achieved) in step S703, the arithmetic circuit 101B executes setting processing and then the operation proceeds to step S715. The setting processing executed in step S714 is identical to that executed in step S704 and details of the setting processing are to be provided later. In step S715, the arithmetic circuit 101B sets the value of the shutter speed setting TVs for the control shutter speed TVc before the operation proceeds to step S716. Namely, the exposure is performed manually without executing the exposure calculation processing if no communication with the photographic lens 103a has been achieved. In step S716, the arithmetic circuit 101B executes display processing for the display device 115 and then the operation proceeds to step S717. The display processing executed in step S717 is identical to the display processing executed in step S710 and details of the display processing are to be provided later.

In step S717, the arithmetic circuit 101B judges as to whether or not the shutter release switch 114 has been operated. The arithmetic circuit 101B makes an affirmative decision in step S717 if an operation signal has been input through the shutter release switch 114 and, in this case, the operation proceeds to step S713, whereas the arithmetic circuit 101B makes a negative decision in step S717 if no operation signal has been input through the shutter release switch 114 and the operation returns to step S702.

Figure 25:
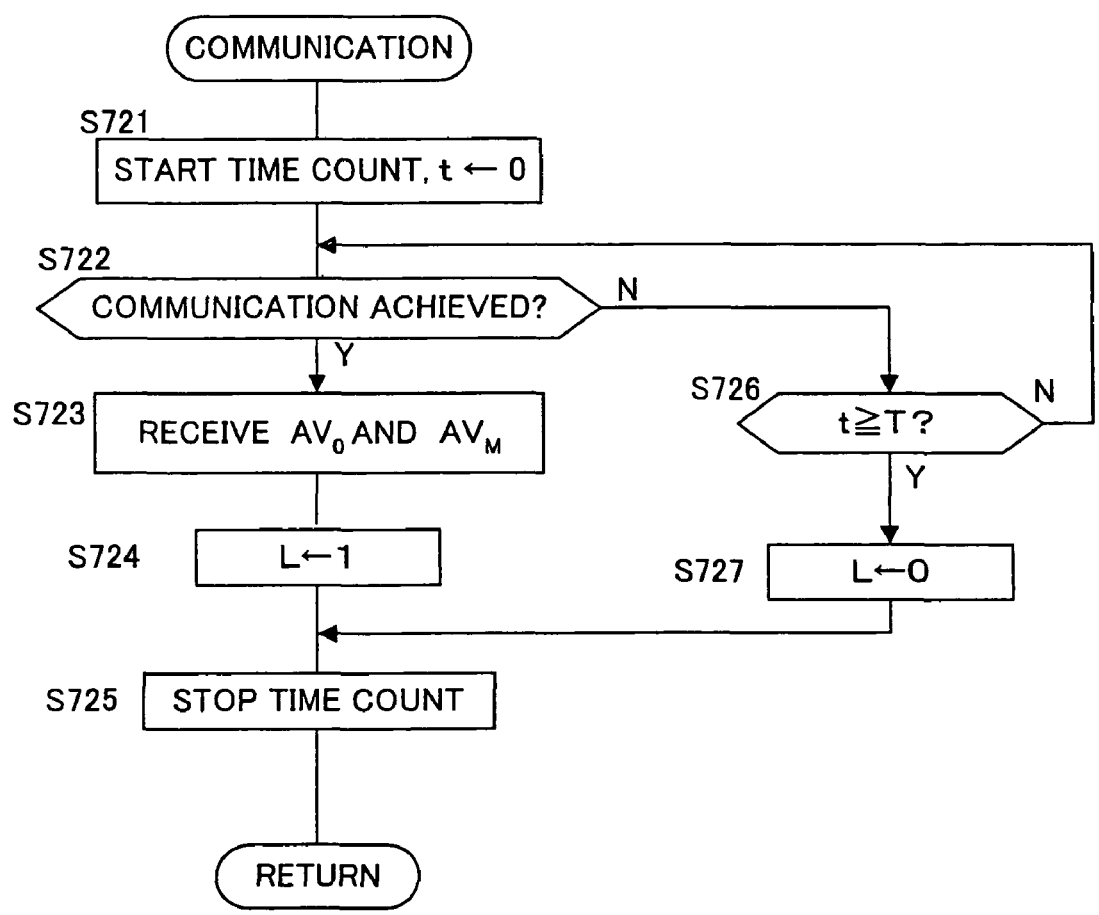
FIG. 25 presents a flowchart of the communication processing executed in the arithmetic circuit.

The communication processing between the electronic camera 1B and the photographic lens 103a which includes a CPU is now explained in detail in reference to the flowchart presented in FIG. 25. In step S721 in the flowchart in FIG. 25, the arithmetic circuit 101B starts a time count of a time length t and then the operation proceeds to step S722. The initial value of t is 0. In step S722, the arithmetic circuit 101B judges as to whether or not communication with the CPU (not shown) of the photographic lens 103a has been achieved. The decision as to whether or not communication has been achieved is made by performing a specific protocol check. If communication has been achieved, the arithmetic circuit 101B makes an affirmative decision in step S722 and the operation proceeds to step S723. If, on the other hand, communication has not been achieved, the arithmetic circuit 101B makes a negative decision in step S722 before the operation proceeds to step S726.

In step S723, the arithmetic circuit 101B receives the lens information (data) before the operation proceeds to step S724. The lens information includes the open aperture value AV0 and the minimum aperture value AVM of the photographic lens 103a. In step S724, the arithmetic circuit 101B sets 1 for the flag L and then the operation proceeds to step S725. In step S725, the arithmetic circuit 101B stops the count of the time length t before the processing in the flowchart presented in FIG. 25 ends. In step S726, to which the operation proceeds after making a negative decision in step S722, the arithmetic circuit 101B judges as to whether or not the relationship expressed as t≧T is achieved between the time count t and a specific length of time T. The specific length of time T is the length of time required for the protocol check. If the relationship expressed as t≧T is achieved, the arithmetic circuit 101B makes an affirmative decision in step S726 and, in this case, the operation proceeds to step S727, whereas the arithmetic circuit 101B makes a negative decision in step S726 if the relationship t≧T is not achieved and the operation returns to step S722. Namely, when the operation proceeds to step S727, the photographic lens 103a having a CPU is not mounted (i.e., a lens without a CPU is mounted or no lens is mounted), and when the operation returns to step S722, the protocol check is still in progress. In step S727, the arithmetic circuit 101B sets 0 for the flag L, and then the operation proceeds to step S725.

Figure 26:
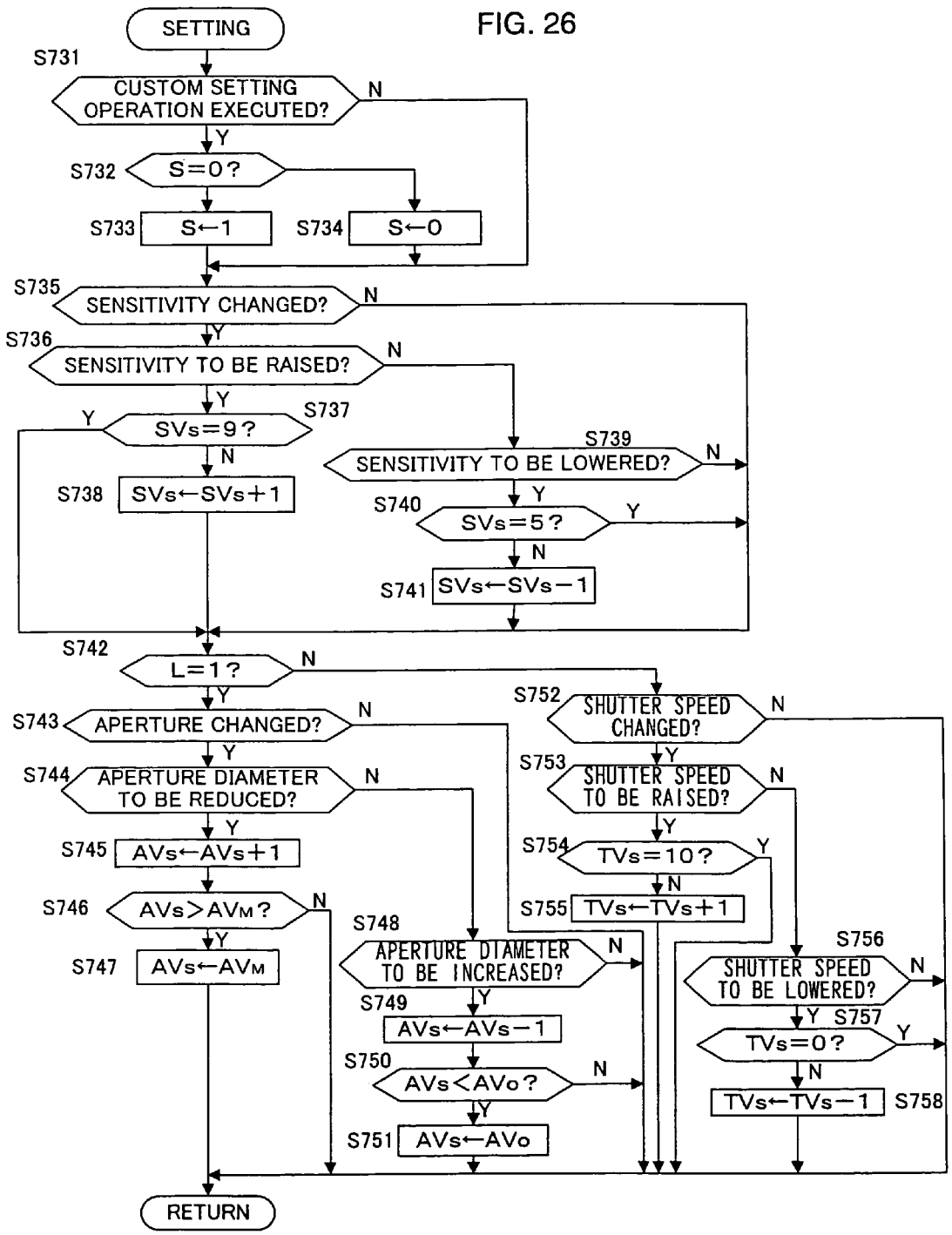
FIG. 26 presents a flowchart of the setting processing executed in the arithmetic circuit.

The setting processing executed in step S704 or step S714 in the flowchart presented in FIG. 24 is now explained in detail in reference to the flowchart in FIG. 26. It is to be noted that once the processing in the flowchart in FIG. 26 is completed, the operation proceeds to step S705 or step S715 in the flowchart presented in FIG. 24.

In step S731 in FIG. 26, the arithmetic circuit 101B judges as to whether or not a custom setting operation has been performed. The arithmetic circuit 101B makes an affirmative decision in step S731 if an operation signal has been input through the custom setting operation member 137 and the operation proceeds to step S732, whereas the arithmetic circuit 101B makes a negative decision in step S731 if no operation signal has been input through the custom setting operation member 137 to proceed to step S735.

In step S732, the arithmetic circuit 101B judges as to whether or not the sensitivity automatic control mode flag S is set to 0. The arithmetic circuit 101B makes an affirmative decision in step S732 if the flag S is set to 0 (the image-capturing sensitivity automatic control mode has been cleared) and in this case, the operation proceeds to step S733, whereas the arithmetic circuit 101B makes a negative decision in step S732 if the flag S is set to 1 (the image-capturing sensitivity automatic control mode has been set) to proceed to step S734. In step S733, the arithmetic circuit 101B sets 1 for the flag S (the electronic camera is set in the image-capturing sensitivity automatic control mode) and then the operation proceeds to step S735. In step S734, the arithmetic circuit 101B sets 0 for the flag S (clears the image-capturing sensitivity automatic control mode), and then the operation proceeds to step S735.

In step S735, the arithmetic circuit 101B judges as to whether or not an operation to change the image-capturing sensitivity has been performed. The arithmetic circuit 101B makes an affirmative decision in step S735 if an operation signal has been input through the sensitivity setting operation member 109 and the operation proceeds to step S736, whereas the arithmetic circuit 101B makes a negative decision in step S735 if no operation signal has been input through the sensitivity setting operation member 109 and the operation proceeds to step S742. In step S736, the arithmetic circuit 101B judges as to whether or not the sensitivity is to be raised. The arithmetic circuit 101B makes an affirmative decision in step S736 if the operation signal from the sensitivity setting operation member 109 indicates that the sensitivity is to be raised and, in this case, the operation proceeds to step S737, whereas the arithmetic circuit 101B makes a negative decision in step S736 if the operation signal does not indicate that the sensitivity is to be raised and the operation proceeds to step S739.

In step S737, the arithmetic circuit 101B judges as to whether or not SV is set to 9. If SV=9 (the image-capturing sensitivity setting is equivalent to ISO 1600), the arithmetic circuit 101B makes an affirmative decision in step S737 and the operation proceeds to step S742. Thus, the operation proceeds to the subsequent processing without raising the sensitivity since the image-capturing sensitivity setting is at the upper limit of the sensitivity setting range. If, on the other hand, SV≠9, the arithmetic circuit 101B makes a negative decision in step S737 and the operation proceeds to step S738. In step S738, the arithmetic circuit 101B adds 1 to the value of the image-capturing sensitivity setting SV and then the operation proceeds to step S742. As a result, the image-capturing sensitivity setting is raised by one stage.

In step S739, the arithmetic circuit 101B judges as to whether or not the sensitivity is to be lowered. The arithmetic circuit 101B makes an affirmative decision in step S739 if the operation signal from the sensitivity setting operation member 109 indicates that the sensitivity is to be lowered and, in this case, the operation proceeds to step S740. The arithmetic circuit 101B makes a negative decision in step S739 if the operation signal does not indicate that the sensitivity is to be lowered and the operation proceeds to step S742.

In step S740, the arithmetic circuit 101B judges as to whether or not SV is set to 5. If SV=5 (the image-capturing sensitivity setting is equivalent to ISO 100), the arithmetic circuit 101B makes an affirmative decision in step S740 and then the operation proceeds to step S742. In this situation, the operation proceeds to subsequent processing without lowering the sensitivity since the image-capturing sensitivity setting is at the lower limit of the sensitivity setting range. If, on the other hand, SV≠5, the arithmetic circuit 101B makes a negative decision in step S740 and the operation proceeds to step S741. In step S741, the arithmetic circuit 101B subtracts 1 from the value of the image-capturing sensitivity setting SV and then the operation proceeds to step S742. As a result, the image-capturing sensitivity setting is lowered by one stage.

In step S742, the arithmetic circuit 101B judges as to whether or not 1 is currently set for the flag L. If L=0 (no communication has been achieved through the communication processing in the flowchart presented in FIG. 25), the arithmetic circuit 101B makes a negative decision in step S742 and the operation proceeds to step S752, whereas if L=1 (communication has been achieved through the communication processing in the flowchart in FIG. 25), the arithmetic circuit 101B makes an affirmative decision in step S742 to proceed to step S743. If the operation proceeds to step S743, the aperture value setting AVs, which is necessary for the exposure calculation to be detailed later, is ascertained. Since the control shutter speed TVc is calculated through the exposure calculation, it is not necessary to ascertain the shutter speed setting TVs through setting processing. If the operation proceeds to step S752, on the other hand, it is not necessary to ascertain the aperture value setting AVs since the exposure calculation described later is omitted. In such a case, the shutter speed setting TVs is ascertained to enable a manual exposure operation.

In step S743, the arithmetic circuit 101B judges as to whether or not an aperture change operation has been performed. If an operation signal has been input through the aperture setting operation member 112, the arithmetic circuit 101B makes an affirmative decision in step S743 and the operation proceeds to step S744, whereas if no operation signal has been input through the aperture setting operation member 112, the arithmetic circuit 101B makes a negative decision in step S743 and the processing in the flowchart shown in FIG. 26 ends.

In step S744, the arithmetic circuit 101B judges as to whether or not the aperture change operation has been performed to set a smaller aperture diameter (to raise the aperture value) If the operation signal from the aperture setting operation member 112 indicates that the aperture value is to be raised, the arithmetic circuit 101B makes an affirmative decision in step S744 and the operation proceeds to step S745, whereas if the operation signal indicates that the aperture value is to be lowered, the arithmetic circuit 101B makes a negative decision in step S744 to proceed to step S748.

In step S745, the arithmetic circuit 101B adds 1 to the value of the aperture value setting AVs before the operation proceeds to step S746. Through this processing, the aperture value setting is adjusted to a level higher by one stage (the aperture diameter is reduced by one stage). In step S746, the arithmetic circuit 101B judges as to whether or not AVs>AVM is true. If the aperture value setting AVs is larger than the minimum aperture value AVM, the arithmetic circuit 101B makes an affirmative decision in step S746 and, in this case, the operation proceeds to step S747. In this situation, the operation proceeds to engage in the subsequent processing as the aperture diameter is already set at its lower limit and thus, the aperture diameter cannot be reduced any further. If, on the other hand, AVs≦AVM is true, the arithmetic circuit 101B makes a negative decision in step S746 and the processing in the flowchart presented in FIG. 26 ends. In step S747, the arithmetic circuit 101B sets the minimum aperture value AVM for the aperture value setting AVs and then the processing in the flowchart in FIG. 26 ends. Thus, the minimum aperture value AVM which represents the lower limit of the aperture diameter is set for the aperture value setting AVs.

In step S748, the arithmetic circuit 101B judges as to whether or not the aperture change operation has been performed to set a larger aperture diameter (to lower the aperture value). If the operation signal from the aperture setting operation member 112 indicates that the aperture value is to be lowered, the arithmetic circuit 101B makes an affirmative decision in step S748 and the operation proceeds to step S749, whereas if the operation signal indicates that the aperture value is to be raised, the arithmetic circuit 101B makes a negative decision in step S748 and then the processing in the flowchart presented in FIG. 26 ends.

In step S749, the arithmetic circuit 101B subtracts 1 from the aperture value setting AVs before the operation proceeds to step S750. Through this processing, the aperture value setting is adjusted to a level lower by one stage (the aperture diameter is increased by one stage). In step S750, the arithmetic circuit 101B judges as to whether or not AVs<AV0 is true. If the aperture value setting AVs is smaller than the open aperture value AV0, the arithmetic circuit 101B makes an affirmative decision in step S750 and, in this case, the operation proceeds to step S751. In this situation, the operation proceeds to engage in the subsequent processing as the aperture diameter is already set at its upper limit (open setting) and thus, the aperture diameter cannot be increased any further. If, on the other hand, AVs≧AV0 is true, the arithmetic circuit 101B makes a negative decision in step S750 and the processing in the flowchart presented in FIG. 26 ends. In step S751, the arithmetic circuit 101B sets the open aperture value AV0 for the aperture value setting AVs and then the processing in the flowchart in FIG. 26 ends. Thus, the open aperture value AV0 which represents the upper limit of the aperture diameter is set for the aperture value setting AVs.

In step S752, the arithmetic circuit 101B judges as to whether or not a shutter speed adjustment operation has been performed. If an operation signal has been input through the shutter speed setting operation member 111, the arithmetic circuit 101B makes an affirmative decision in step S752 and the operation proceeds to step S753, whereas if no operation signal has been input through the shutter speed setting operation member 111, the arithmetic circuit 101B makes a negative decision in step S752 and the processing in the flowchart in FIG. 26 ends.

In step S753, the arithmetic circuit 101B judges as to whether or not the shutter speed is to be increased. If the operation signal from the shutter speed setting operation member 111 indicates that the shutter speed is to be increased, the arithmetic circuit 101B makes an affirmative decision in step S753 and the operation proceeds to step S754, whereas if the operation signal does not indicate that the shutter speed is to be increased, the arithmetic circuit 101B makes a negative decision in step S753 to proceed to step S756.

In step S754, the arithmetic circuit 101B judges as to whether or not TVs is set to 10. If TVs=10 (the shutter speed setting is 1/1000 sec), the arithmetic circuit 101B makes an affirmative decision in step S754 and the processing in the flowchart presented in FIG. 26 ends. In this situation, the operation proceeds to engage in the subsequent processing without changing the shutter speed setting since the shutter speed is already set at the upper limit of the shutter speed setting range. If, on the other hand, TVs≠10, the arithmetic circuit 101B makes a negative decision in step S754 and the operation proceeds to step S755. In step S755, the arithmetic circuit 101B adds 1 to value of the shutter speed setting TVs before the processing in the flowchart in FIG. 26 ends. Thus, the shutter speed setting is raised by one stage.

In step S756, the arithmetic circuit 101B judges as to whether or not the shutter speed is to be reduced. If the operation signal from the shutter speed setting operation member 111 indicates that the shutter speed is to be reduced, the arithmetic circuit 101B makes an affirmative decision in step S756 and the operation proceeds to step S757. However, if the operation signal does not indicate that the shutter speed is to be reduced, the arithmetic circuit 101B makes a negative decision in step S756 and the processing in the flowchart in FIG. 26 ends.

In step S757, the arithmetic circuit 101B judges as to whether or not TVs is set to 0. If TVs=0 (the shutter speed setting is 1 sec), the arithmetic circuit 101B makes an affirmative decision in step S757 and the processing in the flowchart presented in FIG. 26 ends. In this situation, the operation proceeds to engage in the subsequent processing without changing the shutter speed setting since the shutter speed is already set at the lower limit of the shutter speed setting range. If, on the other hand, TVs≠0, the arithmetic circuit 101B makes a negative decision in step S757 and the operation proceeds to step S758. In step S758, the arithmetic circuit 101B subtracts 1 from the value of the shutter speed setting TVs before the processing in the flowchart in FIG. 26 ends. Thus, the shutter speed setting is lowered by one stage.

Figure 27:
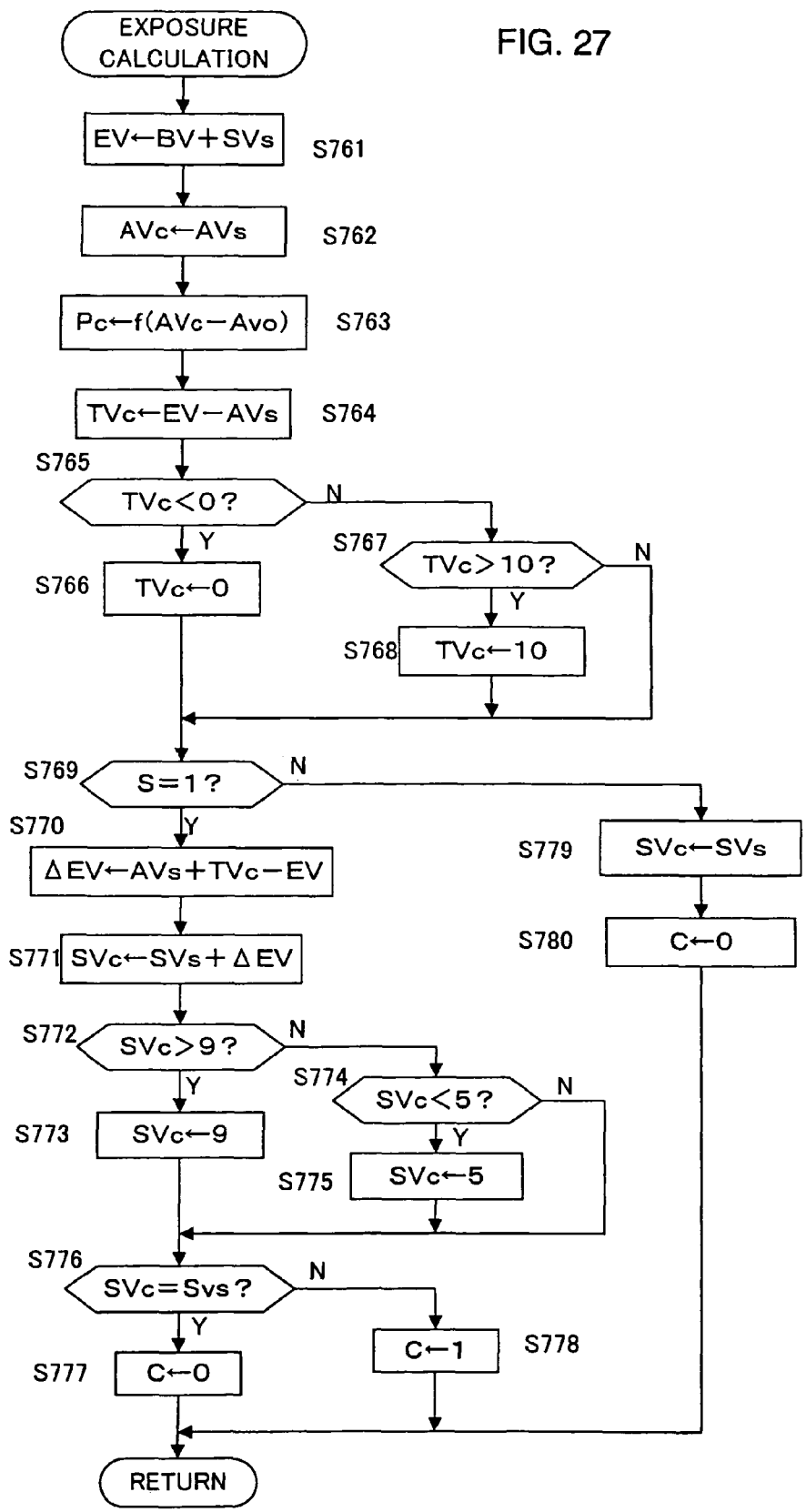
FIG. 27 presents a flowchart of the exposure calculation processing executed in the arithmetic circuit.

The exposure calculation processing executed in step S506 in the flowchart presented in FIG. 24 is explained in detail in reference to the flowchart presented in FIG. 27. It is to be noted that once the processing in the flowcharts in FIG. 27 is completed, the operation proceeds to step S507 in the flowchart in FIG. 24.

During the exposure calculation processing, aperture priority autoexposure calculation, for instance, is executed. In the aperture priority autoexposure calculation, the control exposure (AVs+TVc) is calculated by using the subject brightness BV, the image-capturing sensitivity setting SV and the aperture value setting AVs. The range of values that the control shutter speed TVc may take is 0≦TVc≦10, i.e., 1 sec ~ 1/1000 sec. If the correct exposure cannot be achieved through the aperture priority autoexposure calculation, the control image-capturing sensitivity SVc is used instead of the image-capturing sensitivity setting SV. The range of SVc is 5≦SVc≦9, i.e., a range equivalent to ISO 100~ISO 1600.

In step S761 in FIG. 27, the arithmetic circuit 101B calculates the subject brightness BV based upon the quantity of light transmitted through the lens (BV−AV0) and also calculates EV as the sum of BV and SV before the operation proceeds to step S762. AV0 represents the open aperture value of the photographic lens 103a and EV represents the exposure value. The image-capturing sensitivity setting SV has been set through an operation of the sensitivity setting operation member 109. In step S762, the arithmetic circuit 101B sets the aperture value setting AVs for the control aperture value AVc and then the operation proceeds to step S763. The aperture value setting AVs has been set through an operation of the aperture setting operation member 112.

In step S763, the arithmetic circuit 101B calculates a control aperture pulse number Pc as a function f of the number of aperture setting stages (AVc−AV0) and then the operation proceeds to step S764. The control aperture pulse number Pc represents the number of detection pulses output from the aperture position detection device 123 before the aperture is locked at the control aperture value AVc. While the number of aperture setting stages and the number of aperture detection pulses are in proportion to each other, the number of aperture detection pulses output from the aperture position detection device 123 increases toward the aperture open setting and, for this reason, the control aperture pulse number Pc is calculated as the function f of the number of aperture setting stages (AVc−AV0).

In step S764, the arithmetic circuit 101B calculates TVc by subtracting AVs from EV before the operation proceeds to step S765. AVs represents the aperture value setting. In step S765, the arithmetic circuit 110B judges as to whether or not TVc<0 is true. If TVc<0 is true (the control shutter speed is lower than 1 sec), the arithmetic circuit 101B makes an affirmative decision in step S765 and the operation proceeds to steps S766, whereas if TVc<0 is not true, the arithmetic circuit 101B makes a negative decision in step S765 to proceed to step S767. In step S766, the arithmetic circuit 101B sets the control shutter speed TVc to 0 before the operation proceeds to step S769. Through this processing, the control shutter speed is set to 1 sec, which is the lower limit of the control range.

In step S767, to which the operation proceeds after making a negative decision in step S765, the arithmetic circuit 101B judges as to whether or not TVc>10 is true. If TVc>10 is true (the control shutter speed is higher than 1/1000 sec), the arithmetic circuit 101B makes an affirmative decision in step S767 and the operation proceeds to steps S768, whereas if TVc>10 is not true, the arithmetic circuit 101B makes a negative decision in step S767 to proceed to step S769. In step S768, the arithmetic circuit 101B sets the control shutter speed TVc to 10 before the operation proceeds to step S769. Through this processing, the control shutter speed is set to 1/1000 sec, which is the upper limit of the control range.

In step S769, the arithmetic circuit 101B judges as to whether or not the sensitivity automatic control mode flag S is set to 1. If S=1 (the image-capturing sensitivity automatic control mode has been set), the arithmetic circuit 101B makes an affirmative decision in step S769 and the operation proceeds to step S770, whereas if S=0 (the image-capturing sensitivity automatic control mode has been cleared), the arithmetic circuit 101B makes a negative decision in step S769 to proceed to step S779.

In step S770, the arithmetic circuit 101B calculates the exposure deviation ΔEV by using the formula presented in (3) below and then the operation proceeds to step S771.

$$\Delta EV = AVs + TVc - EV \quad (3)$$

In the expression above, (AVS+TVC) represents the control exposure and EV represents the correct exposure.

In step S771, the arithmetic circuit 101B calculates SVc as the sum of SV and ΔEV before the operation proceeded to step S772. As a result, the image-capturing sensitivity setting is adjusted so as to achieve the correct exposure. In step S772, the arithmetic circuit 101B judges as to whether or not SVc>9 is true. If SVc>9 is true (the control image-capturing sensitivity is higher than a level equivalent to ISO 1600), the arithmetic circuit 101B makes an affirmative decision in step S772 and, in this case, the operation proceeds to step S773, whereas if SVc>9 is not true, the arithmetic circuit 101B makes a negative decision in step S772 to proceed to step S774. In step S773, the arithmetic circuit 101B sets the control image-capturing sensitivity SVc to 9 before the operation proceeds to step S776. Thus, the control image-capturing sensitivity is set to a level equivalent to ISO 1600 which is the upper limit of the control range.

In step S776, the arithmetic circuit 101B judges as to whether or not SVc=SV is true. If SVc=SV is not true, the arithmetic circuit 101B makes a negative decision in step S776 and the operation proceeds to step S778, whereas an affirmative decision is made in step S776 if SVc=SV is true and, in this case, the operations proceeds to step S777. In step S778, the arithmetic circuit 101B sets 1 for the flag C before the processing in the flowchart presented in FIG. 27 ends. As explained earlier, the flag C is set to 1 if the image-capturing sensitivity has been changed from the image-capturing sensitivity setting SV (if SVc≠SV) and is set to 0 if the value of the image-capturing sensitivity has remained unchanged from the image-capturing sensitivity setting SV (SVc=SV). In step S777, the arithmetic circuit 101B sets 0 for the flag C before the processing in the flowchart presented in FIG. 27 ends.

In step S774, to which the operation proceeds after making a negative decision in step S772 as described above, the arithmetic circuit 101B judges as to whether or not SVc<5 is true. If SVc<5 is true (the control image-capturing sensitivity is lower than a level equivalent to ISO 100), the arithmetic circuit 101B makes an affirmative decision in step S774 and, in this case, the operation proceeds to step S775, whereas if SVc<5 is not true, the arithmetic circuit 101B makes a negative decision in step S774 to proceed to step S776. In step S775, the arithmetic circuit 101B sets the control image-capturing sensitivity SVc to 5 before the operation proceeds to step S776. Thus, the control image-capturing sensitivity is set to a level equivalent to ISO 100 which is the lower limit of the control range.

In step S779, to which the operation proceeds after making a negative decision in step S769, the arithmetic circuit 101B sets the value of the image-capturing sensitivity setting SV for the control image-capturing sensitivity SVc and then the operation proceeds to step S780. In step S780, the arithmetic circuit 101B sets 0 for the flag C and the processing in the flowchart presented in FIG. 27 ends.

Figure 28:
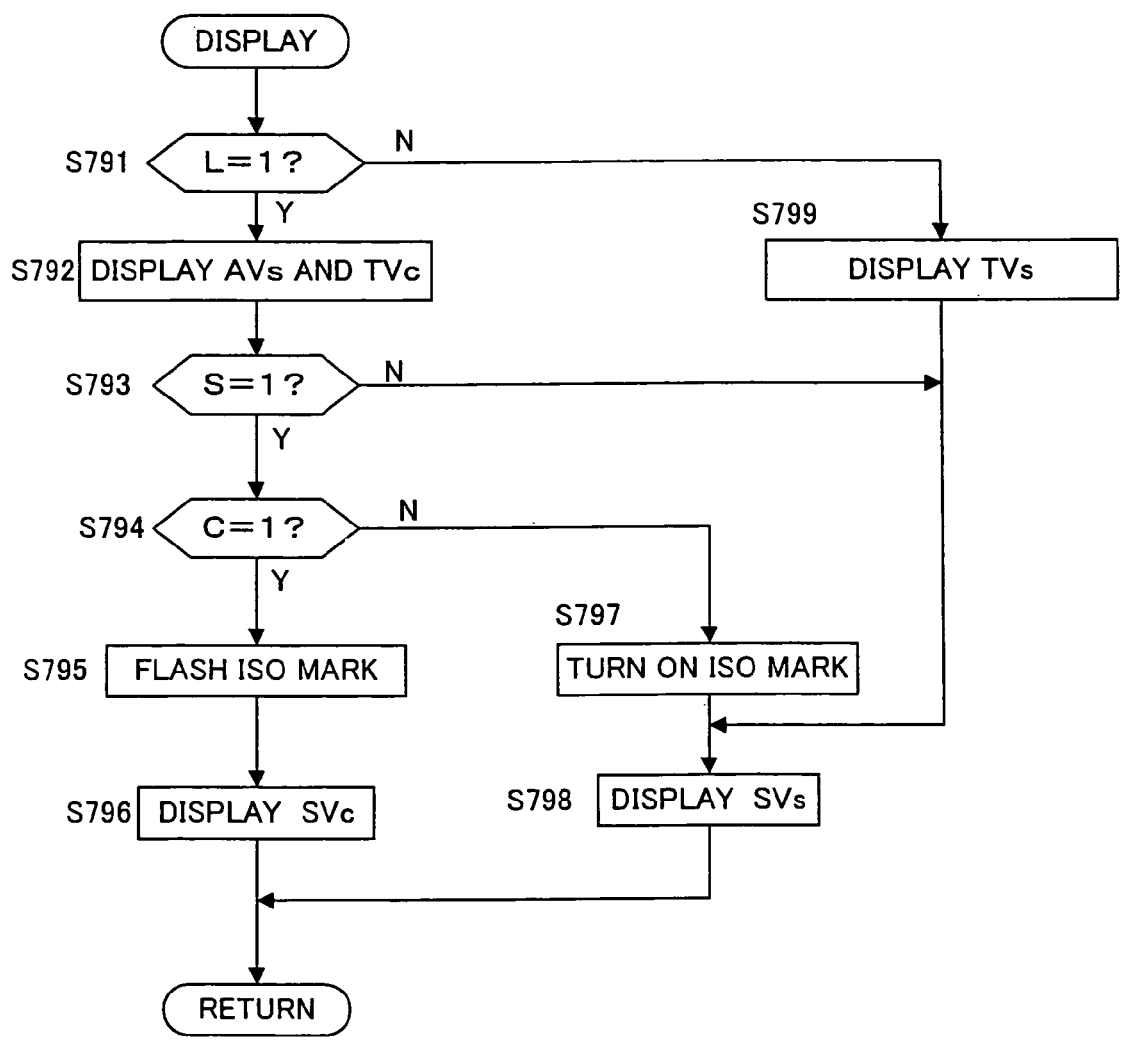
FIG. 28 presents a flowchart of the display processing executed in the arithmetic circuit.

The display processing executed in step S710 in the flowchart presented in FIG. 24 is now explained in detail in reference to the flowchart presented in FIG. 28. It is to be noted that once the processing in the flowchart in FIG. 28 is completed, the operation proceeds to step S712 or S716 in the flowchart in FIG. 24.

In step S791 in the flowchart presented in FIG. 28, the arithmetic circuit 101B judges as to whether or not 1 is set for the flag L. If L=1 (communication with the photographic lens 103a has been achieved), the arithmetic circuit 101B makes an affirmative decision in step S791 and the operation proceeds to step S792, whereas if L=0 (communication with the photographic lens 103a has not been achieved), the arithmetic circuit 101B makes a negative decision in step S791 to proceed to step S799.

In step S792, the arithmetic circuit 101B turns on a display of the aperture value setting AVs and the control shutter speed TVc at the display device 115 and the operation proceeds to step S793. At the display device 115, the F value and the shutter speed value corresponding to the apex values of the aperture value setting and the control shutter speed are displayed. In step S793, the arithmetic circuit 101B judges as to whether or not the sensitivity automatic control mode flag S is set to 1. If S=1 (the image-capturing sensitivity automatic control mode has been set), the arithmetic circuit 101B makes an affirmative decision in step S793 and the operation proceeds to step S794, whereas if S=0 (the image-capturing sensitivity automatic control mode has been cleared), the arithmetic circuit 101B makes a negative decision in step S793 to proceed to step S798.

In step S794, the arithmetic circuit 101B judges as to whether or not the flag C is set to 1. If C=1 (SVc≠SV), the arithmetic circuit 101B makes an affirmative decision in step S794 and the operation proceeds to step S795, whereas if C=0 (SVc=SV), the arithmetic circuit 101B makes a negative decision in step S794 to proceed to step S797.

In step S795, the arithmetic circuit 101B brings up a flashing display of the letters "ISO" or an equivalent mark at the display device 115 before the operation proceeds to step S796. In step S796, the arithmetic circuit 101B brings up the ISO value corresponding to the apex value of the control image-capturing sensitivity SVc into the display at the display device 115 before the processing in the flowchart presented in FIG. 28 ends. In step S797, the arithmetic circuit 101B brings up a flashing display of letters "ISO" or an equivalent mark at the display device 115 before the operation proceeds to step S798. In step S798, the arithmetic circuit 101B brings up the ISO value corresponding to the apex value of the control image-capturing sensitivity setting SV into the display at the display device 115 before the processing in the flowchart presented in FIG. 28 ends.

In step S799, to which the operation proceeds after making a negative decision in step S791, the arithmetic circuit 101B turns on a display of the shutter speed setting TVs at the display device 115 and then the operation proceeds to step S798. At this time, the shutter speed value corresponding to the apex value is brought up on display at the display device 115 without displaying the aperture value setting.

Figure 29:
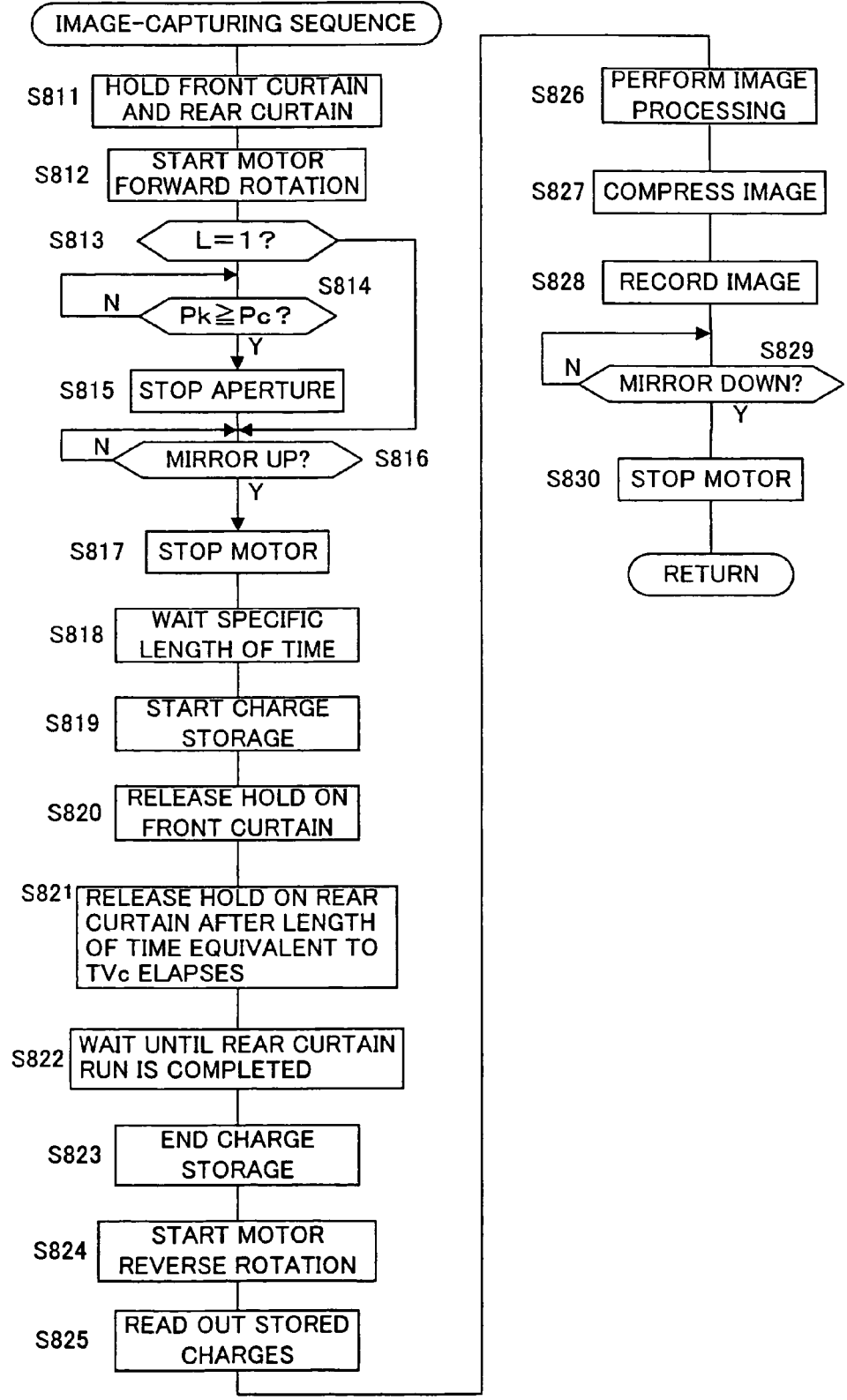
FIG. 29 presents a flowchart of the image-capturing sequence processing executed in the arithmetic circuit.

The image-capturing sequence processing executed in step S713 in the flowchart presented in FIG. 24 is now explained in detail in reference to the flowchart in FIG. 29. Since the processing executed in steps S811 and S812 is identical to the processing executed in steps S571 and S572 in the flowchart in FIG. 17, its explanation is omitted.

In step S813, the arithmetic circuit 101B judges as to whether or not 1 is set for the flag L. If L=1 (communication with the photographic lens 103a has been achieved), the arithmetic circuit 101B makes an affirmative decision in step S813 and the operation proceeds to step S814, whereas if L=0 (communication with the photographic lens 103a has not been achieved) the arithmetic circuit 101B makes a negative decision in step S813 to proceed to step S816. The aperture control processing is skipped when the operation proceeds to step S816.

Since the processing executed in steps S814~S830 is identical to the processing executed in steps S573~S589 in the flowchart presented in FIG. 17, its explanation is omitted. Once the processing in step S830 is completed, the arithmetic circuit 101B ends the processing in the flowchart presented in FIG. 29 and the operation returns to step S702 in the flowchart in FIG. 24.

The features of the electronic camera achieved in the sixth embodiment are summarized below.

(1) In the electronic camera 1B that can be operated in an operating mode (the image-capturing sensitivity automatic control mode) in which the control shutter speed TVc is calculated in correspondence to the subject brightness BV, the aperture value setting AVs and the image-capturing sensitivity setting SV, the control image-capturing sensitivity SVc is also calculated so as to achieve the correct exposure and the exposure control is implemented by using the control image-capturing sensitivity SVc instead of the image-capturing sensitivity setting SV, the exposure calculation processing (step S706) in the image-capturing sensitivity automatic control mode is not executed (is disallowed) if communication with the photographic lens 103a is not achieved (if a negative decision is made in step S703), and thus, the image-capturing sensitivity that is currently set (the image-capturing sensitivity setting SV) remains unchanged. In other words, a value different from the image-capturing sensitivity setting SV is not set for the control image-capturing sensitivity SVc. As a result, if lens data (e.g., the open aperture value AV0) necessary for the exposure calculation processing cannot be obtained from the photographic lens (i.e., if a lens without a CPU is mounted or no lens is currently mounted), the aperture value AVs, the shutter speed TVs and the image-capturing sensitivity SV that are currently set are directly used. This means that since the image-capturing sensitivity is not changed through an exposure calculation executed without the lens data against the intent of the photographer, a deterioration in the image quality attributable to increased noise in the image signals and over-exposure are prevented. In addition, by disallowing the exposure calculation processing in step S706, the image-capturing sensitivity is not adjusted unnecessarily, which, in turn, achieves a reduction in the length of camera processing time.

(2) If communication between the electronic camera 1B and the photographic lens 103 is not achieved (if a negative decision is made in step S791) or if the image-capturing sensitivity automatic control mode has been cleared (if a negative decision is made in step S793), the ISO mark is not highlighted or does not flash at the display device 115. As a result, the photographer can visually check whether or not a communication-capable photographic lens 103a is currently mounted or whether the image-capturing sensitivity automatic control mode has been set or cleared.

(3) Since the aperture value setting AVs is not brought up on display at the display device 115 if communication between the electronic camera 1B and the photographic lens 103 is not achieved (if a negative decision is made in step S791), the photographer can visually check whether or not the communication-capable photographic lens 103a is currently mounted. It is to be noted that when the communication-capable photographic lens 103a is not mounted, the photographic lens 103b, which is not capable of communication, is mounted at the electronic camera 1B or neither the photographic lens 103a nor the photographic lens 103b is mounted at the electronic camera 1B.

(4) As in the electronic camera 1A achieved in the fifth embodiment, the ISO mark is caused to flash and then the control image-capturing sensitivity SVc is brought up on display (step S796) at the display device 115, if a value different from the value of the image-capturing sensitivity setting SV is set for the control image-capturing SVc (if an affirmative decision is made in step S794) while the electronic camera 1B is set in the image-capturing sensitivity automatic control mode (when an affirmative decision is made in step S793). Thus, the photographer can visually check that the image-capturing sensitivity automatic control mode is set and also visually check the specific value set for the control image-capturing sensitivity SVc. If, on the other hand, the control image-capturing sensitivity SVc matches the image-capturing sensitivity setting SV (if a negative decision is made in step S794) while the electronic camera is set in the image-capturing sensitivity automatic control mode (when an affirmative decision is made in step S793), the ISO mark is first highlighted and then the image-capturing sensitivity setting SV is brought up on display (step S798) at the display device 115. As a result, the photographer can visually check that the image-capturing sensitivity automatic control mode is set and also visually check the specific value of the image-capturing sensitivity setting SV.

The above described embodiments are examples, and various modifications can be made without departing from the spirit and scope of the invention. For instance, in the explanation given above, the program autoexposure calculation and the aperture priority autoexposure calculation are respectively executed in the fifth embodiment and the sixth embodiment to calculate the control exposure when the electronic camera is set in the image-capturing sensitivity automatic control mode. However, the particulars of the exposure calculation that may be executed are not limited to those of the two examples, and the control exposure may instead be calculated through shutter speed priority autoexposure calculation. The shutter speed priority auto exposure calculation should be executed in the electronic camera by calculating the control image-capturing sensitivity SVc in correspondence to the exposure deviation $\Delta EV$ of the control exposure (AVc+TVs) calculated through an exposure calculation relative to the correct exposure EV and using the control image-capturing sensitivity SVc in place of the image-capturing sensitivity setting SV.

In addition, the image-capturing sensitivity automatic control mode may also be selected when the electronic camera is set to execute a manual exposure operation. In such a case, the control image-capturing sensitivity SVc should be calculated in correspondence to the exposure deviation $\Delta EV$ of the control exposure (AVs+TVs) which has been manually set relative to the correct exposure EV and the control image-capturing sensitivity SVc thus calculated should be used instead of the image-capturing sensitivity setting SV.

In the image-capturing sensitivity automatic control mode, (i) the image-capturing sensitivity setting SV alone is adjusted in correspondence to the exposure deviation $\Delta EV$ if the correct exposure cannot be achieved by calculating the control exposure through an autoexposure calculation. Instead, (ii) the aperture value setting AVs and the image-capturing sensitivity setting SV may be adjusted in combination in correspondence to the exposure deviation $\Delta EV$ or the shutter speed setting TVs and the image-capturing sensitivity setting SV may be adjusted in combination in correspondence to the exposure deviation $\Delta EV$. Alternatively, (iii) the aperture value setting AVs, the shutter speed setting TVs and the image-capturing sensitivity setting SV may be adjusted in combination in correspondence to the exposure deviation $\Delta EV$.

When calculating the control exposure through an autoexposure calculation, the image-capturing sensitivity setting SV may be adjusted ahead of the adjustment of the aperture value setting AVs or the shutter speed setting TVs, or the image-capturing sensitivity setting SV man be adjusted concurrently while changing the aperture value setting AVs or the shutter speed setting TVs in combination.

What is claimed is:

1. An electronic camera comprising:
   an image-capturing device that captures an image of a subject through a photographic lens;
   a brightness detection device that detects a subject brightness;
   a first exposure calculation circuit that performs an exposure calculation for main photographing by using an exposure sensitivity set at the image-capturing device, an exposure time length set at the image-capturing device, an aperture value set at the photographic lens, and the subject brightness detected by the brightness detection device, and calculates a first control exposure for main photographing by changing at least one of the exposure time length and the aperture value among the exposure sensitivity, the exposure time length and the aperture value if the correct exposure for main photographing is not achieved;

a second exposure calculation circuit that automatically performs the exposure calculation for main photographing by using the exposure sensitivity set at the image-capturing device, the exposure time length set at the image-capturing device, the aperture value set at the photographing lens and the subject brightness detected by the brightness detection device, calculates a second control exposure for main photographing automatically, and corrects the automatically calculated second control exposure by changing the exposure sensitivity for main photographing so as to achieve the correct exposure for main photographing if the automatically calculated second control exposure does not achieve the correct exposure; and a control circuit that automatically allows the first exposure calculation circuit to calculate the first control exposure and also automatically disallows the second exposure calculation circuit to calculate the second control exposure if a specific condition is satisfied when main photographing is executed, and automatically disallows the first exposure calculation circuit to calculate the first control exposure and also automatically allows the second exposure calculation circuit to calculate the second control exposure if the specific condition is not satisfied.

2. An electronic camera according to claim 1, further comprising:

a flash unit operation detection circuit that detects whether a flash unit which illuminates the subject is engaged in operation, wherein:

the specific condition is a condition in which operation of the flash unit is detected by the flash unit operation detection circuit.

3. An electronic camera according to claim 1, further comprising:

a photographic lens detection circuit that detects whether the photographic lens is mounted, wherein:

the specific condition is a condition in which a presence of the photographic lens is detected by the photographic lens detection circuit.

4. An electronic camera according to claim 3, wherein:

when the photographic lens detection circuit detects that the photographic lens is mounted, information indicating the aperture value of the photographic lens is provided to the electronic camera, whereas no information indicating the aperture value is provided to the electronic camera if the presence of the photographic lens is not detected.

5. An electronic camera according to claim 1, wherein the second exposure calculation circuit includes:

a first calculation unit that calculates the second control exposure for main photographing automatically;

a second calculation unit that calculates a deviation between the correct exposure and the second control exposure calculated automatically by the first calculation unit; and a correction unit that corrects the second control exposure for main photographing by changing the exposure sensitivity for main photographing in accordance with the deviation calculated by the second calculation unit so as to achieve the correct exposure for main photographing.

* * * * *